US012619801B2

(12) United States Patent
Hoff

(10) Patent No.: US 12,619,801 B2
(45) Date of Patent: \*May 5, 2026

(54) SYSTEM AND METHOD FOR A POST-MODIFICATION BUILDING BALANCE POINT TEMPERATURE DETERMINATION WITH THE AID OF A DIGITAL COMPUTER

(71) Applicant: Clean Power Research, L.L.C., Napa, CA (US)

(72) Inventor: Thomas E. Hoff, Napa, CA (US)

(73) Assignee: CLEAN POWER RESEARCH, L.L.C., Napa, CA (US)

( \* ) Notice: Subject to any disclaimer, the term of this patent is extended or adjusted under 35 U.S.C. 154(b) by 927 days.

This patent is subject to a terminal disclaimer.

(21) Appl. No.: 17/893,013

(22) Filed: Aug. 22, 2022

(65) Prior Publication Data

US 2022/0414294 A1 Dec. 29, 2022

Related U.S. Application Data

(63) Continuation of application No. 16/987,044, filed on Aug. 6, 2020, now Pat. No. 11,423,199, which is a
(Continued)

(51) Int. Cl.
*G06F 30/20* (2020.01)
*G06F 119/06* (2020.01)
*G06F 119/08* (2020.01)

(52) U.S. Cl.
CPC .......... *G06F 30/20* (2020.01); *G06F 2119/06* (2020.01); *G06F 2119/08* (2020.01)

(58) Field of Classification Search
CPC .. G06F 30/20; G06F 2119/06; G06F 2119/08; G06F 30/13; G06F 30/18;
(Continued)

(56) References Cited

U.S. PATENT DOCUMENTS

| | | | |
|---|---|---|---|
| 3,354,943 A | 11/1967 | Mcfarlan | |
| 3,923,038 A | 12/1975 | Cutchaw | |

(Continued)

FOREIGN PATENT DOCUMENTS

| | | |
|---|---|---|
| AU | 20112982 | 3/2012 |
| CN | 102155358 | 8/2011 |

(Continued)

OTHER PUBLICATIONS

Fokaides, Paris A., and Agis M. Papadopoulos. "Cost-optimal insulation thickness in dry and mesothermal climates: Existing models and their improvement." Energy and Buildings 68 (2014): 203-212 (Year: 2014).\*

(Continued)

*Primary Examiner* — Saif A Alhija
(74) *Attorney, Agent, or Firm* — Leonid Kisselev

(57) ABSTRACT

A system and method for determining a balance point of a building that has undergone or is about to undergo modifications (such as shell improvements) are provided. A balance point of the building before the modifications can be determined using empirical data. Total thermal conductivity of the building before and after the modifications is determined and compared. Indoor temperature of the building is obtained. The balance point temperature after the modifications can be determined using a result of the comparison, the temperature inside the building, and the pre-modification balance point temperature. Knowing post-modification balance point temperature allows power grid operators to take into account fuel consumption by that building when planning for power production and distribution. Knowing the post-improvement balance point temperature also provides owners of the building information on which they can base the decision whether to implement the improvements.

20 Claims, 22 Drawing Sheets

Related U.S. Application Data continuation-in-part of application No. 16/033,107, filed on Jul. 11, 2018, now Pat. No. 10,797,639.

(58) Field of Classification Search
CPC .......... G06F 30/25; G06F 30/27; G06F 30/28; Y04S 10/50
See application file for complete search history.

(56) References Cited

U.S. PATENT DOCUMENTS

| | | | |
|---|---|---|---|
| 4,089,143 A | 5/1978 | La Pietra |
| 4,992,942 A | 2/1991 | Bauerle et al. |
| 5,001,650 A | 3/1991 | Francis et al. |
| 5,177,972 A | 1/1993 | Sillato et al. |
| 5,602,760 A | 2/1997 | Chacon et al. |
| 5,803,804 A | 9/1998 | Meier et al. |
| 6,134,511 A | 10/2000 | Subbarao |
| 6,148,623 A | 11/2000 | Park et al. |
| 6,366,889 B1 | 4/2002 | Zaloom |
| 6,748,327 B1 | 6/2004 | Watson |
| 7,451,017 B2 | 11/2008 | McNally |
| 7,742,897 B2 | 6/2010 | Herzig |
| 7,920,997 B2 | 4/2011 | Domijan et al. |
| 8,155,900 B1 | 4/2012 | Adams |
| 8,369,994 B1 | 2/2013 | Rosen |
| 8,370,283 B2 | 2/2013 | Pitcher et al. |
| 9,007,460 B2 | 4/2015 | Schmidt et al. |
| 9,020,650 B2 | 4/2015 | Lutze |
| 9,086,585 B2 | 7/2015 | Hamada et al. |
| 9,098,876 B2 | 8/2015 | Steven et al. |
| 9,103,719 B1 | 8/2015 | Ho et al. |
| 9,171,276 B2 | 10/2015 | Steven et al. |
| 9,286,464 B2 | 3/2016 | Choi |
| 9,524,529 B2 | 12/2016 | Sons et al. |
| 9,599,597 B1 | 3/2017 | Steele et al. |
| 2002/0055358 A1 | 5/2002 | Hebert |
| 2005/0055137 A1 | 3/2005 | Andren et al. |
| 2005/0095978 A1 | 5/2005 | Blunn et al. |
| 2005/0222715 A1 | 10/2005 | Ruhnke et al. |
| 2007/0084502 A1 | 4/2007 | Kelly et al. |
| 2007/0119718 A1 | 5/2007 | Gibson et al. |
| 2007/0233534 A1 | 10/2007 | Martin et al. |
| 2008/0258051 A1 | 10/2008 | Heredia et al. |
| 2009/0037241 A1 | 2/2009 | Olsen et al. |
| 2009/0125275 A1 | 5/2009 | Woro |
| 2009/0154384 A1 | 6/2009 | Todd et al. |
| 2009/0217965 A1 | 9/2009 | Dougal et al. |
| 2009/0271154 A1 | 10/2009 | Coad et al. |
| 2009/0302681 A1 | 12/2009 | Yamada et al. |
| 2010/0161502 A1 | 6/2010 | Kumazawa et al. |
| 2010/0188413 A1 | 7/2010 | Hao et al. |
| 2010/0198420 A1 | 8/2010 | Rettger et al. |
| 2010/0211222 A1 | 8/2010 | Ghosn |
| 2010/0219983 A1 | 9/2010 | Peleg et al. |
| 2010/0263709 A1 | 10/2010 | Norman et al. |
| 2010/0309330 A1 | 12/2010 | Beck |
| 2010/0324962 A1 | 12/2010 | Nesler et al. |
| 2010/0332373 A1 | 12/2010 | Crabtree et al. |
| 2011/0137591 A1 | 6/2011 | Ishibashi |
| 2011/0137763 A1 | 6/2011 | Aguilar |
| 2011/0145037 A1 | 6/2011 | Domashchenko et al. |
| 2011/0272117 A1 | 11/2011 | Hamstra et al. |
| 2011/0276269 A1 | 11/2011 | Hummel |
| 2011/0282504 A1 | 11/2011 | Besore et al. |
| 2011/0307109 A1 | 12/2011 | Sri-Jayantha |
| 2012/0066168 A1 | 3/2012 | Fadell et al. |
| 2012/0078685 A1 | 3/2012 | Krebs et al. |
| 2012/0084063 A1 | 4/2012 | Drees et al. |
| 2012/0095798 A1 | 4/2012 | Mabari |
| 2012/0130556 A1 | 5/2012 | Marhoefer |
| 2012/0143383 A1 | 6/2012 | Cooperrider et al. |
| 2012/0143536 A1 | 6/2012 | Greaves et al. |
| 2012/0158350 A1 | 6/2012 | Steinberg et al. |
| 2012/0191439 A1 | 7/2012 | Meagher et al. |
| 2012/0271576 A1 | 10/2012 | Kamel et al. |
| 2012/0278051 A1 | 11/2012 | Jiang et al. |
| 2012/0310416 A1 | 12/2012 | Tepper et al. |
| 2012/0310427 A1 | 12/2012 | Williams et al. |
| 2012/0310729 A1 | 12/2012 | Dalto et al. |
| 2012/0330626 A1 | 12/2012 | An et al. |
| 2013/0008224 A1 | 1/2013 | Stormbom |
| 2013/0030590 A1 | 1/2013 | Prosser |
| 2013/0054662 A1 | 2/2013 | Coimbra |
| 2013/0060471 A1 | 3/2013 | Aschheim et al. |
| 2013/0152998 A1 | 6/2013 | Herzig |
| 2013/0166266 A1 | 6/2013 | Herzig et al. |
| 2013/0190940 A1 | 7/2013 | Sloop et al. |
| 2013/0204439 A1 | 8/2013 | Scelzi |
| 2013/0245847 A1 | 9/2013 | Steven et al. |
| 2013/0262049 A1 | 10/2013 | Zhang et al. |
| 2013/0268129 A1 | 10/2013 | Fadell et al. |
| 2013/0274937 A1 | 10/2013 | Ahn et al. |
| 2013/0289774 A1 | 10/2013 | Day et al. |
| 2013/0314699 A1 | 11/2013 | Jungerman et al. |
| 2013/0325377 A1 | 12/2013 | Drees et al. |
| 2014/0039648 A1 | 2/2014 | Boult et al. |
| 2014/0039709 A1 | 2/2014 | Steven et al. |
| 2014/0039965 A1 | 2/2014 | Steven et al. |
| 2014/0107851 A1 | 4/2014 | Yoon et al. |
| 2014/0129197 A1 | 5/2014 | Sons et al. |
| 2014/0142862 A1 | 5/2014 | Umeno et al. |
| 2014/0214222 A1 | 7/2014 | Rouse et al. |
| 2014/0222241 A1 | 8/2014 | Ols |
| 2014/0236708 A1 | 8/2014 | Wolff et al. |
| 2014/0278108 A1 | 9/2014 | Kerrigan et al. |
| 2014/0278165 A1 | 9/2014 | Wenzel et al. |
| 2014/0278203 A1 | 9/2014 | Lange et al. |
| 2014/0289000 A1 | 9/2014 | Hutchings et al. |
| 2014/0365017 A1 | 12/2014 | Hanna et al. |
| 2015/0019034 A1 | 1/2015 | Gonatas |
| 2015/0057820 A1 | 2/2015 | Kefayati et al. |
| 2015/0088576 A1 | 3/2015 | Steven et al. |
| 2015/0094968 A1 | 4/2015 | Jia et al. |
| 2015/0112497 A1 | 4/2015 | Steven et al. |
| 2015/0134251 A1 | 5/2015 | Bixel |
| 2015/0177415 A1 | 6/2015 | Bing |
| 2015/0188415 A1 | 7/2015 | Abido et al. |
| 2015/0269664 A1 | 9/2015 | Davidson |
| 2015/0276495 A1 | 10/2015 | Smullin et al. |
| 2015/0278968 A1 | 10/2015 | Steven et al. |
| 2015/0323423 A1 | 11/2015 | Alsaleem |
| 2015/0326015 A1 | 11/2015 | Steven et al. |
| 2015/0330923 A1 | 11/2015 | Smullin |
| 2015/0332294 A1 | 11/2015 | Albert et al. |
| 2015/0339762 A1 | 11/2015 | Deal et al. |
| 2015/0355017 A1 | 12/2015 | Clarke et al. |
| 2016/0049606 A1 | 2/2016 | Bartoli et al. |
| 2016/0072287 A1 | 3/2016 | Jia et al. |
| 2016/0140283 A1 | 5/2016 | Morse et al. |
| 2016/0187911 A1 | 6/2016 | Carty et al. |
| 2016/0223503 A1 | 8/2016 | Abehassera et al. |
| 2016/0226253 A1 | 8/2016 | Abido et al. |
| 2016/0266594 A1* | 9/2016 | Kauffman .............. G06Q 50/06 |
| 2016/0305678 A1 | 10/2016 | Pavlovski et al. |
| 2016/0306906 A1 | 10/2016 | McBrearty et al. |
| 2016/0348936 A1 | 12/2016 | Johnson et al. |
| 2016/0379175 A1 | 12/2016 | Bhattacharya et al. |
| 2017/0104451 A1 | 4/2017 | Gostein |
| 2017/0254550 A1* | 9/2017 | Poccianti .................. F24F 7/08 |
| 2018/0010818 A1 | 1/2018 | Maruyama et al. |
| 2018/0087795 A1 | 3/2018 | Okita et al. |
| 2022/0058556 A1 | 2/2022 | Warake et al. |
| 2022/0100802 A1 | 3/2022 | Saini et al. |

FOREIGN PATENT DOCUMENTS

| | | |
|---|---|---|
| CN | 107579706 | 12/2018 |
| JP | 4799838 | 10/2011 |
| WO | 2007124059 | 1/2007 |
| WO | 2007142693 | 12/2007 |
| WO | 2013181408 | 12/2013 |

(56)                References Cited

FOREIGN PATENT DOCUMENTS

WO        2014081967        5/2014
WO        2016164718        10/2016

OTHER PUBLICATIONS

Hendriks, Eric, et al. "Industrial requirements for thermodynamics and transport properties." Industrial & engineering chemistry research 49.22 (2010): 11131-11141. (Year: 2010).*
Brinkman et al., "Toward a Solar-Powered Grid." IEEE Power & Energy, vol. 9, No. 3, May/Jun. 2011.
California ISO. Summary of Preliminary Results of 33% Renewable Integration Study—2010 CPUC LTPP. May 10, 2011.
Ellis et al., "Model Makers." IEEE Power & Energy, vol. 9, No. 3, May/Jun. 2011.
Danny H.W. Li et al., "Analysis of solar heat gain factors using sky clearness index and energy implications." Energy Conversions and Management, Aug. 2000.
Hoff et al., "Quantifying PV Power Output Variability." Solar Energy 84 (2010) 1782-1793, Oct. 2010.
Hoff et al., "PV Power Output Variability: Calculation of Correlation Coefficients Using Satellite Insolation Data." American Solar Energy Society Annual Conference Proceedings, Raleigh, NC, May 18, 2011.
Kuszamaul et al., "Lanai High-Density Irradiance Sensor Network for Characterizing Solar Resource Variability of MW-Scale PV System." 35th Photovoltaic Specialists Conference, Honolulu, HI. Jun. 20-25, 2010.
Serban C. "Estimating Clear Sky Solar Global Radiation Using Clearness Index, for Brasov Urban Area". Proceedings of the 3rd International Conference on Maritime and Naval Science and Engineering. ISSN: 1792-4707, ISBN: 978-960-474-222-6.
Mills et al., "Dark Shadows." IEEE Power & Energy, vol. 9, No. 3, May/Jun. 2011.
Mills et al., "Implications of Wide-Area Geographic Diversity for Sort-Term Variability of Solar Power." Lawrence Berkeley National Laboratory Technical Report LBNL-3884E. Sep. 2010.
Perez et al., "Parameterization of site-specific short-term irradiance variability." Solar Energy, 85 (2011) 1343-1345, Nov. 2010.
Perez et al., "Short-term irradiance variability correlation as a function of distance." Solar Energy, Mar. 2011.
Philip, J., "The Probability Distribution of the Distance Between Two Random Points in a Box." www.math.kth.se/~johanph/habc.pdf. Dec. 2007.
Stein, J., "Simulation of 1-Minute Power Output from Utility-Scale Photovoltaic Generation Systems." American Solar Energy Society Annual Conference Proceedings, Raleigh, NC, May 18, 2011.
Solar Anywhere, 2011. Web-Based Service that Provides Hourly, Satellite-Derived Solar Irradiance Data Forecasted 7 days Ahead and Archival Data back to Jan. 1, 1998. www.SolarAnywhere.com.
Stokes et al., "The atmospheric radiance measurement (ARM) program: programmatic background and design of the cloud and radiation test bed." Bulletin of American Meteorological Society vol. 75, No. 7, pp. 1201-1221, Jul. 1994.
Hoff et al., "Modeling PV Fleet Output Variability," Solar Energy, May 2010.
Olopade et al., "Solar Radiation Characteristics and the performance of Photovoltaic (PV) Modules in a Tropical Station." Journal Sci. Res. Dev. Vol. 11, 100-109, 2008/2009.
Li et al., "Analysis of solar heat gain factors using sky clearness index and energy implications." 2000.
Shahab Poshtkouhi et al., "A General Approach for Quantifying the Benefit of Distributed Power Electronics for Fine Grained MPPT in Photovoltaic Applications Using 3-D Modeling," Nov. 20, 2012, IEE Transactions on Poweer Electronics, vol. 27, No. 11, p. 4656-4666, 2012.
Pathomthat Chiradeja et al., "An Approaching to Quantify the Technical Benefits of Distributed Generation," Dec. 2004, IEEE Transactions on Energy Conversation, vol. 19, No. 4, p. 764-773, 2004.

Mudathir Funsho Akorede et al., "Distributed Energy Resources and Benefits to the Environment," 2010, Renewable and Sustainable Energy Reviews 14, p. 724-734.
V.H. Mendez, et al., "Impact of Distributed Generation on Distribution Investment Deferral," Electrical Power and Energy Systems 28, p. 244-252, 2006.
Francisco M. Gonzalez-Longatt et al., "Impact of Distributed Generation Over Power Losses on Distribution System," Oct. 2007, Electrical Power Quality and Utilization, 9th International Conference.
M. Begovic et al., "Impact of Renewable Distributed Generation on Power Systems," 2001, Proceedings of the 34th Hawaii International Conference on System Sciences, p. 1-10.
M. Thomson et al., "Impact of Widespread Photovoltaics Generation on Distribution Systems," Mar. 2007, IET Renew. Power Gener., vol. 1, No. 1 p. 33-40.
Varun et al., "LCA of Renewable Energy for Electricity Generation Systems—A Review," 2009, Renewable and Sustainable Energy Reviews 13, p. 1067-1073.
Andreas Schroeder, "Modeling Storage and Demand Management in Power Distribution Grids," 2011, Applied Energy 88, p. 4700-4712.
Daniel S. Shugar, "Photovoltaics in the Utility Distribution System: The Evaluation of System and Distributed Benefits," 1990, Pacific Gas and Electric Company Department of Research and Development, p. 836-843.
Nguyen et al., "Estimating Potential Photovoltaic Yield With r.sun and the Open Source Geographical Resources Analysis Support System," Mar. 17, 2010, pp. 831-843.
Pless et al., "Procedure for Measuring and Reporting the Performance of Photovoltaic Systems in Buildings," 62 pages, Oct. 2005.
Emery et al., "Solar Cell Efficiency Measurements," Solar Cells, 17 (1986) 253-274.
Santamouris, "Energy Performance of Residential Buildings," James & James/Earchscan, Sterling, VA 2005.
Al-Homoud, "Computer-Aided Building Energy Analysis Techniques," Building & Environment 36 (2001) pp. 421-433.
Thomas Huld, "Estimating Solar Radiation and Photovoltaic System Performance," The PVGIS Approach, 2011 (printed Dec. 13, 2017).
Anderson et al., "Modelling the Heat Dynamics of a Building Using Stochastic Differential Equations," Energy and Building, vol. 31, 2000, pp. 13-24.
J. Kleissl & Y. Agarwal, "Cyber-Physical Energy Systems: Focus on Smart Buildings," Design Automation Conference, Anaheim, CA, 2010, pp. 749-754, doi: 10.1145/1837274.1837464. (2010).
Clito Afonso, "Tracer gas technichue for measurement of air infiltration and natural ventilation: case studies amd new devices for measurement of mechamocal air ventilation in ducts." 2013, International Journal of Low-Carbon Technologies 2015, Issue 10, pp. 188-204 (Year: 2013).
Isaac Turiel et al., "Occupant-generated $CO_2$ as an indicator of ventilation rate," 1980, Lawrence Berkley Laboratory, 26 pages (Year: 1980).
Andrew K. Persily, "Tracer gas techniques for studying building air exchange," 1988, National Bureau of Standards, 44 pages (Year: 1988).
Gruber, Mattias, Anders Truschel, and Jan-Olof Dalenback. "$CO_2$ sensors for occupancy estimations: Potential in building automation applications." Energy and Buildings 84 (2014): 548-556. (Year: 2014).
Hanninen, Otto, et al. "Combining $CO_2$ data from ventilation phases improves estimation of air exchange rates." Proceedings of Healthy Buildings Conference, Brisbane. 2012. (Year: 2012).
Kapalo, Peter, et al. "Determine a methodology for calculating the needed fresh air." Environmental Engineering. Proceedings of the International Conference on Environmental Engineering. ICEE. vol. 9. Vilnius Gediminas Technical University, Department of Construction Economics & Property, 2014. (Year: 2014).
Wang, Shengwei, and Xinqiao Jin. "$CO_2$-based occupancy detection for on-line outdoor air flow control." Indoor and Built Environment 7.3 (1998): 165-181. (Year: 1998).

(56) References Cited

OTHER PUBLICATIONS

Grot, Richard A., et al. Measurement methods for evaluation of thermal integrity of building envelopes. No. PB-83-18017 4; NBSIR-82-2605. National Bureau of Standards, Washington, DC (USA). Center for Building Technology, 1982. (Year: 1982).

Claude-Alain, Roulet, and Flavia Foradini. "Simple and cheap air change rate measurement using $CO_2$ concentration decays." International Journal of Ventilation 1.1 (2002): 39-44. (Year: 2002).

Ng, Lisa Chen, and Jin Wen. "Estimating building airflow using $CO_2$ measurements from a distributed sensor network." HVAC&R Research 17.3 (2011): 344-365. (Year: 2011).

Shuqing Cui et al., "$CO_2$ tracer gas concentration decay method for measuring air change rate," Nov. 18, 2014, Building and Environment, vol. 84, pp. 162-169; (Year: 2014).

Robert C. Sondregger et al., "In-situ measurements of residential energy performance using electric co-heating," 1980, Lawrence Berkeley Laboratory, 26 pages (Year: 1980).

Yu-Pei Ke , "Using carbon dioxide measurements to determine occupancy for ventilation controls," 1997, https://www.aivc.org/sites/ default/files/airbase_10515.pdf, pp. 1-9 (Year: 1997).

T. Leephakpreeda et al., "Occupancy-based control of indoor air ventilation: a theoretical and experimental study," 2001, ScienceAsia, vol. 27, pp. 279-284 (Year: 2001).

Detlef Laussmann et al., "Air change measurements using tracer gasses," 2011, In book: Chemistry, Emission Control, Radioactive Pollution and Indoor Air Quality, 42 pages (Year: 2011).

Fine_1980(Analysis of Heat Transfer in Building Thermal Insulation, Oak Ridge National Laboratory ORNL/TM-7481) (Year:1980).

Chapter2_1985 (Rates of Change and the Chain Rule, Springer-Verlag) (Year: 1985).

E.S. Mustafina et al. "Problems of Small Heat Power Stations and Ways to Solve Them," Proceedings. The 8th Russian-Korean International Symposium on Science and Technology, 2004. KORUS 2004. Tomsk, Russia, 2004. pp. 267-270. vol. 1, doi:10.1109/KORUS. 2004. 1555341. (Year 2004).

Di Yuhui, Di Yulin, Wang Yonghui and Wen Li, "Application and Analusis of Water Source Heat Pump System in Residential Buildings," 2011 International Symposium on Water Resource and Environmental Protection, 2011, pp. 2425-2428, doi: 10.1109/ISWREP. 2011.5893758. (Year: 2011).

1997 Ashrae Handbook, "Chapter 28 Nonresidential Cooling and Heating Load Calculation Procedures," 1997, Ashrae, 65 pagges (Year: 1997).

2001 Ashrae Handbook, "Chapter 29 Nonresidential Cooling and Heating Load Calculation Procedures," 2001, Ashrae, 41 pagges (Year: 2001).

Jeffrey D. Spitler, "Load Calculation applications Manual (I-P)", 2014, second edition, chapter "Fundammentals of the Radiant Time Series Method," Ashrae, 31 pages (Year: 2014).

Parsons, Peter. "Determining infiltration rates and predicting building occupancy using $CO_2$ concentration curves." Journal of Energy 2014 (2014). (Year: 2014).

Cali, Davide, et al. "$CO_2$ based occupancy detection algorithm: Experimental analysis and validation for office and residential buildings." Building and Environment 86 (2015): 39-49. (Year: 2015).

Dong, Bing, and Khee Poh Lam. "A real-time model predictive control for building heating and cooling systems based on the occupancy behavior pattern detection and local weather forecasting." Building Simulation. vol. 7. No. 1. Springer Berlin Heidelberg, 2014. (Year: 2014).

* cited by examiner

Fig. 1.

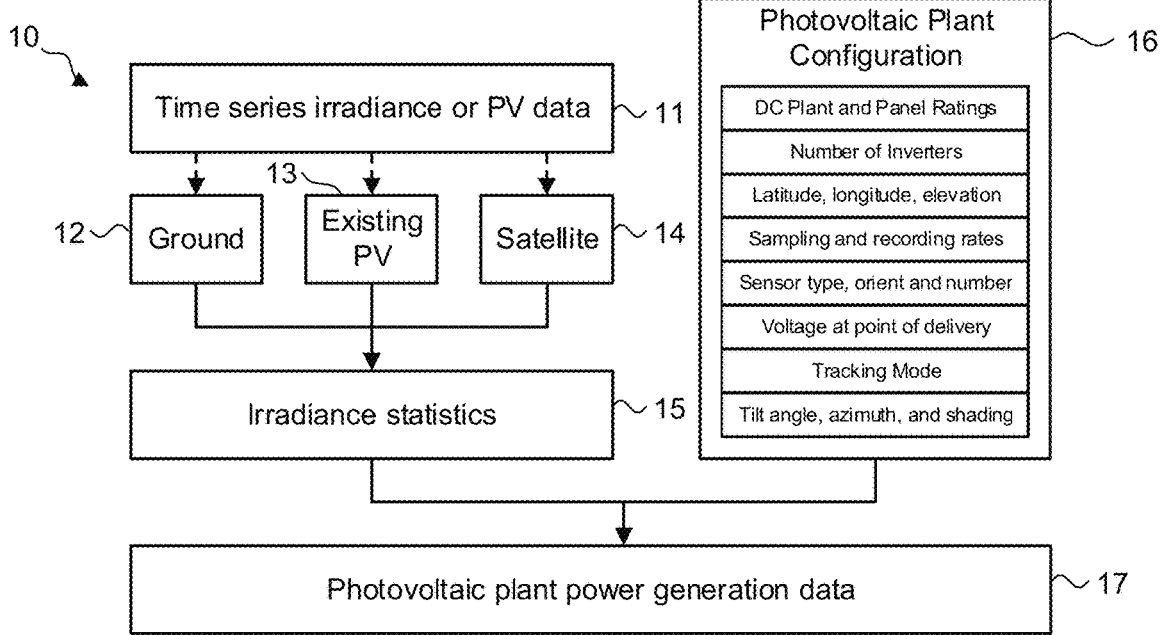

| Photovoltaic Plant Configuration | 16 |
| --- |
| DC Plant and Panel Ratings |
| Number of Inverters |
| Latitude, longitude, elevation |
| Sampling and recording rates |
| Sensor type, orient and number |
| Voltage at point of delivery |
| Tracking Mode |
| Tilt angle, azimuth, and shading |

Time series irradiance or PV data — 11

Ground — 12      Existing PV — 13      Satellite — 14

Irradiance statistics — 15

Photovoltaic plant power generation data — 17

POA (18)

GHI (30)

25

19

Power Data

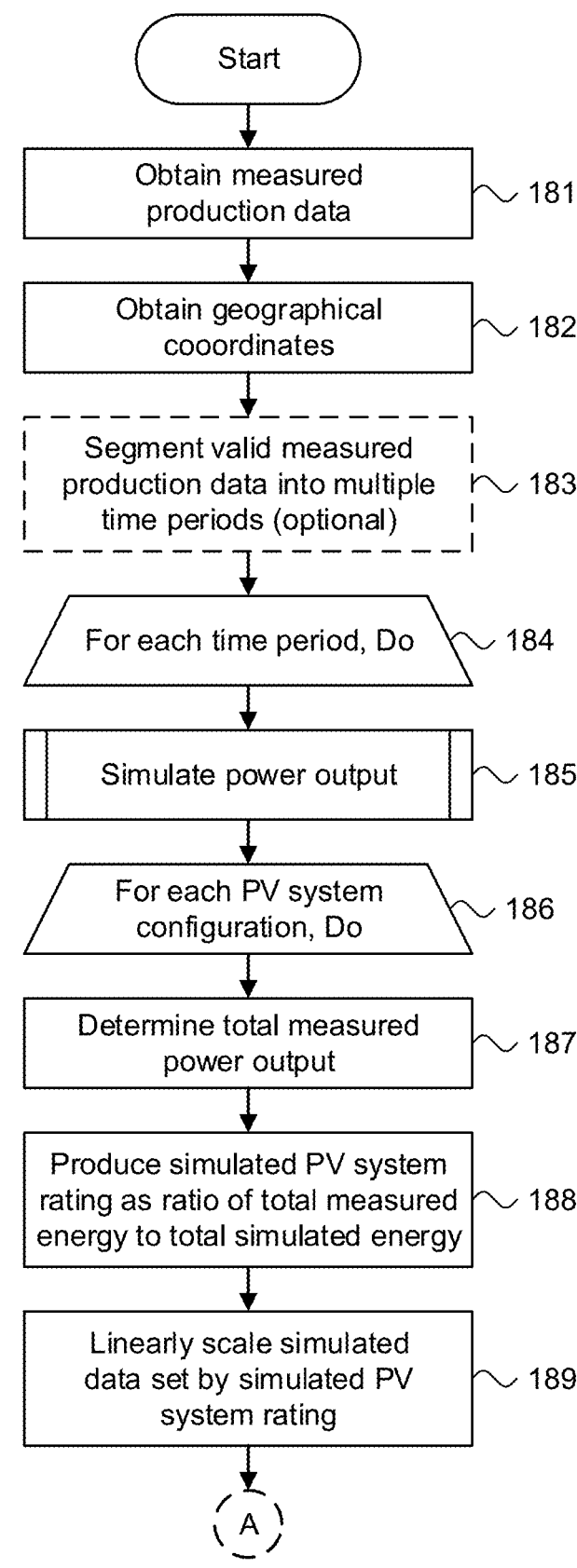

Start

Obtain measured production data ~ 181

Obtain geographical cooordinates ~ 182

Segment valid measured production data into multiple time periods (optional) ~ 183

For each time period, Do ~ 184

Simulate power output ~ 185

For each PV system configuration, Do ~ 186

Determine total measured power output ~ 187

Produce simulated PV system rating as ratio of total measured energy to total simulated energy ~ 188

Linearly scale simulated data set by simulated PV system rating ~ 189

A

Fig. 11 (con'd).

| Type | Fixed | Fixed | Fixed | Fixed | Fixed | Fixed | Fixed | Fixed | 1-Axis | 1-Axis | 1-Axis | 1-Axis | 1-Axis |
|---|---|---|---|---|---|---|---|---|---|---|---|---|---|
| Azimuth | 180 | 180 | 180 | 180 | 180 | 180 | 180 | 180 | 180 | 180 | 180 | 180 | 180 |
| Tilt | 0 | 5 | 10 | 15 | 20 | 25 | 30 | 35 | 0 | 5 | 10 | 15 |
| 1/1/2012 6:00 | 0.00 | 0.00 | 0.00 | 0.00 | 0.00 | 0.00 | 0.00 | 0.00 | 0.00 | 0.00 | 0.00 | 0.00 |
| 1/1/2012 6:30 | 0.00 | 0.00 | 0.00 | 0.00 | 0.00 | 0.00 | 0.00 | 0.00 | 0.00 | 0.00 | 0.00 | 0.00 |
| 1/1/2012 7:00 | 0.00 | 0.00 | 0.00 | 0.00 | 0.00 | 0.00 | 0.00 | 0.00 | 0.00 | 0.00 | 0.00 | 0.00 |
| 1/1/2012 7:30 | 0.00 | 0.00 | 0.00 | 0.00 | 0.00 | 0.00 | 0.00 | 0.00 | 0.00 | 0.00 | 0.00 | 0.00 |
| 1/1/2012 8:00 | 0.08 | 0.10 | 0.12 | 0.14 | 0.15 | 0.17 | 0.18 | 0.19 | 0.31 | 0.31 | 0.32 | 0.32 |
| 1/1/2012 8:30 | 0.18 | 0.22 | 0.25 | 0.28 | 0.31 | 0.34 | 0.37 | 0.39 | 0.53 | 0.54 | 0.55 | 0.56 |
| 1/1/2012 9:00 | 0.27 | 0.32 | 0.36 | 0.40 | 0.44 | 0.48 | 0.51 | 0.54 | 0.60 | 0.62 | 0.64 | 0.66 |
| 1/1/2012 9:30 | 0.36 | 0.41 | 0.46 | 0.51 | 0.56 | 0.60 | 0.63 | 0.66 | 0.63 | 0.66 | 0.69 | 0.72 |
| 1/1/2012 10:00 | 0.40 | 0.45 | 0.50 | 0.54 | 0.58 | 0.62 | 0.65 | 0.68 | 0.57 | 0.60 | 0.63 | 0.67 |
| 1/1/2012 10:30 | 0.49 | 0.56 | 0.62 | 0.68 | 0.73 | 0.77 | 0.81 | 0.84 | 0.63 | 0.67 | 0.72 | 0.77 |
| 1/1/2012 11:00 | 0.50 | 0.57 | 0.63 | 0.68 | 0.73 | 0.77 | 0.81 | 0.84 | 0.57 | 0.62 | 0.67 | 0.72 |
| 1/1/2012 11:30 | 0.54 | 0.60 | 0.67 | 0.72 | 0.77 | 0.81 | 0.85 | 0.88 | 0.56 | 0.62 | 0.68 | 0.73 |
| 1/1/2012 12:00 | 0.57 | 0.64 | 0.70 | 0.76 | 0.81 | 0.85 | 0.89 | 0.93 | 0.57 | 0.64 | 0.70 | 0.76 |

Fig. 15.
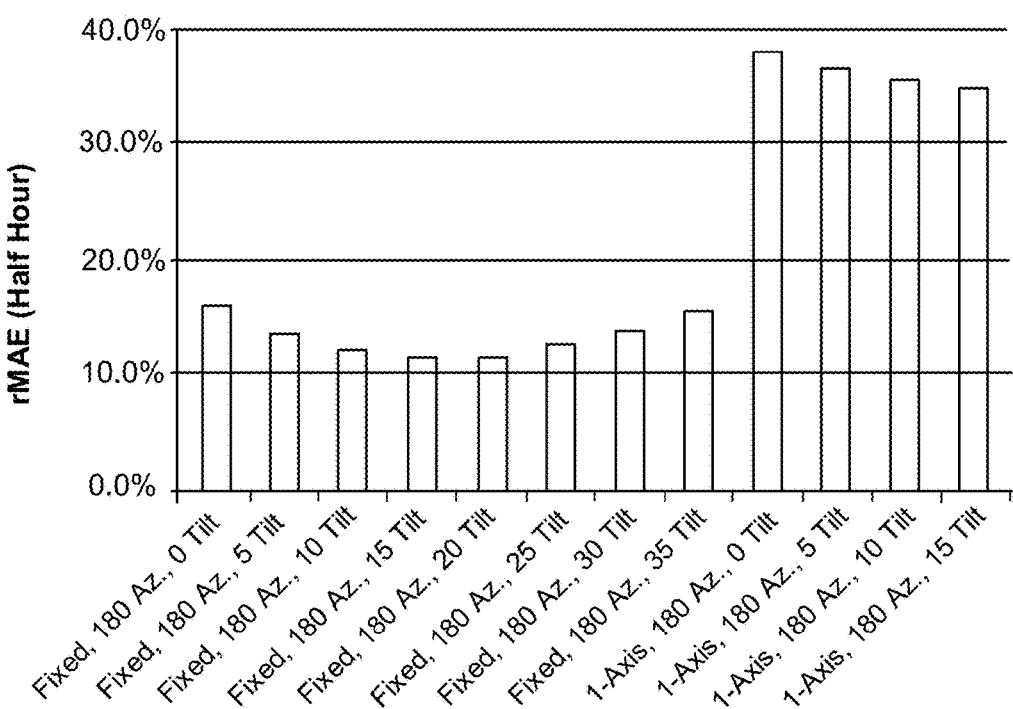
Optimal System = 5986 kW-AC, Fixed, 180 Az., 15 Tilt
Fig. 16.
Optimal Orientation
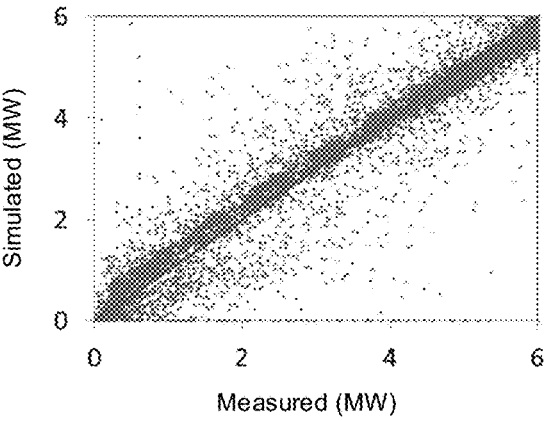
Optimal Orientation w/ Final Tuning
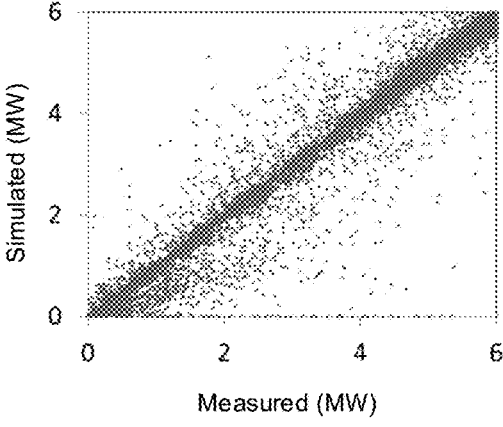

220

240

Calculate

Obtain net load ~ 241

Adjust net load to energy load as required ~ 242

Obtain measured outdoor temperature ~ 243

Express average fuel consumption in slope intercept form ~ 244

Determine *FuelRates* as slope of lines for heating and cooling ~ 245

Find *Balance Point Temperatures* ~ 246

End

Fig. 23.
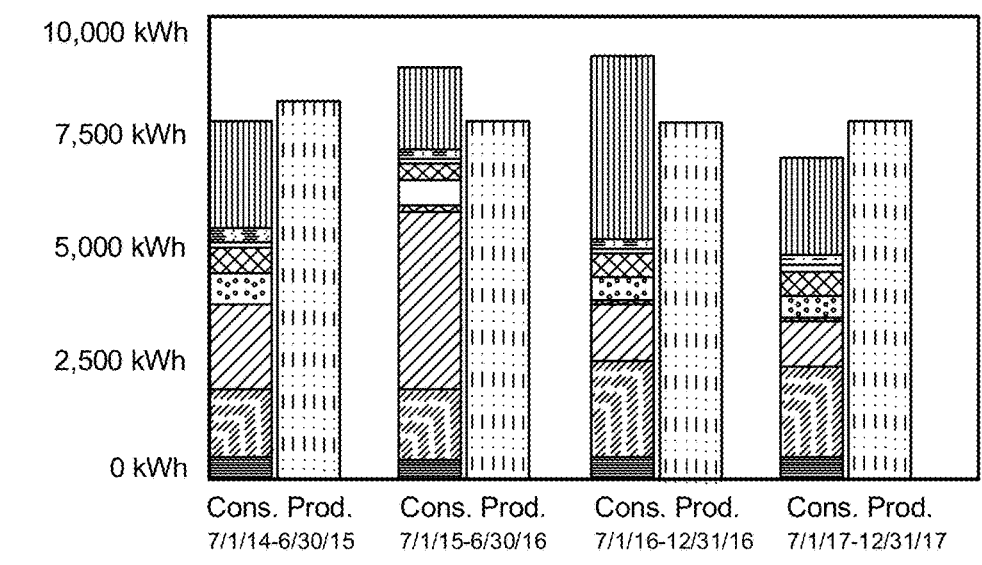

Fig. 25.
A. Verify load stability
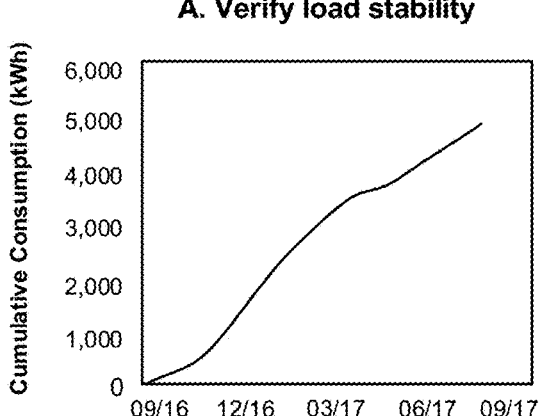
B. Determine baseload
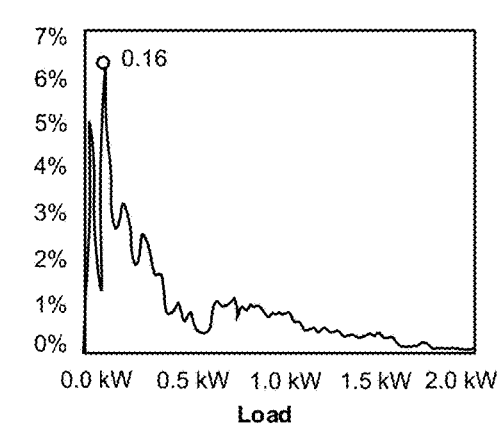
C. Eliminate unoccupied & partially occupied days
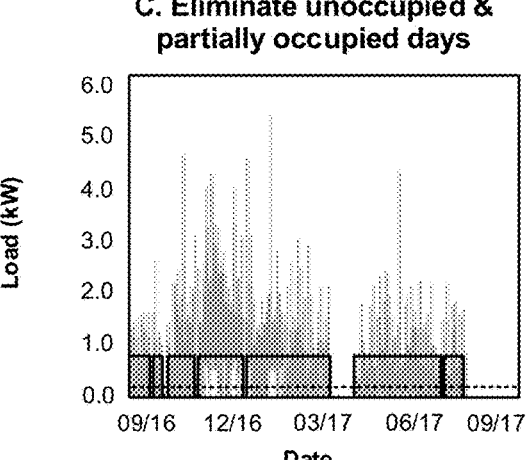
D. Calculate fuel consumption rate based on load/temperature relationship
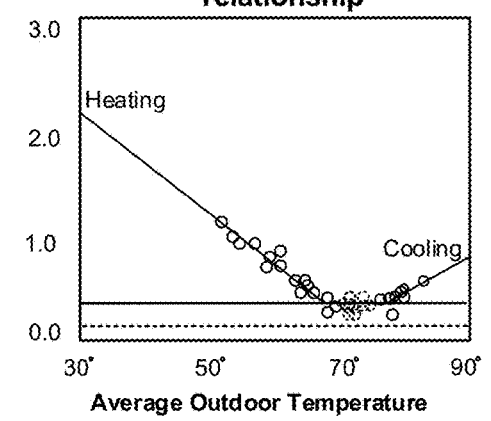
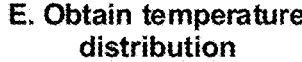
E. Obtain temperature distribution
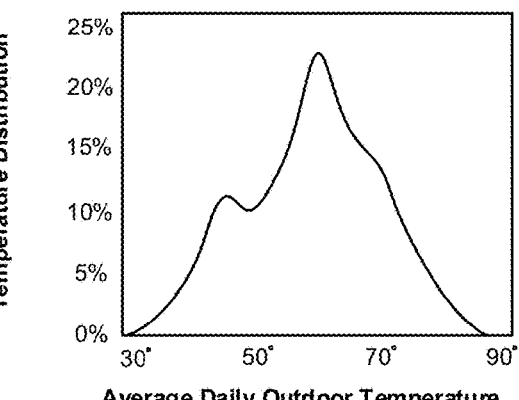
F. Calculate disaggregated annual consumption
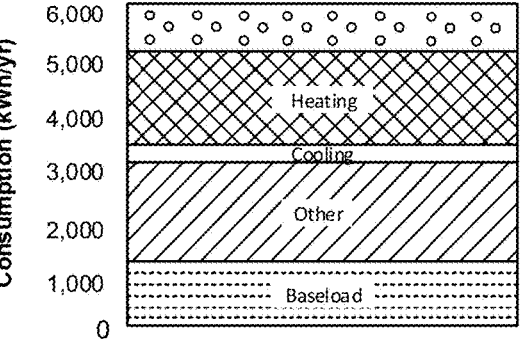

Fig. 26.
A. Temperature data measured on-site
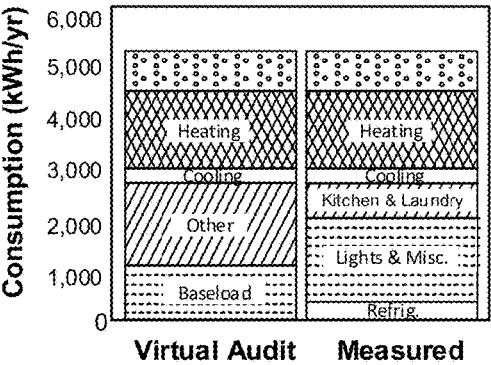
B. Temperature data from SolarAnywhere
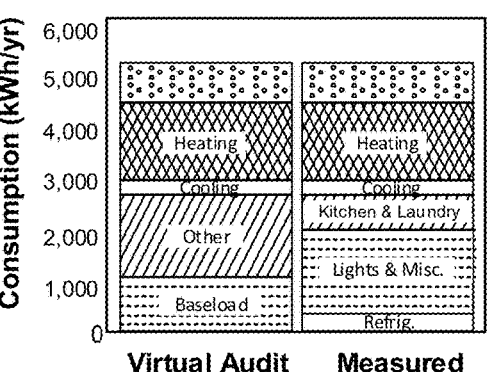
Fig. 27.
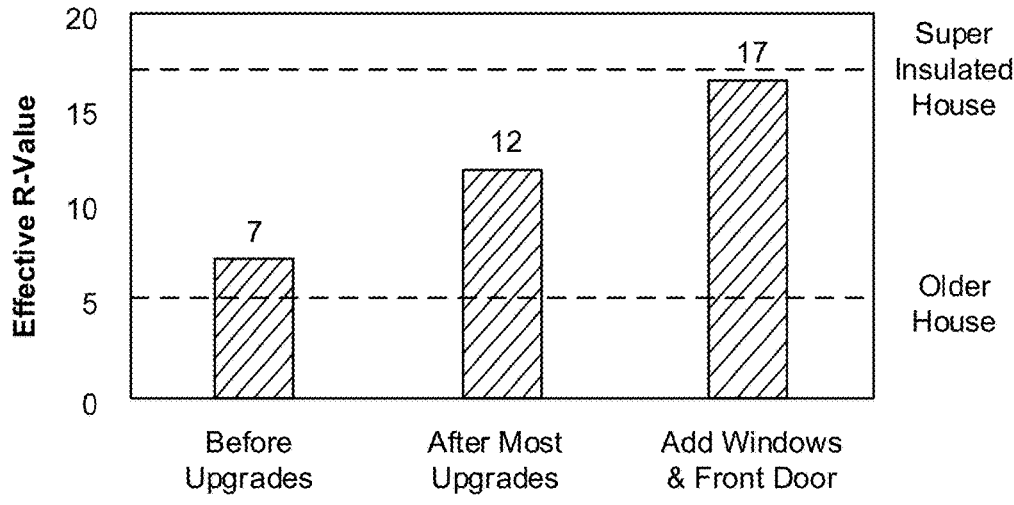

350

330

SYSTEM AND METHOD FOR A POST-MODIFICATION BUILDING BALANCE POINT TEMPERATURE DETERMINATION WITH THE AID OF A DIGITAL COMPUTER

CROSS REFERENCE TO RELATED APPLICATION

This non-provisional patent application is a continuation of U.S. patent application Ser. No. 16/987,044, filed Aug. 6, 2020, pending, which is a continuation-in-part of U.S. Pat. No. 10,797,639, issued Oct. 6, 2020, the disclosures of which is incorporated by reference.

FIELD

This application relates in general to power generation fleet planning and operation and, in particular, to a system and method for a post-modification building balance point temperature determination with the aid of a digital computer.

BACKGROUND

A power grid is a geographically-distributed electricity generation, transmission, and distribution infrastructure that delivers electricity from power generation sources to regional and municipal power utilities and finally to end-consumers, including residential, commercial, and retail customers. Power generation and consumption balancing remains a crucial part of power grid and power utility planning and operations. As electricity is consumed almost immediately upon production, both power generation and power consumption must be continually balanced across the entire power grid. For instance, a power failure in one part of a power grid could cause electrical current to reroute from remaining power generation sources over transmission lines of insufficient capacity and in turn create the possibility of cascading power failures and widespread outages. As a result, the planners and operators of power grids and power utilities need to be able to accurately gauge both on-going and forecasted power generation from all sources, including photovoltaic fleets and individual photovoltaic systems, and on-going and forecasted consumption by all consumers.

Estimating on-going and forecasted power generation requires examining the contribution made by each power generation system to a power grid. For instance, photovoltaic systems are widely used today for grid-connected distributed power generation, as well as for standalone off-grid power systems and residential and commercial sources of supplemental electricity. Power grid connection of photovoltaic power generation is a fairly recent development. Typically, when integrated into a power grid, photovoltaic systems are centrally operated by a supplier as a fleet, although the individual photovoltaic systems in the fleet may be deployed at different physical locations within a geographic region. Reliance on photovoltaic fleet power generation as part of a power grid implicates the need for these photovoltaic systems to exhibit predictable power generation behaviors, and accurate power production data is needed at all levels of a power grid, including power utilities, to which a fleet is connected.

On-going and forecasted power production data is particularly crucial when a photovoltaic fleet makes a significant contribution to a power grid's overall power mix. For individual systems, power production forecasting first involves obtaining a prediction of solar irradiance, which can be derived from ground-based measurements, satellite imagery, numerical weather prediction models, or other sources. The predicted solar irradiance and each photovoltaic plant's system configuration is combined with a photovoltaic simulation model to generate a forecast of individual photovoltaic plant power output production. The individual photovoltaic plant forecasts can then be combined into a photovoltaic fleet forecast, such as described in commonly-assigned U.S. Pat. Nos. 8,165,811; 8,165,812; 8,165,813, all issued to Hoff on Apr. 24, 2012; U.S. Pat. Nos. 8,326,535; 8,326,536, issued to Hoff on Dec. 4, 2012; and U.S. Pat. No. 8,335,649, issued to Hoff on Dec. 18, 2012, the disclosures of which are incorporated by reference.

As photovoltaic power generation relies on solar irradiance, photovoltaic fleets operating under cloudy conditions may exhibit variable and unpredictable performance, thereby complicating the need for predictable power generation behaviors. Conventionally, fleet variability is determined by collecting and feeding direct power measurements from individual photovoltaic systems or equivalent indirectly-derived power measurements into a centralized control computer or similar arrangement. To be of optimal usefulness, the direct power measurement data must be collected in near-real time at fine-grained time intervals to enable a high resolution time series of power output data to be created. However, the practicality of this form of optimal approach diminishes as the number of photovoltaic systems, variations in system configurations, and geographic dispersion of the photovoltaic fleet grow. Moreover, the costs and feasibility of providing remote power measurement data can make high speed data collection and analysis insurmountable due to the bandwidth needed to transmit data and the storage space needed to contain collected measurements; furthermore, the processing resources needed to scale quantitative power measurement analysis increases upwards as the photovoltaic fleet size grows.

Similarly, for power grid and power utility planning and operation purposes, assembling accurate photovoltaic system configuration specification data is as important as obtaining a reliable solar irradiance forecast. The specification of a photovoltaic system's configuration is typically provided by the system's owner or operator; as a result, the configuration specification data can vary in terms of completeness, quality, and correctness, which can complicate or skew power output forecasting despite the accuracy of the solar irradiance forecast. Moreover, in some situations, photovoltaic system configuration specifications may simply not be available.

Privately-owned residential systems, for example, are typically not controlled or accessible by the power grid operators and by power utilities who need to fully understand and gauge those photovoltaic systems' expected photovoltaic power output capabilities and shortcomings, as decreases in end-consumer operated photovoltaic system power production could require increased power grid production to compensate for power generation losses. Furthermore, even large utility-connected systems may have configuration specifications that are not publicly available due to privacy or security reasons.

To satisfy on-going and forecasted power consumption needs, the planners and operators of power grids and power utilities require a deep understanding of how their customers consume and, where appropriate, generate energy. End-consumer energy consumption patterns touch upon many of their activities, including planning for future growth, procuring power generation supply, dispatching resources, setting utility rates, and developing programs that promote power consumption efficiency. All of these activities may also be influenced by privately-owned photovoltaic systems that may carry part of a consumer's power load, thereby decreasing overall expected utility electric load, or could participate as part of a power grid, thus increasing total available grid power generation.

Power consumption by commercial and retail customers can be forecast with reasonable accuracy since the kinds of activities in which businesses engage in and their customary business hours are generally known; changes to their power consumption patterns occur with sufficient notice, so as to enable power utilities to make any necessary adjustments to production or resources as needed. On the other hand, accurately predicting residential power consumption remains a challenge, particularly due to location- and consumer-specific factors, such as year-to-year weather variability, occupant comfort preferences, and building internal heat gains. Residential customers, who typically constitute a large part of an power utilities' consumer base, consume power in widely varying patterns, and power consumption may be further affected by on-site residential photovoltaic systems. Power utilities meter total electric load only; however, any given residential consumer's total electric load will likely include different types of component loads, such as heating, cooling, and "always-on" baseloads, that depend on a range of disparate factors, such as the thermal performance of their home's building envelope, occupant comfort preferences, and internal heat gains, as well as geographic location and year-to-year weather variability.

Analytically disaggregating total electric load into component load types can provide valuable insights into residential consumer behavior for planning and operational purposes and can also help power utilities to assist customers in using energy resources efficiently to promote a healthy environment. In particular, conventional approaches to assessing on-going and forecasted power consumption by residential power utility customers generally focus on assessing building thermal load, which tends to define a power utility's power generation system production peak. Building thermal loads are temperature-driven and directly related to building performance based on building-specific structural factors, such as HVAC (Heating, Ventilation, and Air Conditioning) type, building insulation, window type, sealing quality around building penetrations, and HVAC ductwork.

Building owners typically use on-site energy audits, detailed computer modeling, or some combination of these approaches to determine their building's thermal performance. On-site energy audits require intrusive tests, such as a blower door test, and inspections and are costly and inconvenient. Building modeling requires detailed measurements, such as window areas, and materials inventory, such as wall insulation type. Practically, a power utility is not equipped to broadly apply these kinds of approaches due to the coordination needed for each customer within an entire service territory. Alternatively, on-line energy audits offer residential consumers another way of determining building thermal performance. Consumers answer a series of questions about their homes through on-line surveys and software analyzes their answers and makes recommendations. Although helpful, on-line energy audits can be tedious and consumers may lose interest and abandon an audit before completion.

Further, existing audit techniques are generally only capable of analyzing characteristics of the building as they currently exist, and are not suitable for predicting characteristics that a building will have after undergoing modifications, such as improvements (also referred to as investments to the shell of the building). In particular, a building's balance point temperature is a metric that represents the outdoor air temperature when the heat gains of the building are equal to the heat losses, and that can be used in a variety of analyses, including determining a building's fuel consumption (such as consumption of natural gas, electricity, or any other fuel). Such metric can be used by a power utility in planning for providing power to a building that has either recently undergone or is about to undergo shell improvements, as well as to the building owner in deciding whether to perform the improvements in the first place. In the past, determination of the balance point temperature has required knowing the building's internal heat gains. However, the internal gains can be difficult to estimate, particularly the solar resource portion of the gains (i.e., sun coming through windows and being absorbed by the exterior of the building shell). While as described in U.S. Pat. No. 10,797,639, issued Oct. 6, 2020, the disclosure of which can be incorporated by reference, the balance point temperature can also be determined based on empirical data, the lack of such data, either before the improvements to the building are performed or right after the implementation of the improvements, makes this technique inapplicable in some cases.

Therefore, a need remains for a power utility-implementable approach to remotely estimating and disaggregating on-going and expected consumer power consumption, particularly for residential customers.

A further need exists for a convenient way to estimate a balance point temperature of a building that has either recently undergone or is about to undergo shell improvements.

SUMMARY

A system and method to analyze building performance without requiring an on-site energy audit or customer input is described. The analysis combines total customer energy load with externally-supplied meteorological data to analyze each customer's building thermal performance, including seasonal energy consumption. Where a customer only uses electricity supplied by a power utility, the energy load will be based upon net (electric) load over a set time period, such as measured by a power utility's on-site meter for a monthly electricity bill. Where a customer also has an on-site solar power generation system (or other type of on-site power generation system) installed, the energy load will be based upon the power utility-metered net electric load plus the solar power generated during that same time period. Note, however, that the solar power generation will need to be added to the power utility-metered net electric load to yield the energy load in toto in installations where the solar power generation is not separately metered by the power utility. Otherwise, the total customer electric load will be underreported due to the exclusion of on-site solar power generation. The results of this analysis of each customer's building thermal performance produces a rich dataset that includes seasonal energy consumption. The power utility can use the dataset in planning and operation and for other purposes.

Further, a system and method for determining a balance point of a building that has undergone or is about to undergo modifications (such as shell improvements) are provided. A balance point temperature of the building before the modifications can be determined using empirical data. Total thermal conductivity of the building before and after the modifications is determined and compared. Indoor temperature of the building is obtained. The balance point temperature after the modifications can be determined using a result of the comparison, the temperature inside the building, and the pre-modification balance point temperature. Being able to determine a balance point temperature of a building that is about to undergo or has recently undergone shell improvements allows power grid operators to take into account fuel consumption by that building when planning for power production and distribution. Knowing the post-improvement balance point temperature also provides owners of the building information on which they can base the decision whether to implement the improvements to the shell in the first place. In one embodiment, a system and method for a post-modification building balance point temperature prediction with the aid of a digital computer are provided. A balance point temperature of a building is obtained by a computer, the computer including a memory storing program code and a processor coupled to the memory and configured to execute the code. Total thermal conductivity of the building is obtained by the computer. A temperature inside the building is obtained by the computer. One or more proposed changes to the building associated with a change to the total thermal conductivity are received by the computer. The changed total thermal conductivity associated with an implementation of the building changes is modeled by the computer. A further balance point temperature of the building associated with the implementation of the one or more proposed changes is determined by the computer in accordance with:

$$\hat{T}^{Balance\ Point} = \frac{T^{Balance\ Point} - \gamma T^{Indoor}}{(1-\gamma)}$$

where $\hat{T}^{Balance\ Point}$ is the further balance point temperature, $T^{Balance\ Point}$ is the balance point temperature, $\gamma$ is a fractional improvement in the total thermal conductivity associated with the implementation of the one or more proposed changes, $T^{Indoor}$ is the temperature inside the building, wherein the one or more proposed changes are implemented based on the further balance point temperature.

In a further embodiment, a system and method for a post-modification building balance point temperature determination with the aid of a digital computer are provided. A balance point temperature of a building is obtained by a computer, the computer including a memory storing program code and a processor coupled to the memory and configured to execute the code. Total thermal conductivity of the building prior to an implementation of one or more changes to the building that are associated with a change to the total thermal conductivity is obtained by the computer, including performing an empirical test using an electrical controllable heating source. A temperature inside the building following the implementation of the one or more changes to the building is obtained by the computer. The changed total thermal conductivity associated with the implementation of the one or more changes is modeled by the computer. A further balance point temperature of the building following the implementation of the one or more changes is determined by the computer in accordance with:

$$\hat{T}^{Balance\ Point} = \frac{T^{Balance\ Point} - \gamma T^{Indoor}}{(1-\gamma)}$$

where $\hat{T}^{Balance\ Point}$ is the further balance point temperature, $T^{Balance\ Point}$ is the balance point temperature, $\gamma$ is a fractional improvement in the total thermal conductivity following the implementation of the one or more changes, and $T^{Indoor}$ is the temperature inside the building.

Some of the notable elements of this methodology non-exclusively include:

(1) Employing a fully derived statistical approach to generating high-speed photovoltaic fleet production data;

(2) Using a small sample of input data sources as diverse as ground-based weather stations, existing photovoltaic systems, or solar data calculated from satellite images;

(3) Producing results that are usable for any photovoltaic fleet configuration;

(4) Supporting any time resolution, even those time resolutions faster than the input data collection rate;

(5) Providing results in a form that is useful and usable by electric power grid planning and operation tools;

(6) Inferring photovoltaic plant configuration specifications, which can be used to correct, replace or, if configuration data is unavailable, stand-in for the plant's specifications;

(7) Providing more accurate operational sets of photovoltaic system specifications to improve photovoltaic power generation fleet forecasting;

(8) Determining whether system maintenance is required or if degradation has occurred by comparing reported power generation to expected power generation;

(9) Quantifying the value of improving photovoltaic system performance by modifying measured time series load data using estimates of a fully performing photovoltaic system and sending the results through a utility bill analysis software program;

(10) Remotely determining building-specific, objective parameters useful in modeling the building's energy consumption;

(11) Finding an "Effective R-Value" for each building, which is an intuitive comparative metric of overall building thermal performance;

(12) Assessing on-going and forecasted power consumption by a power utility's customer base, and in enabling the power utility to adjust or modify the generation or procurement of electric power as a function of a power utility's remote consumer energy auditing analytical findings;

(13) Providing power utility customers with customized information to inform their energy investment decisions and identifying homes for targeted efficiency funding;

(14) Disaggregating total building electrical loads into individual component loads, such as heating loads, cooling loads, baseloads, and other loads;

(15) Determining a balance point temperature of a building that the building would have after undergoing modifications, which can be used for forecasting power consumption by a power utility's customer base, and in enabling the power utility to adjust or modify the generation or procurement of electric power in response to the forecast; the forecast balance point temperature can also be used to decide whether to undertake improvements in the first place.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

FIG. 1 is a flow diagram showing a computer-implemented method for generating a probabilistic forecast of photovoltaic fleet power generation in accordance with one embodiment.

FIG. 2 is a block diagram showing a computer-implemented system for inferring operational specifications of a photovoltaic power generation system using net load in accordance with a further embodiment.

FIG. 13 is a table showing, by way of example, simulated half-hour photovoltaic energy production for a 1-kW-AC photovoltaic system.

FIG. 15 is a graph depicting, by way of example, the relative mean absolute error between the measured and simulated power output for all system configurations as shown in FIG. 14.

FIG. 16 are graphs depicting, by way of example, simulated versus measured power output for the optimal photovoltaic system configuration specifications as shown in FIG. 14.

FIG. 23 is a bar chart showing, by way of example, three-and-a-half years of consumption and production data by circuit for the sample home.

FIG. 25 includes graphs showing, by way of examples, the results for each step of the method of FIG. 24 for the sample home.

FIG. 26 includes graphs showing, by way of examples, a comparison of results for the sample home obtained through the Virtual Energy Audit and measured energy consumption data.W FIG. 27 is a chart showing, by way of examples, the Effective R-Values of the sample house before upgrades, after most upgrades, and after all upgrades.

DETAILED DESCRIPTION

Overview

The planners and operators of power grids and power utilities need to be able to accurately gauge both on-going and forecasted power generation from all sources, including photovoltaic fleets and individual photovoltaic systems, and on-going and forecasted consumption by all consumers. Power generation assessment includes both obtaining a reliable solar irradiance forecast and assembling accurate photovoltaic system configuration specification data. Power consumption assessment includes understanding how power utility customers consume and, where appropriate, generate energy.

The discussion that follows is divided into four sections. The first section discusses photovoltaic fleet power generation forecasting, which includes estimating power data for a photovoltaic power generation fleet, determining point-to-point correlation of sky clearness, and determining point-to-point correlation of sky clearness. The second section discusses inferring photovoltaic power generation system operational specifications from net load data. The third section discusses performing power utility remote consumer energy auditing, including analyzing each customer's building thermal performance and seasonal energy consumption, and estimating and disaggregating consumer power consumption, plus, when appropriate, the effect of on-site residential photovoltaic (solar) power generation on power consumption estimates. The fourth section discusses determining a balance point temperature of a building that has recently undergone or is about to undergo modifications, such as improvements to the shell of the building.

Photovoltaic Fleet Power Generation Forecasting

To aid with the planning and operation of photovoltaic fleets, whether at the power grid, supplemental, or stand-alone power generation levels, high resolution time series of power output data is needed to efficiently estimate photo-voltaic fleet power production. The variability of photovol-taic fleet power generation under cloudy conditions can be efficiently estimated, even in the absence of high speed time series power production data, by applying a fully derived statistical approach. FIG. 1 is a flow diagram showing a computer-implemented method 10 for generating a proba-bilistic forecast of photovoltaic fleet power generation in accordance with one embodiment. The method 10 can be implemented in software and execution of the software can be performed on a computer system, such as further described infra, as a series of process or method modules or steps.

Figure 3:
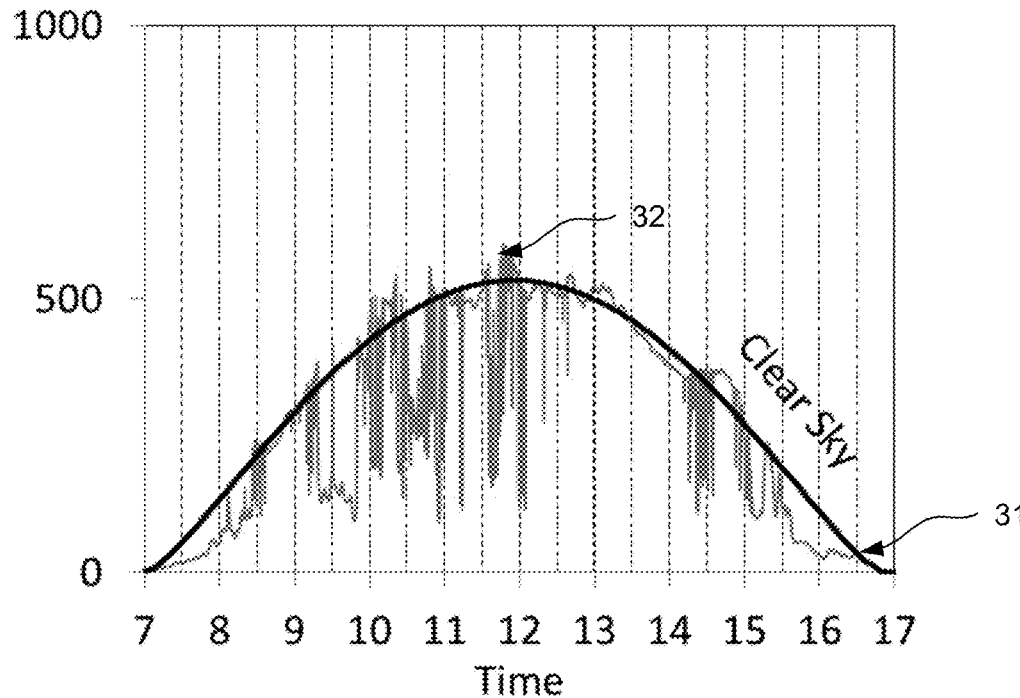
FIG. 3 is a graph depicting, by way of example, ten hours of time series irradiance data collected from a ground-based weather station with 10-second resolution.

A time series of solar irradiance or photovoltaic ("PV") data is first obtained (step 11) for a set of locations repre-sentative of the geographic region within which the photo-voltaic fleet is located or intended to operate, as further described infra with reference to FIG. 3. Each time series contains solar irradiance observations measured or derived, then electronically recorded at a known sampling rate at fixed time intervals, such as at half-hour intervals, over successive observational time periods. The solar irradiance observations can include solar irradiance measured by a representative set of ground-based weather stations (step 12), existing photovoltaic systems (step 13), satellite obser-vations (step 14), or some combination thereof. Other sources of the solar irradiance data are possible, including numeric weather prediction models.

Next, the solar irradiance data in the time series is converted over each of the time periods, such as at half-hour intervals, into a set of global horizontal irradiance clear sky indexes, which are calculated relative to clear sky global horizontal irradiance based on the type of solar irradiance data, such as described in commonly-assigned U.S. Pat. No. 10,409,925, issued Sep. 10, 2019, the disclosure of which is incorporated by reference. The set of clearness indexes are interpreted into as irradiance statistics (step 15), as further described infra with reference to FIGS. 4-6, and power statistics, including a time series of the power statistics for the photovoltaic plant, are generated (step 17) as a function of the irradiance statistics and photovoltaic plant configu-ration (step 16). The photovoltaic plant configuration includes power generation and location information, includ-ing direct current ("DC") plant and photovoltaic panel ratings; number of power inverters; latitude, longitude and elevation; sampling and recording rates; sensor type, orien-tation, and number; voltage at point of delivery; tracking mode (fixed, single-axis tracking, dual-axis tracking), azi-muth angle, tilt angle, row-to-row spacing, tracking rotation limit, and shading or other physical obstructions. Other types of information can also be included as part of the photovoltaic plant configuration. The resultant high-speed time series plant performance data can be combined to estimate photovoltaic fleet power output and variability, such as described in commonly-assigned U.S. Pat. Nos. 8,165,811; 8,165,812; 8,165,813; 8,326,535; 8,335,649; and 8,326,536, cited supra, for use by power grid planners, operators and other interested parties.

The calculated irradiance statistics are combined with the photovoltaic fleet configuration to generate the high-speed time series photovoltaic production data. In a further embodiment, the foregoing methodology may also require conversion of weather data for a region, such as data from satellite regions, to average point weather data. A non-optimized approach would be to calculate a correlation coefficient matrix on-the-fly for each satellite data point. Alternatively, a conversion factor for performing area-to-point conversion of satellite imagery data is described in commonly-assigned U.S. Pat. Nos. 8,165,813 and 8,326, 536, cited supra.

Each forecast of power production data for a photovoltaic plant predicts the expected power output over a forecast period. FIG. 2 is a block diagram showing a computer-implemented system 20 for generating a probabilistic fore-cast of photovoltaic fleet power generation in accordance with one embodiment. Time series power output data 32 for a photovoltaic plant is generated using observed field con-ditions relating to overhead sky clearness. Solar irradiance 23 relative to prevailing cloudy conditions 22 in a geo-graphic region of interest is measured. Direct solar irradi-ance measurements can be collected by ground-based weather stations 24. Solar irradiance measurements can also be derived or inferred by the actual power output of existing photovoltaic systems 25. Additionally, satellite observations 26 can be obtained for the geographic region. In a further embodiment, the solar irradiance can be generated by numerical weather prediction models. Both the direct and inferred solar irradiance measurements are considered to be sets of point values that relate to a specific physical location, whereas satellite imagery data is considered to be a set of area values that need to be converted into point values, such as described in commonly-assigned U.S. Pat. Nos. 8,165, 813 and 8,326,536, cited supra. Still other sources of solar irradiance measurements are possible.

The solar irradiance measurements are centrally collected by a computer system 21 or equivalent computational device. The computer system 21 executes the methodology described supra with reference to FIG. 1 and as further detailed herein to generate time series power data 26 and other analytics, which can be stored or provided 27 to planners, operators, and other parties for use in solar power generation 28 planning and operations. In a further embodi-ment, the computer system 21 executes the methodology described infra beginning with reference to FIG. 11 for inferring operational specifications of a photovoltaic power generation system, which can be stored or provided 27 to planners and other interested parties for use in predicting individual and fleet power output generation. The data feeds 29a-c from the various sources of solar irradiance data need not be high speed connections; rather, the solar irradiance measurements can be obtained at an input data collection rate and application of the methodology described herein provides the generation of an output time series at any time resolution, even faster than the input time resolution. The computer system 21 includes hardware components found in a general purpose programmable computing device, such as a central processing unit, memory, user interfacing means, such as a keyboard, mouse, and display, input/output ports, network interface, and non-volatile storage, and execute software programs structured into routines, functions, and modules for execution on the various systems. In addition, other configurations of computational resources, whether provided as a dedicated system or arranged in client-server or peer-to-peer topologies, and including unitary or distributed processing, communications, storage, and user interfacing, are possible.

The detailed steps performed as part of the methodology described supra with reference to FIG. 1 will now be described.

Obtain Time Series Irradiance Data

The first step is to obtain time series irradiance data from representative locations. This data can be obtained from ground-based weather stations, existing photovoltaic systems, a satellite network, or some combination sources, as well as from other sources. The solar irradiance data is collected from several sample locations across the geographic region that encompasses the photovoltaic fleet.

Direct irradiance data can be obtained by collecting weather data from ground-based monitoring systems. FIG. 3 is a graph depicting, by way of example, ten hours of time series irradiance data collected from a ground-based weather station with 10-second resolution, that is, the time interval equals ten seconds. In the graph, the blue line 32 is the measured horizontal irradiance and the black line 31 is the calculated clear sky horizontal irradiance for the location of the weather station.

Irradiance data can also be inferred from select photovoltaic systems using their electrical power output measurements. A performance model for each photovoltaic system is first identified, and the input solar irradiance corresponding to the power output is determined.

Finally, satellite-based irradiance data can also be used. As satellite imagery data is pixel-based, the data for the geographic region is provided as a set of pixels, which span across the region and encompassing the photovoltaic fleet.

Calculate Irradiance Statistics

The time series irradiance data for each location is then converted into time series clearness index data, which is then used to calculate irradiance statistics, as described infra.

Clearness Index (Kt)

Figure 4:
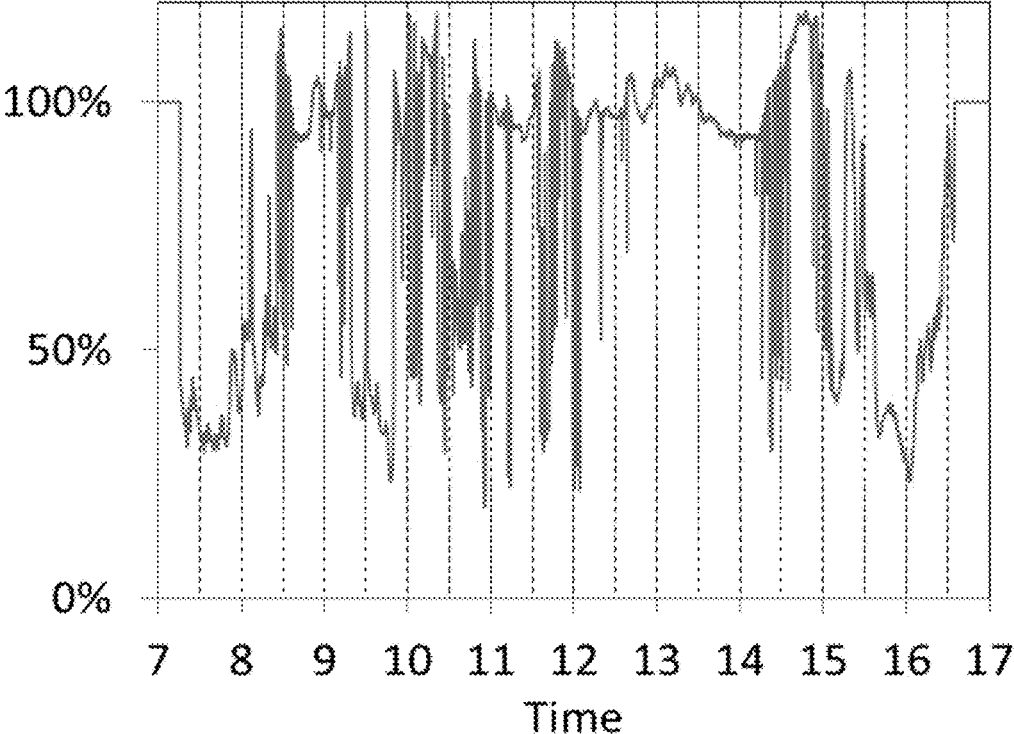
FIG. 4 is a graph depicting, by way of example, the clearness index that corresponds to the irradiance data presented in FIG. 3.

The clearness index (Kt) is calculated for each observation in the data set. In the case of an irradiance data set, the clearness index is determined by dividing the measured global horizontal irradiance by the clear sky global horizontal irradiance, may be obtained from any of a variety of analytical methods. FIG. 4 is a graph depicting, by way of example, the clearness index that corresponds to the irradiance data presented in FIG. 3. Calculation of the clearness index as described herein is also generally applicable to other expressions of irradiance and cloudy conditions, including global horizontal and direct normal irradiance.

Change in Clearness Index (ΔKt)

Figure 5:
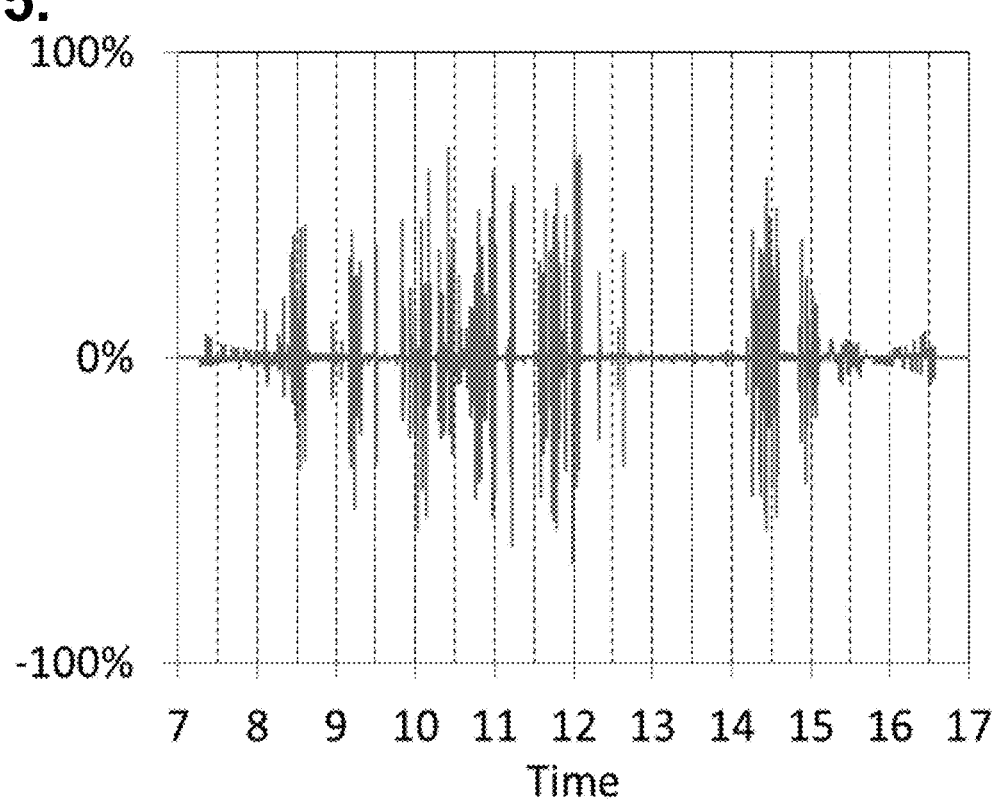
FIG. 5 is a graph depicting, by way of example, the change in clearness index that corresponds to the clearness index presented in FIG. 4.

The change in clearness index (ΔKt) over a time increment of Δt is the difference between the clearness index starting at the beginning of a time increment t and the clearness index starting at the beginning of a time increment t, plus a time increment Δt. FIG. 5 is a graph depicting, by way of example, the change in clearness index that corresponds to the clearness index presented in FIG. 4.

Time Period

The time series data set is next divided into time periods, for instance, from five to sixty minutes, over which statistical calculations are performed. The determination of time period is selected depending upon the end use of the power output data and the time resolution of the input data. For example, if fleet variability statistics are to be used to schedule regulation reserves on a 30-minute basis, the time period could be selected as 30 minutes. The time period must be long enough to contain a sufficient number of sample observations, as defined by the data time interval, yet be short enough to be usable in the application of interest. An empirical investigation may be required to determine the optimal time period as appropriate.

Fundamental Statistics

Table 1 lists the irradiance statistics calculated from time series data for each time period at each location in the geographic region. Note that time period and location subscripts are not included for each statistic for purposes of notational simplicity.

TABLE 1

| Statistic | Variable |
|---|---|
| Mean clearness index | $\mu_{Kt}$ |
| Variance clearness index | $\sigma^2_{Kt}$ |
| Mean clearness index change | $\mu_{\Delta Kt}$ |
| Variance clearness index change | $\sigma^2_{\Delta Kt}$ |

Table 2 lists sample clearness index time series data and associated irradiance statistics over five-minute time periods. The data is based on time series clearness index data that has a one-minute time interval. The analysis was performed over a five-minute time period. Note that the clearness index at 12:06 is only used to calculate the clearness index change and not to calculate the irradiance statistics.

TABLE 2

| | Clearness Index (Kt) | Clearness Index Change (ΔKt) |
|---|---|---|
| 12:00 | 50% | 40% |
| 12:01 | 90% | 0% |
| 12:02 | 90% | −80% |
| 12:03 | 10% | 0% |
| 12:04 | 10% | 80% |
| 12:05 | 90% | −40% |
| 12:06 | 50% | |
| Mean (μ) | 57% | 0% |
| Variance (σ²) | 13% | 27% |

The mean clearness index change equals the first clearness index in the succeeding time period, minus the first clearness index in the current time period divided by the number of time intervals in the time period. The mean clearness index change equals zero when these two values are the same. The mean is small when there are a sufficient number of time intervals. Furthermore, the mean is small relative to the clearness index change variance. To simplify the analysis, the mean clearness index change is assumed to equal zero for all time periods.

Figure 6:
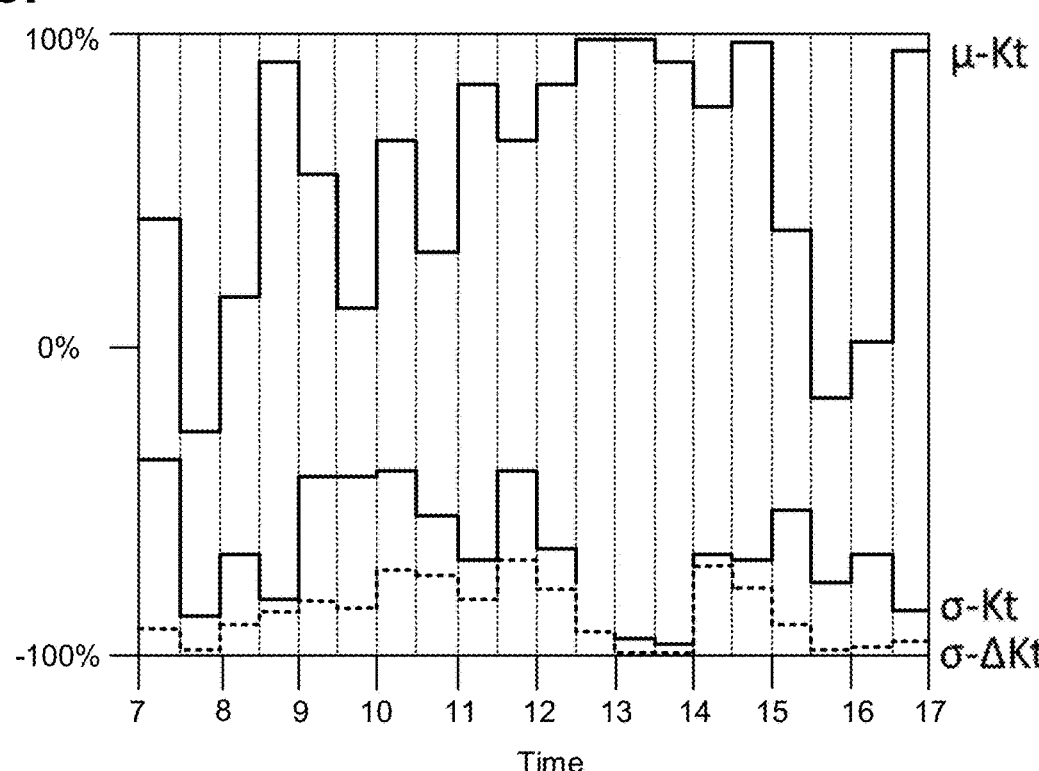
FIG. 6 is a graph depicting, by way of example, the irradiance statistics that correspond to the clearness index in FIG. 4 and the change in clearness index in FIG. 5.

FIG. 6 is a graph depicting, by way of example, the irradiance statistics that correspond to the clearness index in FIG. 4 and the change in clearness index in FIG. 5 using a half-hour hour time period. Note that FIG. 6 presents the standard deviations, determined as the square root of the variance, rather than the variances, to present the standard deviations in terms that are comparable to the mean.

Calculate Fleet Irradiance Statistics

Irradiance statistics were calculated in the previous section for the data stream at each sample location in the geographic region. The meaning of these statistics, however, depends upon the data source. Irradiance statistics calculated from a ground-based weather station data represent results for a specific geographical location as point statistics. Irradiance statistics calculated from satellite data represent results for a region as area statistics. For example, if a satellite pixel corresponds to a one square kilometer grid, then the results represent the irradiance statistics across a physical area one kilometer square.

Average irradiance statistics across the photovoltaic fleet region are a critical part of the methodology described herein. This section presents the steps to combine the statistical results for individual locations and calculate average irradiance statistics for the region as a whole. The steps differ depending upon whether point statistics or area statistics are used.

Irradiance statistics derived from ground-based sources simply need to be averaged to form the average irradiance statistics across the photovoltaic fleet region. Irradiance statistics from satellite sources are first converted from irradiance statistics for an area into irradiance statistics for an average point within the pixel. The average point statistics are then averaged across all satellite pixels to determine the average across the photovoltaic fleet region.

Mean Clearness Index ($\mu_{\overline{Kt}}$) and Mean Change in
Clearness Index ($\mu_{\overline{\Delta Kt}}$)

The mean clearness index should be averaged no matter what input data source is used, whether ground, satellite, or photovoltaic system originated data. If there are N locations, then the average clearness index across the photovoltaic fleet region is calculated as follows.

$$\mu_{\overline{Kt}} = \sum_{i=1}^{N} \frac{\mu_{Kt_i}}{N} \tag{1}$$

The mean change in clearness index for any period is assumed to be zero. As a result, the mean change in clearness index for the region is also zero.

$$\mu_{\overline{\Delta Kt}}=0 \tag{2}$$

Convert Area Variance to Point Variance

The following calculations are required if satellite data is used as the source of irradiance data. Satellite observations represent values averaged across the area of the pixel, rather than single point observations. The clearness index derived from this data ($Kt^{Area}$) may therefore be considered an average of many individual point measurements.

$$Kt^{Area} = \sum_{i=1}^{N} \frac{Kt^i}{N} \tag{3}$$

14

As a result, the variance of the area clearness index based on satellite data can be expressed as the variance of the average clearness indexes across all locations within the satellite pixel.

$$\sigma^2_{Kt-Area} = \text{VAR}[Kt^{Area}] = \text{VAR}\left[\sum_{i=1}^{N} \frac{Kt^i}{N}\right] \tag{4}$$

The variance of a sum, however, equals the sum of the covariance matrix.

$$\sigma^2_{Kt-Area} = \left(\frac{1}{N^2}\right)\sum_{i=1}^{N}\sum_{j=1}^{N}\text{COV}[Kt^i, Kt^j] \tag{5}$$

Let $\rho^{Kt^i,Kt^j}$ represents the correlation coefficient between the clearness index at location i and location j within the satellite pixel. By definition of correlation coefficient, $$COV[Kt^i, Kt^j] = \sigma^i_{Kt}\sigma^j_{Kt}\rho^{Kt^i,Kt^j}.$$

Furthermore, since the objective is to determine the average point variance across the satellite pixel, the standard deviation at any point within the satellite pixel can be assumed to be the same and equals $\sigma_{Kt}$, which means that $$\sigma^i_{Kt}\sigma^j_{Kt} = \sigma^2_{Kt}$$

for all location pairs. As a result, $$COV[Kt^i, Kt^j] = \sigma^2_{Kt}\rho^{Kt^i,Kt^j}.$$

Substituting this result into Equation (5) and simplify.

$$\sigma^2_{Kt-Area} = \sigma^2_{Kt}\left(\frac{1}{N^2}\right)\sum_{i=1}^{N}\sum_{j=1}^{N}\rho^{Kt^iKt^j} \tag{6}$$

Suppose that data was available to calculate the correlation coefficient in Equation (6). The computational effort required to perform a double summation for many points can be quite large and computationally resource intensive. For example, a satellite pixel representing a one square kilometer area contains one million square meter increments. With one million increments, Equation (6) would require one trillion calculations to compute.

The calculation can be simplified by conversion into a continuous probability density function of distances between location pairs across the pixel and the correlation coefficient for that given distance, as further described supra. Thus, the irradiance statistics for a specific satellite pixel, that is, an area statistic, rather than a point statistics, can be converted into the irradiance statistics at an average point within that pixel by dividing by a "Area" term (A), which corresponds to the area of the satellite pixel. Furthermore, the probability density function and correlation coefficient functions are generally assumed to be the same for all pixels within the fleet region, making the value of A constant for all pixels and reducing the computational burden further. Details as to how to calculate A are also further described supra.

$$\sigma^2_{Kt} = \frac{\sigma^2_{Kt-Area}}{A^{Satellite\ Pixel}_{Kt}} \tag{7}$$

where:

$$A^{Satellite\ Pixel}_{Kt} = \left(\frac{1}{N^2}\right)\sum_{i=1}^{N}\sum_{j=1}^{N}\rho^{i,j} \tag{8}$$

Likewise, the change in clearness index variance across the satellite region can also be converted to an average point estimate using a similar conversion factor, $$A^{Area}_{\Delta Kt}.$$

$$\sigma^2_{\Delta Kt} = \frac{\sigma^2_{\Delta Kt-Area}}{A^{Satellite\ Pixel}_{\Delta Kt}} \tag{9}$$

Variance of Clearness Index $$\left(\sigma^2_{Kt}\right)$$

and Variance of Change in Clearness Index $$\left(\sigma^2_{\Delta Kt}\right)$$

At this point, the point statistics $$\left(\sigma^2_{Kt}\ and\ \sigma^2_{\Delta Kt}\right)$$

have been determined for each of several representative locations within the fleet region. These values may have been obtained from either ground-based point data or by converting satellite data from area into point statistics. If the fleet region is small, the variances calculated at each location i can be averaged to determine the average point variance across the fleet region. If there are N locations, then average variance of the clearness index across the photovoltaic fleet region is calculated as follows.

$$\sigma^2_{Kt} = \sum_{i=1}^{N}\frac{\sigma^2_{Kt_i}}{N} \tag{10}$$

Likewise, the variance of the clearness index change is calculated as follows.

$$\sigma^2_{\Delta Kt} = \sum_{i=1}^{N}\frac{\sigma^2_{\Delta Kt_i}}{N} \tag{11}$$

Calculate Fleet Power Statistics

The next step is to calculate photovoltaic fleet power statistics using the fleet irradiance statistics, as determined supra, and physical photovoltaic fleet configuration data. These fleet power statistics are derived from the irradiance statistics and have the same time period.

The critical photovoltaic fleet performance statistics that are of interest are the mean fleet power, the variance of the fleet power, and the variance of the change in fleet power over the desired time period. As in the case of irradiance statistics, the mean change in fleet power is assumed to be zero.

Photovoltaic System Power for Single System at
Time t

Photovoltaic system power output (kW) is approximately linearly related to the AC-rating of the photovoltaic system (R in units of $kW_{AC}$) times plane-of-array irradiance. Plane-of-array irradiance can be represented by the clearness index over the photovoltaic system (KtPV) times the clear sky global horizontal irradiance times an orientation factor (O), which both converts global horizontal irradiance to plane-of-array irradiance and has an embedded factor that converts irradiance from Watts/m² to kW output/kW of rating. Thus, at a specific point in time (t), the power output for a single photovoltaic system (n) equals:

$$P^n_t = R^n O^n_t KtPV^n_t I^{Clear,n}_t \tag{12}$$

The change in power equals the difference in power at two different points in time.

$$\Delta P^n_{t,\Delta t} = R^n O^n_{t+\Delta t} KtPV^n_{t+\Delta t} I^{Clear,n}_{t+\Delta t} - R^n O^n_t KtPV^n_t I^{Clear,n}_t \tag{13}$$

The rating is constant, and over a short time interval, the two clear sky plane-of-array irradiances are approximately the same $$\left(O^n_{t+\Delta t} I^{Clear,n}_{t+\Delta t} \approx O^n_t I^{Clear,n}_t\right),$$

so that the three terms can be factored out and the change in the clearness index remains.

$$\Delta P^n_{t,\Delta t} \approx R^n O^n_t I^{Clear,n}_t \Delta KtPV^n_t \tag{14}$$

Time Series Photovoltaic Power for Single System $P^n$ is a random variable that summarizes the power for a single photovoltaic system n over a set of times for a given time interval and set of time periods. $\Delta P^n$ is a random variable that summarizes the change in power over the same set of times.

Mean Fleet Power ($\mu_p$)

The mean power for the fleet of photovoltaic systems over the time period equals the expected value of the sum of the power output from all of the photovoltaic systems in the fleet.

$$\mu_P = E\left[\sum_{n=1}^{N} R^n O^n KtPV^n I^{Clear,n}\right] \quad (15)$$

If the time period is short and the region small, the clear sky irradiance does not change much and can be factored out of the expectation.

$$\mu_P = \mu_{fClear} E\left[\sum_{n=1}^{N} R^b O^n KtPV^n\right] \quad (16)$$

Again, if the time period is short and the region small, the clearness index can be averaged across the photovoltaic fleet region and any given orientation factor can be assumed to be a constant within the time period. The result is that:

$$\mu_P = R^{Adj.Fleet} \mu_{fClear} \mu_{\overline{Kt}} \quad (17)$$

where $\mu_{fClear}$ is calculated, $\mu_{\overline{Kt}}$ is taken from Equation (1) and:

$$R^{Adj.Fleet} = \sum_{n=1}^{N} R^n O^n \quad (18)$$

This value can also be expressed as the average power during clear sky conditions times the average clearness index across the region.

$$\mu_P = \mu_{PClear} \mu_{\overline{Kt}} \quad (19)$$

Variance of Fleet Power ($\sigma_P^2$)

The variance of the power from the photovoltaic fleet equals:

$$\sigma_P^2 = VAR\left[\sum_{n=1}^{N} R^n O^n KtPV^n I^{Clear,n}\right] \quad (20)$$

If the clear sky irradiance is the same for all systems, which will be the case when the region is small and the time period is short, then:

$$\sigma_P^2 = VAR\left[I^{Clear} \sum_{n=1}^{N} R^n O^n KtPV^n\right] \quad (21)$$

The variance of a product of two independent random variables X, Y, that is, VAR[XY]) equals $E[X]^2 VAR[Y] + E[Y]^2 VAR[X] + VAR[X] VAR[Y]$. If the X random variable has a large mean and small variance relative to the other terms, then $VAR[XY] \approx E[X]^2 VAR[Y]$. Thus, the clear sky irradiance can be factored out of Equation (21) and can be written as:

$$\sigma_P^2 = (\mu_{fCkear})^2 VAR\left[\sum_{n=1}^{N} R^n KtPV^n O^n\right] \quad (22)$$

The variance of a sum equals the sum of the covariance matrix.

$$\sigma_P^2 = (\mu_{fClear})^2 \left(\sum_{i=1}^{N}\sum_{j=1}^{N} COV\left[R^i KtPV^i O^i, R^j KtPV^j O^j\right]\right) \quad (23)$$

In addition, over a short time period, the factor to convert from clear sky GHI to clear sky POA does not vary much and becomes a constant. All four variables can be factored out of the covariance equation.

$$\sigma_P^2 = (\mu_{fClear})^2 \left(\sum_{i=1}^{N}\sum_{j=1}^{N} (R^i O^i)(R^j O^j) COV\left[KtPV^i, KtPV^j\right]\right) \quad (24)$$

For any i and j, $$COV\left[KtPV^i, KtPV^j\right] = \sqrt{\sigma^2_{KtPV^i}\sigma^2_{KtPV^j}}\ \rho^{Kt^i,Kt^j}.$$

$$\sigma_P^2 = (\mu_{fClear})^2 \left(\sum_{i=1}^{N}\sum_{j=1}^{N} (R^i O^i)(R^j O^j)\sqrt{\sigma^2_{KtPV^i}\sigma^2_{KtPV^j}}\ \rho^{Kt^i,Kt^j}\right) \quad (25)$$

As discussed supra, the variance of the satellite data required a conversion from the satellite area, that is, the area covered by a pixel, to an average point within the satellite area. In the same way, assuming a uniform clearness index across the region of the photovoltaic plant, the variance of the clearness index across a region the size of the photovoltaic plant within the fleet also needs to be adjusted. The same approach that was used to adjust the satellite clearness index can be used to adjust the photovoltaic clearness index. Thus, each variance needs to be adjusted to reflect the area that the $i^{th}$ photovoltaic plant covers.

$$\sigma^2_{KtPV^i} = A^i_{Kt}\sigma\frac{2}{Kt} \quad (26)$$

Substituting and then factoring the clearness index variance given the assumption that the average variance is constant across the region yields:

$$\sigma_P^2 = (R^{Adj,Fleet}\mu_{fClear})^2 P^{Kt}\sigma\frac{2}{Kt} \quad (27)$$

where the correlation matrix equals:

$$P^{Kt} = \frac{\sum_{i=1}^{N}\sum_{j=1}^{N}(R^i O^i A^i_{Kt})(R^j O^j A^j_{Kt})\rho^{Kt^i,Kt^j}}{\left(\sum_{n=1}^{N} R^n O^n\right)^2} \quad (28)$$

19

$R^{Adj.Fleet}\mu_{fClear}$ in Equation (27) can be written as the power produced by the photovoltaic fleet under clear sky conditions, that is:

$$\sigma_P^2 = \mu_{pClear}^2 P^{Kt} \sigma \frac{2}{Kt} \qquad (29)$$

If the region is large and the clearness index mean or variances vary substantially across the region, then the simplifications may not be able to be applied. Notwithstanding, if the simplification is inapplicable, the systems are likely located far enough away from each other, so as to be independent. In that case, the correlation coefficients between plants in different regions would be zero, so most of the terms in the summation are also zero and an inter-regional simplification can be made. The variance and mean then become the weighted average values based on regional photovoltaic capacity and orientation.

Discussion

In Equation (28), the correlation matrix term embeds the effect of intra-plant and inter-plant geographic diversification. The area-related terms (A) inside the summations reflect the intra-plant power smoothing that takes place in a large plant and may be calculated using the simplified relationship, as further discussed supra. These terms are then weighted by the effective plant output at the time, that is, the rating adjusted for orientation. The multiplication of these terms with the correlation coefficients reflects the inter-plant smoothing due to the separation of photovoltaic systems from one another.

Variance of Change in Fleet Power $$(\sigma_{\Delta P}^2)$$

A similar approach can be used to show that the variance of the change in power equals:

$$\sigma_{\Delta P}^2 = \mu_{pClear}^2 P^{\Delta Kt} \sigma \frac{2}{\Delta Kt} \qquad (30)$$

where:

$$P^{\Delta Kt} = \frac{\sum_{i=1}^{N} \sum_{j=1}^{N} (R^i O^i A_{\Delta Kt}^i)(R^j O^j A_{\Delta Kt}^j) \rho^{\Delta Kt^i, \Delta Kt^j}}{\left(\sum_{n=1}^{N} R^n O^n\right)^2} \qquad (31)$$

The determination of Equations (30) and (31) becomes computationally intensive as the network of points becomes large. For example, a network with 10,000 photovoltaic systems would require the computation of a correlation coefficient matrix with 100 million calculations. The computational burden can be reduced in two ways. First, many of the terms in the matrix are zero because the photovoltaic systems are located too far away from each other. Thus, the double summation portion of the calculation can be simplified to eliminate zero values based on distance between locations by construction of a grid of points. Second, once the simplification has been made, rather than calculating the matrix on-the-fly for every time period, the matrix can be calculated once at the beginning of the analysis for a variety of cloud speed conditions, and then the analysis would simply require a lookup of the appropriate value.

Time Lag Correlation Coefficient

The next step is to adjust the photovoltaic fleet power statistics from the input time interval to the desired output time interval. For example, the time series data may have been collected and stored every 60 seconds. The user of the results, however, may want to have photovoltaic fleet power statistics at a 10-second rate. This adjustment is made using the time lag correlation coefficient.

The time lag correlation coefficient reflects the relationship between fleet power and that same fleet power starting one time interval ($\Delta t$) later. Specifically, the time lag correlation coefficient is defined as follows:

$$\rho^{P,P^{\Delta t}} = \frac{COV[P, P^{\Delta t}]}{\sqrt{\sigma_P^2 \sigma_{P^{\Delta t}}^2}} \qquad (32)$$

The assumption that the mean clearness index change equals zero implies that $$\sigma_{P^{\Delta t}}^2 = \sigma_P^2.$$

Given a non-zero variance of power, this assumption can also be used to show that $$\frac{COV[P, P^{\Delta t}]}{\sigma_P^2} = 1 - \frac{\sigma_{\Delta P}^2}{2\sigma_P^2}. \text{ Therefore: } \rho^{P,P^{\Delta t}} = 1 - \frac{\sigma_{\Delta P}^2}{2\sigma_P^2} \qquad (33)$$

This relationship illustrates how the time lag correlation coefficient for the time interval associated with the data collection rate is completely defined in terms of fleet power statistics already calculated. A more detailed derivation is described infra.

Equation (33) can be stated completely in terms of the photovoltaic fleet configuration and the fleet region clearness index statistics by substituting Equations (29) and (30). Specifically, the time lag correlation coefficient can be stated entirely in terms of photovoltaic fleet configuration, the variance of the clearness index, and the variance of the change in the clearness index associated with the time increment of the input data.

$$\rho^{P,P^{\Delta t}} = 1 - \frac{P^{\Delta Kt} \sigma \frac{2}{\Delta Kt}}{2 P^{Kt} \sigma \frac{2}{Kt}} \qquad (34)$$

Generate High-Speed Time Series Photovoltaic Fleet Power

The final step is to generate high-speed time series photovoltaic fleet power data based on irradiance statistics, photovoltaic fleet configuration, and the time lag correlation coefficient. This step is to construct time series photovoltaic fleet production from statistical measures over the desired time period, for instance, at half-hour output intervals.

A joint probability distribution function is required for this step. The bivariate probability density function of two unit normal random variables (X and Y) with a correlation coefficient of $\rho$ equals:

$$f(x, y) = \frac{1}{2\pi\sqrt{1-\rho^2}}\exp\left[-\frac{(x^2 + y^2 - 2\rho xy)}{2(1-\rho^2)}\right] \qquad (35)$$

The single variable probability density function for a unit normal random variable X alone is $$(x) = \frac{1}{\sqrt{2\pi}}\exp\left(-\frac{x^2}{2}\right).$$

In addition, a conditional distribution for y can be calculated based on a known x by dividing the bivariate probability density function by the single variable probability density, that is, $$f(y \mid x) = \frac{f(x, y)}{f(x)}.$$

Making the appropriate substitutions, the result is that the conditional distribution of y based on a known x equals:

$$f(y \mid x) = \frac{1}{\sqrt{2\pi}\sqrt{1-\rho^2}}\exp\left[-\frac{(y - \rho x)^2}{2(1-\rho^2)}\right] \qquad (36)$$

Define a random variable $$Z = \frac{Y - \rho x}{\sqrt{1-\rho^2}}$$

and substitute into Equation (36). The result is that the conditional probability of z given a known x equals:

$$f(z \mid x) = \frac{1}{\sqrt{2\pi}}\exp\left(-\frac{z^2}{2}\right) \qquad (37)$$

The cumulative distribution function for Z can be denoted by $\Phi(z^*)$, where $z^*$ represents a specific value for z. The result equals a probability (p) that ranges between 0 (when $z^*=-\infty$) and 1 (when $z^*=\infty$). The function represents the cumulative probability that any value of z is less than $z^*$, as determined by a computer program or value lookup.

$$p = \Phi(z^*) = \frac{1}{\sqrt{2\pi}}\int_{-\infty}^{z^*}\exp\left(-\frac{z^2}{2}\right)dz \qquad (38)$$

Rather than selecting $z^*$, however, a probability p falling between 0 and 1 can be selected and the corresponding $z^*$ that results in this probability found, which can be accomplished by taking the inverse of the cumulative distribution function.

$$\Phi^{-1}(p) = z^* \qquad (39)$$

Substituting back for z as defined above results in:

$$\Phi^{-1}(p) = \frac{y - \rho x}{\sqrt{1-\rho^2}} \qquad (40)$$

Now, let the random variables equal $$X = \frac{P - \mu_P}{\sigma_P} \text{ and } Y = \frac{P^{\Delta t} - \mu_{P^{\Delta t}}}{\sigma_{P^{\Delta t}}},$$

with the correlation coefficient being the time lag correlation coefficient between P and $P^{\Delta t}$, that is, let $\rho = \rho^{P,P^{\Delta t}}$. When $\Delta t$ is small, then the mean and standard deviations for $P^{\Delta t}$ are approximately equal to the mean and standard deviation for P. Thus, Y can be restated as $$Y \approx \frac{P^{\Delta t} - \mu_P}{\sigma_P}.$$

Add a time subscript to all of the relevant data to represent a specific point in time and substitute x, y, and $\rho$ into Equation (40).

$$\Phi^{-1}(p) = \frac{\left(\frac{P_t^{\Delta t} - \mu_P}{\sigma_P}\right) - \rho^{P,P^{\Delta t}}\left(\frac{P_t - \mu_P}{\sigma_P}\right)}{\sqrt{1 - \rho^{P,P^{\Delta t}^2}}} \qquad (41)$$

The random variable $P^{\Delta t}$, however, is simply the random variable P shifted in time by a time interval of $\Delta t$. As a result, at any given time t, $P^{\Delta t}_t = P_{t+\Delta t}$. Make this substitution into Equation (41) and solve in terms of $P_{t+\Delta t}$.

$$P_{t+\Delta t} = \rho^{P,P^{\Delta t}}P_t + \left(1 - \rho^{P,P^{\Delta t}}\right)\mu_P + \sqrt{\sigma_P^2\left(1 - \rho^{P,P^{\Delta t}^2}\right)}\Phi^{-1}(p) \qquad (42)$$

At any given time, photovoltaic fleet power equals photovoltaic fleet power under clear sky conditions times the average regional clearness index, that is, $$P_t = P_t^{Clear}Kt_t.$$

In addition, over a short time period, $$\mu_P \approx P_t^{Clear}\mu_{\overline{Kt}} \text{ and } \sigma_P^2 \approx \left(P_t^{Clear}\right)^2 P^{Kt}\sigma_{\frac{2}{Kt}}.$$

US 12,619,801 B2

23

Substitute these three relationships into Equation (42) and factor out photovoltaic fleet power under clear sky conditions ($P_t^{Clear}$) as common to all three terms.

$$P_{t+\Delta t} = P_t^{Clear}\left[\rho^{P,P^{\Delta t}}Kt_t + \left(1-\rho^{P,P^{\Delta t}}\right)\mu_{\overline{Kt}} + \sqrt{P^{Kt}\sigma\frac{2}{Kt}\left(1-\rho^{P,P^{\Delta t^2}}\right)}\Phi^{-1}(p_t)\right]$$ (43)

Equation (43) provides an iterative method to generate high-speed time series photovoltaic production data for a fleet of photovoltaic systems. At each time step (t+Δt), the power delivered by the fleet of photovoltaic systems ($P_{t+\Delta t}$) is calculated using input values from time step t. Thus, a time series of power outputs can be created. The inputs include:

$$P_t^{Clear}$$

—photovoltaic fleet power during clear sky conditions calculated using a photovoltaic simulation program and clear sky irradiance.

Kt$_t$—average regional clearness index inferred based on $P_t$ calculated in time step t, that is, $Kt_t=P_t/P_t^{Clear}$.

$\mu_{\overline{Kt}}$—mean clearness index calculated using time series irradiance data and Equation (1).

$$\sigma\frac{2}{Kt}$$

—variance of the clearness index calculated using time series irradiance data and Equation (10).

$\rho^{P,P^{\Delta t}}$—fleet configuration as reflected in the time lag correlation coefficient calculated using Equation (34). In turn, Equation (34), relies upon correlation coefficients from Equations (28) and (31). A method to obtain these correlation coefficients by empirical means is described in commonly-assigned U.S. Pat. No. 8,165, 811, issued Apr. 24, 2012, and U.S. Pat. No. 8,165,813, issued Apr. 24, 2012, the disclosure of which are incorporated by reference.

$P^{Kt}$—fleet configuration as reflected in the clearness index correlation coefficient matrix calculated using Equation (28) where, again, the correlation coefficients may be obtained using the empirical results as further described infra.

$\Phi^{-1}(p_t)$—the inverse cumulative normal distribution function based on a random variable between 0 and 1.

Discussion

The point-to-point correlation coefficients calculated using the empirical forms described supra refer to the locations of specific photovoltaic power production sites. Importantly, note that the data used to calculate these coefficients was not obtained from time sequence measurements taken at the points themselves. Rather, the coefficients were calculated from fleet-level data (cloud speed), fixed fleet data (distances between points), and user-specified data (time interval).

The empirical relationships of the foregoing types of empirical relationships may be used to rapidly compute the coefficients that are then used in the fundamental mathematical relationships. The methodology does not require that these specific empirical models be used and improved models will become available in the future with additional data and analysis.

Probability Density Function

The conversion from area statistics to point statistics relied upon two terms $A_{Kt}$ and $A_{\Delta Kt}$ to calculate $$\sigma_{Kt}^2 \text{ and } \sigma_{\Delta Kt}^2,$$

respectively. This section considers these terms in more detail. For simplicity, the methodology supra applies to both Kt and ΔKt, so this notation is dropped. Understand that the correlation coefficient $\rho^{i,j}$ could refer to either the correlation coefficient for clearness index or the correlation coefficient for the change in clearness index, depending upon context. Thus, the problem at hand is to evaluate the following relationship:

$$A = \left(\frac{1}{N^2}\right)\sum_{i=1}^{N}\sum_{j=1}^{N}\rho^{i,j}$$ (44)

The computational effort required to calculate the correlation coefficient matrix can be substantial. For example, suppose that the one wants to evaluate variance of the sum of points within a 1 square kilometer satellite region by breaking the region into one million square meters (1,000 meters by 1,000 meters). The complete calculation of this matrix requires the examination of 1 trillion ($10^{12}$) location pair combinations.

Discrete Formulation

The calculation can be simplified using the observation that many of the terms in the correlation coefficient matrix are identical. For example, the covariance between any of the one million points and themselves is 1. This observation can be used to show that, in the case of a rectangular region that has dimension of H by W points (total of N) and the capacity is equal distributed across all parts of the region that:

$$\left(\frac{1}{N^2}\right)\sum_{i=1}^{N}\sum_{j=1}^{N}\rho^{i,j} =$$ (45)

$$\left(\frac{1}{N^2}\right)\left[\sum_{i=0}^{H-1}\sum_{j=0}^{i}2^k[(H-i)(W-j)]\rho^d + \sum_{i=0}^{W-1}\sum_{j=0}^{i}2^k[(W-i)(H-j)]\rho^d\right]$$

where:

-1, when i = 0 and j = 0 k = 1, when j = 0 or j = i 2, when 0 < j < i

When the region is a square, a further simplification can be made.

$$\left(\frac{1}{N^2}\right)\sum_{i=1}^{N}\sum_{j=1}^{N}\rho^{i,j} = \left(\frac{1}{N^2}\right)\left[\sum_{i=0}^{\sqrt{N}-1}\sum_{j=0}^{i}2^k(\sqrt{N}-i)(\sqrt{N}-j)\rho^d\right] \quad (46)$$

where: 0, when $i = 0$ and $j = 0$ $k = 2$, when $j = 0$ or $j = i$, and 3, when $0 < j < i$ $$d = \left(\sqrt{i^2+j^2}\right)\left(\frac{\sqrt{Area}}{\sqrt{N}-1}\right).$$

The benefit of Equation (46) is that there are $$\frac{N-\sqrt{N}}{2}$$

rather than $N^2$ unique combinations that need to be evaluated. In the example above, rather than requiring one trillion possible combinations, the calculation is reduced to one-half million possible combinations.

Continuous Formulation

Even given this simplification, however, the problem is still computationally daunting, especially if the computation needs to be performed repeatedly in the time series. Therefore, the problem can be restated as a continuous formulation in which case a proposed correlation function may be used to simplify the calculation. The only variable that changes in the correlation coefficient between any of the location pairs is the distance between the two locations; all other variables are the same for a given calculation. As a result, Equation (46) can be interpreted as the combination of two factors: the probability density function for a given distance occurring and the correlation coefficient at the specific distance.

Figure 7:
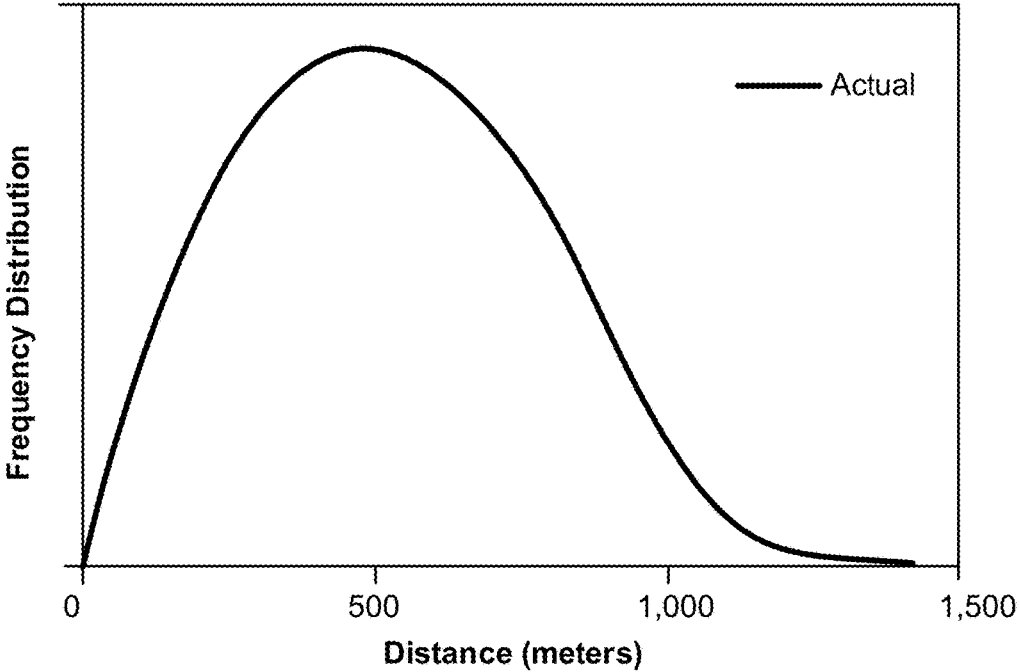
FIG. 7 is a graph depicting, by way of example, an actual probability distribution for a given distance between two pairs of locations, as calculated for a 1,000 meter×1,000 meter grid in one square meter increments.

Consider the probability density function. The actual probability of a given distance between two pairs occurring was calculated for a 1,000 meter×1,000 meter grid in one square meter increments. The evaluation of one trillion location pair combination possibilities was evaluated using Equation (44) and by eliminating the correlation coefficient from the equation. FIG. 7 is a graph depicting, by way of example, an actual probability distribution for a given distance between two pairs of locations, as calculated for a 1,000 meter×1,000 meter grid in one square meter increments.

The probability distribution suggests that a continuous approach can be taken, where the goal is to find the probability density function based on the distance, such that the integral of the probability density function times the correlation coefficient function equals:

$$A = \int f(D)\rho(d)dD \quad (47)$$

An analysis of the shape of the curve shown in FIG. 7 suggests that the distribution can be approximated through the use of two probability density functions. The first probability density function is a quadratic function that is valid between 0 and $\sqrt{Area}$.

$$f_{Quad} = \begin{cases} \left(\frac{6}{Area}\right)\left(D - \frac{D^2}{\sqrt{Area}}\right) & \text{for } 0 \le D \le \sqrt{Area} \\ 0 & \text{for } D > \sqrt{Area} \end{cases} \quad (48)$$

This function is a probability density function because integrating between 0 and $\sqrt{Area}$ equals 1, that is, $$P\left[0 \le D \le \sqrt{Area}\right] = \int_0^{\sqrt{Area}} f_{Quad}.dD = 1.$$

The second function is a normal distribution with a mean of $\sqrt{Area}$ and standard deviation of $0.1\sqrt{Area}$.

$$f_{Norm} = \left(\frac{1}{0.1*\sqrt{Area}}\right)\left(\frac{1}{\sqrt{2\pi}}\right)e^{-\left(\frac{1}{2}\right)\left(\frac{D-\sqrt{Area}}{0.1*\sqrt{Area}}\right)^2} \quad (49)$$

Likewise, integrating across all values equals 1.

To construct the desired probability density function, take, for instance, 94 percent of the quadratic density function plus 6 of the normal density function.

$$f = 0.94\int_0^{\sqrt{Area}} f_{Quad}dD + 0.06\int_{-\infty}^{+\infty} f_{Norm}dD \quad (50)$$

Figure 8:
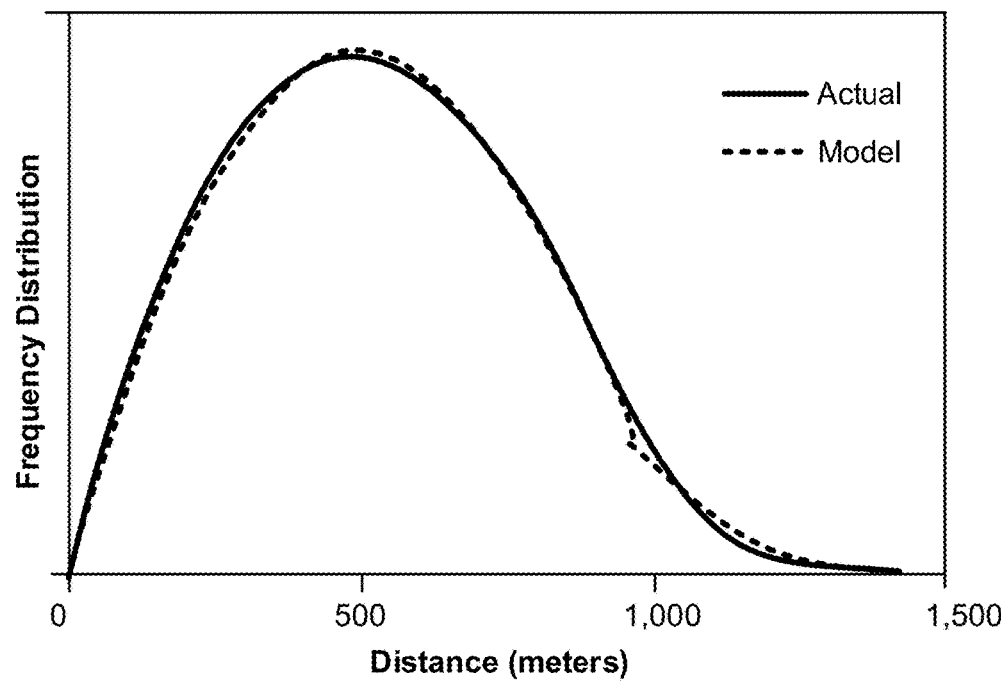
FIG. 8 is a graph depicting, by way of example, a matching of the resulting model to an actual distribution.

FIG. 8 is a graph depicting, by way of example, a matching of the resulting model to an actual distribution.

The result is that the correlation matrix of a square area with uniform point distribution as N gets large can be expressed as follows, first dropping the subscript on the variance since this equation will work for both Kt and ΔKt.

$$A \approx \left[0.94\int_0^{\sqrt{Area}} f_{Quad}\rho(D)dD + 0.06\int_{-\infty}^{+\infty} f_{Norm}\rho(D)dD\right] \quad (51)$$

where $\rho(D)$ is a function that expresses the correlation coefficient as a function of distance (D).

Area to Point Conversion Using Exponential Correlation Coefficient

Equation (51) simplifies the problem of calculating the correlation coefficient and can be implemented numerically once the correlation coefficient function is known. This section demonstrates how a closed form solution can be provided, if the functional form of the correlation coefficient function is exponential.

An exponentially decaying function can be taken as a suitable form for the correlation coefficient function. Assume that the functional form of correlation coefficient function equals:

$$\rho(D) = e^{\frac{xD}{\sqrt{Area}}} \quad (52)$$

Let Quad be the solution to $$\int_0^{\sqrt{Area}} f_{Quad.}\rho(D)dD. \tag{53}$$

Quad =

$$\int_0^{\sqrt{Area}} f_{Quad}\rho(D)dD = \left(\frac{6}{Area}\right)\int_0^{\sqrt{Area}} \left(D - \frac{D^2}{\sqrt{Area}}\right)\left[e^{\frac{xD}{\sqrt{Area}}}\right]dD \tag{54}$$

Integrate to solve.

Quad =

$$(6)\left[\left(\frac{x}{\sqrt{Area}}D - 1\right)e^{\frac{xD}{\sqrt{Area}}} - \left(\left(\frac{x}{\sqrt{Area}}\right)^2 D^2 - 2\frac{x}{\sqrt{Area}}D + 2\right)e^{\frac{xD}{\sqrt{Area}}}\right]$$

Complete the result by evaluating at D equal to $\sqrt{Area}$ for the upper bound and 0 for the lower bound. The result is:

$$Quad = \left(\frac{6}{x^3}\right)[(x-2)(e^x + 1) + 4] \tag{55}$$

Next, consider the solution to $\int_{-\infty}^{+\infty} f_{Norm.}\rho(D)dD$, which will be called Norm.

$$Norm = \left(\frac{1}{\sigma}\right)\left(\frac{1}{\sqrt{2\pi}}\right)\int_{-\infty}^{+\infty} e^{-\left(\frac{1}{2}\right)\left(\frac{D-\mu}{\sigma}\right)^2} e^{\frac{xD}{\sqrt{Area}}} dD \tag{56}$$

where $\mu = \sqrt{Area}$ and $\sigma = 0.1\sqrt{Area}$. Simplifying:

$$Norm = \left[e^{\frac{x}{\sqrt{Area}}\left(\mu + \frac{1}{2}\frac{x}{\sqrt{Area}}\sigma^2\right)}\right] \tag{57}$$

$$\left(\frac{1}{\sigma}\right)\left(\frac{1}{\sqrt{2\pi}}\right)\int_{-\infty}^{+\infty} e^{-\left(\frac{1}{2}\right)\left[\frac{D-\left(\mu + \frac{x}{\sqrt{Area}}\sigma^2\right)}{\sigma}\right]^2} dD$$

Substitute $$z = \frac{D - \left(\mu + \frac{x}{\sqrt{Area}}\sigma^2\right)}{\sigma} \text{ and } \sigma dz = dD. \tag{58}$$

$$Norm = \left[e^{\frac{x}{\sqrt{Area}}\left(\mu + \frac{1}{2}\frac{x}{\sqrt{Area}}\sigma^2\right)}\right]\left(\frac{1}{\sqrt{2\pi}}\right)\int_{-\infty}^{+\infty} e^{-\left(\frac{1}{2}\right)z^2} dz$$

Integrate and solve.

$$Norm = e^{\frac{x}{\sqrt{Area}}\left(\mu + \frac{1}{2}\frac{x}{\sqrt{Area}}\sigma^2\right)} \tag{59}$$

Substitute the mean of $\sqrt{Area}$ and the standard deviation of $0.1\sqrt{Area}$ into Equation (51).

$$Norm = e^{x(1+0.005x)} \tag{60}$$

Substitute the solutions for Quad and Norm back into Equation (51). The result is the ratio of the area variance to the average point variance. This ratio was referred to as A (with the appropriate subscripts and superscripts) supra.

$$A = 0.94\left(\frac{6}{x^3}\right)[(x-2)(e^x + 1) + 4] + 0.06e^{x(1+0.005x)} \tag{61}$$

Time Lag Correlation Coefficient

This section presents an alternative approach to deriving the time lag correlation coefficient. The variance of the sum of the change in the clearness index equals:

$$\sigma^2_{\sum \Delta Kt} = VAR\left[\sum\left(Kt^{\Delta t} - Kt\right)\right] \tag{62}$$

where the summation is over N locations. This value and the corresponding subscripts have been excluded for purposes of notational simplicity.

Divide the summation into two parts and add several constants to the equation:

$$\sigma^2_{\sum \Delta Kt} = VAR\left[\sigma_{\sum Kt^{\Delta t}}\left(\frac{\sum Kt^{\Delta t}}{\sigma_{\sum Kt^{\Delta t}}}\right) - \sigma_{\sum Kt}\left(\frac{\sum Kt}{\sigma_{\sum Kt}}\right)\right] \tag{63}$$

Since $\sigma_{\sum Kt^{\Delta t}} \approx \sigma_{\sum Kt}$ (or $\sigma_{\sum Kt^{\Delta t}} = \sigma_{\sum Kt}$ if the first term in Kt and the last term in $K_t^{\Delta t}$ are the same):

$$\sigma^2_{\sum \Delta Kt} = \sigma^2_{\sum Kt} VAR\left[\frac{\sum Kt^{\Delta t}}{\sigma_{\sum Kt^{\Delta t}}} - \frac{\sum Kt}{\sigma_{\sum Kt}}\right] \tag{64}$$

The variance term can be expanded as follows:

$$\sigma^2_{\sum \Delta Kt} = \tag{65}$$

$$\sigma^2_{\sum Kt}\left\{\frac{VAR\left[\sum Kt^{\Delta t}\right]}{\sigma^2_{\sum Kt^{\Delta t}}} + \frac{VAR\left[\sum Kt\right]}{\sigma^2_{\sum Kt}} - \frac{2COV\left[\sum Kt, \sum Kt^{\Delta t}\right]}{\sigma_{\sum Kt}\sigma_{\sum Kt^{\Delta t}}}\right\}$$

Since $COV[\sum Kt, \sum Kt^{\Delta t}] = \sigma_{\sum Kt}\sigma_{\sum Kt^{\Delta t}}\rho^{\sum Kt, \sum Kt^{\Delta t}}$, the first two terms equal one and the covariance term is replaced by the correlation coefficient.

$$\sigma^2_{\sum \Delta Kt} = 2\sigma^2_{\sum Kt}\left(1 - \rho^{\sum Kt, \sum Kt^{\Delta t}}\right) \tag{66}$$

This expression rearranges to:

$$\rho^{\sum Kt, \sum Kt^{\Delta t}} = 1 - \frac{1}{2}\frac{\sigma^2_{\sum \Delta Kt}}{\sigma^2_{\sum Kt}} \tag{67}$$

Assume that all photovoltaic plant ratings, orientations, and area adjustments equal to one, calculate statistics for the clearness alone using the equations described supra and then substitute. The result is:

$$\rho^{\Sigma Kt, \sum Kt^{\Delta t}} = 1 - \frac{P^{\Delta Kt} \sigma \frac{2}{\Delta Kt}}{2 P^{Kt} \sigma \frac{2}{Kt}} \tag{68}$$

Relationship Between Time Lag Correlation Coefficient and Power/Change in Power Correlation Coefficient This section derives the relationship between the time lag correlation coefficient and the correlation between the series and the change in the series for a single location.

$$\rho^{P,\Delta P} = \frac{COV[P, \Delta P]}{\sqrt{\sigma_P^2 \sigma_{\Delta P}^2}} = \frac{COV[P, P^{\Delta t} - P]}{\sqrt{\sigma_P^2 \sigma_{\Delta P}^2}} = \frac{COV[P, P^{\Delta t}] - \sigma_P^2}{\sqrt{\sigma_P^2 \sigma_{\Delta P}^2}}$$

Since $\sigma_{\Delta P}^2 = VAR[P^{\Delta t} - P] = \sigma_P^2 + \sigma_{P^{\Delta t}}^2 - 2COV[P, P^{\Delta t}]$ and $COV[P, P^{\Delta t}] = \rho^{P,P^{\Delta t}} \sqrt{\sigma_P^2 \sigma_{P^{\Delta t}}^2}$, then $\rho^{P,\Delta P} = \dfrac{\rho^{P,P^{\Delta t}} \sqrt{\sigma_P^2 \sigma_{P^{\Delta t}}^2} - \sigma_P^2}{\sqrt{\sigma_P^2 \left(\sigma_P^2 + \sigma_{P^{\Delta t}}^2 - 2\rho^{P,P^{\Delta t}} \sqrt{\sigma_P^2 \sigma_{P^{\Delta t}}^2}\right)}}$.

Since $$\sigma_P^2 \approx \sigma_{P^{\Delta t}}^2,$$

this expression can be further simplified. Then, square both expression and solve for the time lag correlation coefficient:

$$\rho^{P,P^{\Delta t}} = 1 - 2(\rho^{P,\Delta P})$$

Correlation Coefficients Between Two Regions

Assume that the two regions are squares of the same size, each side with N points, that is, a matrix with dimensions of $\sqrt{N}$ by $\sqrt{N}$ points, where $\sqrt{N}$ is an integer, but are separated by one or more regions. Thus:

$$\sum_{i=1}^{N} \sum_{j=1}^{N} \left(\frac{1}{N^2}\right) \rho^{i,j} = \left(\frac{1}{N^2}\right) \left[\sum_{i=0}^{\sqrt{N}-1} \sum_{j=1-\sqrt{N}}^{\sqrt{N}-1} k(\sqrt{N} - i)(\sqrt{N} - |j|) \rho^d\right] \tag{69}$$

where $k = \begin{cases} 1 \text{ when } i = 0 \\ 2 \text{ when } i > 0 \end{cases}$, $d = \left(\sqrt{i^2 + \left(j + M\sqrt{N}\right)^2}\right) \left(\frac{\sqrt{Area}}{\sqrt{N} - 1}\right)$, and M equals the number of regions.

Figure 9:
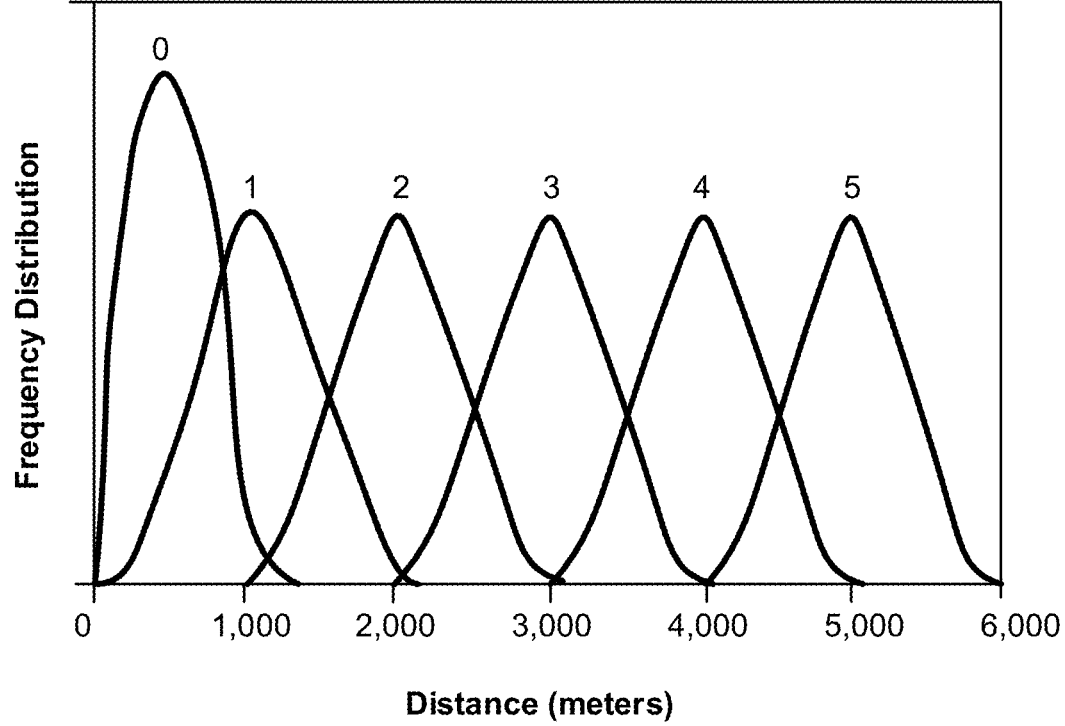
FIG. 9 is a graph depicting, by way of example, the probability density function when regions are spaced by zero to five regions.

FIG. 9 is a graph depicting, by way of example, the probability density function when regions are spaced by zero to five regions. FIG. 9 suggests that the probability density function can be estimated using the following distribution:

$$f = \begin{cases} 1 - \left(\dfrac{Spacing - D}{\sqrt{Area}}\right) & \text{for } Spacing - \sqrt{Area} \le D \le Spacing \\ 1 + \left(\dfrac{Spacing - D}{\sqrt{Area}}\right) & \text{for } Spacing \le D \le Spacing + \sqrt{Area} \\ 0 & \text{all else} \end{cases} \tag{70}$$

Figure 10:
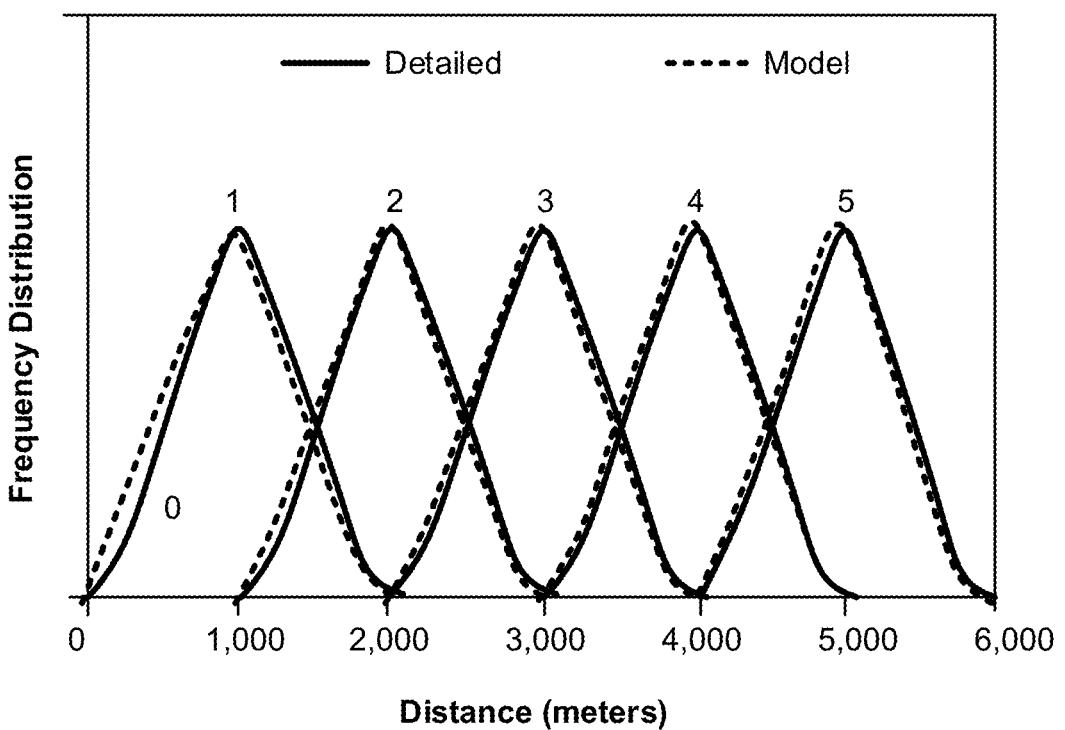
FIG. 10 is a graph depicting, by way of example, results by application of the model.

This function is a probability density function because the integration over all possible values equals zero. FIG. 10 is a graph depicting, by way of example, results by application of this model.

Inferring Photovoltaic System Configuration Specifications

Accurate power output forecasting through photovoltaic power prediction models, such as described supra, requires equally precise solar irradiance data and photovoltaic system configuration specifications. Solar irradiance data can be obtained from ground-based measurements, satellite imagery, numerical weather prediction models, as well as through various reliable third party sources, such as the SolarAnywhere® database service (http://www.SolarAnywhere.com), a Web-based service operated by Clean Power Research, L.L.C., Napa, CA, that can provide satellite-derived solar irradiance data forecasted up to seven days ahead of time and archival solar irradiance data, dating back to Jan. 1, 1998, at time resolutions of as fast as one minute for historical data up to several hours forecasted and then transitioning to a one-hour time resolution up to seven days ahead of time. The SolarAnywhere® database service has 20 years of hourly outdoor temperature data for every location in the continental United States.

On the other hand, obtaining accurate and reliable photovoltaic plant configuration specifications for individual photovoltaic systems can be a challenge, particularly when the photovoltaic systems are part of a geographically dispersed power generation fleet. Accurate photovoltaic system configuration specifications are needed to efficiently estimate individual photovoltaic power plant production. Part of the concern arises due to an increasing number of grid-connected photovoltaic systems that are privately-owned residential and commercial systems, where they are neither controlled nor accessible by grid operators and power utilities, who require precise configuration specifications for planning and operations purposes or whether they are privately-owned utility-scale systems for which specifications are unavailable. Moreover, in some situations, the configuration specifications may be either incorrect, incomplete or simply not available.

Method

Figure 11:
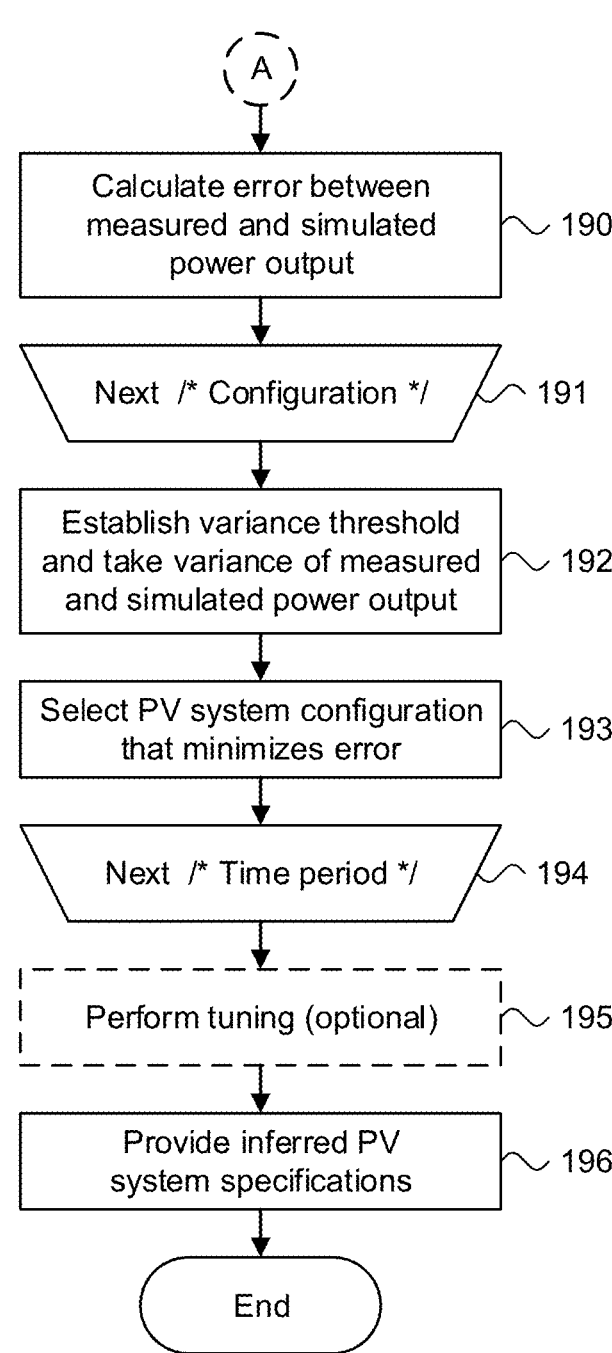
FIG. 11 is a flow diagram showing a computer-implemented method for inferring operational specifications of a photovoltaic power generation system in accordance with a further embodiment.

Photovoltaic plant configuration specifications can be accurately inferred through analysis of historical measurements of the photovoltaic plant's production data and measured historical irradiance data. FIG. 11 is a flow diagram showing a computer-implemented method 180 for inferring operational specifications of a photovoltaic power generation system 25 (shown in FIG. 2) in accordance with a further embodiment. Configuration data include the plant's power rating and electrical characteristics, including the effect of the efficiency of the modules, wiring, inverter, and other factors; and operational features, including tracking mode (fixed, single-axis tracking, dual-axis tracking), azimuth angle, tilt angle, row-to-row spacing, tracking rotation limit, and shading or other physical obstructions. Shading and physical obstructions can be evaluated by specifying obstructions as part of a configuration. For instance, an obstruction could be initially defined at an azimuth angle between 265° and 275° with a 10° elevation (tilt) angle. Additional configurations would vary the azimuth and elevation angles by fixed amounts, thereby exercising the range of possible obstruction scenarios. The method 180 can be implemented in software and execution of the software can be performed on a computer system 21, such as described supra with reference to FIG. 2, as a series of process or method modules or steps.

Simulation

Configuration specifications can be inferred through evaluation of measured historical photovoltaic system production data and measured historical resource data. First, measured historical time-series photovoltaic system production data and geographical coordinates are respectively obtained for the photovoltaic power generation system 25 under evaluation (steps 181 and 182). Optionally, the production data can be segmented into multiple time periods for calculating the system's power rating during different times of the year (step 183). A set of photovoltaic plant configuration specifications is then inferred for each of the time periods, if applicable (steps 184-194), as follows. First, based on the measured historical production data, the output of a normalized 1-kW-AC photovoltaic system is simulated for the current time period for a wide range of hypothetical (or model) photovoltaic system configurations (step 186), as further described infra with reference to FIG. 12.

Following simulation, each of the hypothetical photovoltaic system configurations is evaluated (steps 186-191), as follows. The total measured energy produced over the selected time period (excluding any times with erroneous measured data, which are screened out during simulation, as explained infra) is determined (step 187). The ratio of the total measured energy over the total simulated energy is calculated (step 188), which produces a simulated photovoltaic system rating. However, system power ratings other than the ratio of measured-to-simulated energy could be used.

Assuming that a photovoltaic simulation model that scales linearly (or near-linearly, that is, approximately or substantially linear, such as described infra beginning with reference to Equation (12)) in photovoltaic system rating was used, each point in the simulated time series of power production data is then proportionately scaled up by the simulated photovoltaic system rating (step 189). Each of the points in the simulated and measured time series of power production data are matched up and the error between the measured and simulated power output is calculated (step 190) using standard statistical methodologies. For example, the relative mean absolute error (rMAE) can be used, such as described in Hoff et al., "Modeling PV Fleet Output Variability," Solar Energy 86, pp. 2177-2189 (2012) and Hoff et al, "Reporting of Irradiance Modeling Relative Prediction Errors," Progress in Photovoltaics: Res. Appl. DOI: 10.1002/pip.2225 (2012) the disclosure of which is incorporated by reference. Other methodologies, including but not limited to root mean square error, to calculate the error between the measured and simulated data could also be used. Each hypothetical photovoltaic system configuration is similarly evaluated (step 191).

Variance

Once all of the configurations have been explored (steps 186-191), a variance threshold is established and the variance between the measured and simulated power outputs of all the configurations is taken (step 192) to ensure that invalid data has been excluded. The hypothetical photovoltaic system configuration, including, but not limited to, tracking mode (fixed, single-axis tracking, dual-axis tracking), azimuth angle, tilt angle, row-to-row spacing, tracking rotation limit, and shading configuration, that minimizes error is selected (step 193). The selected configuration represents the inferred photovoltaic system configuration specification for the photovoltaic power generation system 25 under evaluation for the current time period. Each time period is similarly evaluated (step 194). Once all of the time periods have been explored (steps 184-194), an inferred photovoltaic system configuration specification will have been selected for each time period. Ideally, the same configuration will have been selected across all of the time periods. However, in the event of different configurations having been selected, the configuration with the lowest overall error (step 193) can be picked. Alternatively, other tie-breaking configuration selection criteria could be applied, such as the system configuration corresponding to the most recent set of production data. In a further embodiment, mismatched configurations from each of the time periods may indicate a concern outside the scope of plant configuration evaluation. For instance, the capacity of a plant may have increased, thereby enabling the plant to generate more power that would be reflected by a simulation based on the hypothetical photovoltaic system configurations which were applied. (In this situation, the hypothetical photovoltaic system configurations would have to be modified beginning at the time period corresponding to the supposed capacity increase.) Still other tie-breaking configuration selection criteria are possible.

Optimization

In addition, the range of hypothetical (or model) photovoltaic system configurations used in inferring the system's "optimal" configuration data, that is, a system configuration heuristically derived through evaluation of different permutations of configuration parameters, including power rating, electrical characteristics, and operational features, can be used to look at the effect of changing the configuration in view of historical measured performance. For instance, while the hypothetical configuration that minimizes error signifies the closest (statistical) fit between actual versus simulated power generation models, other hypothetical configurations may offer the potential to improve performance through changes to the plant's operational features, such as revising tracking mode (fixed, single-axis tracking, dual-axis tracking), azimuth, tilt, row-to-row spacing, tracking rotation limit, and shading configurations. Moreover, the accuracy or degree to which a system configuration is "optimal" can be improved further by increasing the degree by which each of the configuration parameters is varied. For instance, tilt angle can be permuted in one degree increments, rather than five degrees at a time. Still other ways of structuring or permuting the configuration parameters, as well as other uses of the hypothetical photovoltaic system configurations, are possible.

Tuning

Optionally, the selected photovoltaic system configuration can be tuned (step 195), as further described infra with reference to FIG. 16. The selected and, if applicable, tuned photovoltaic system configuration is then provided (step 196) as the inferred photovoltaic system configuration speci-fications, which can be used to correct, replace or, if con-figuration data is unavailable, stand-in for the system's specifications.

Power Output Simulation

Figure 12:
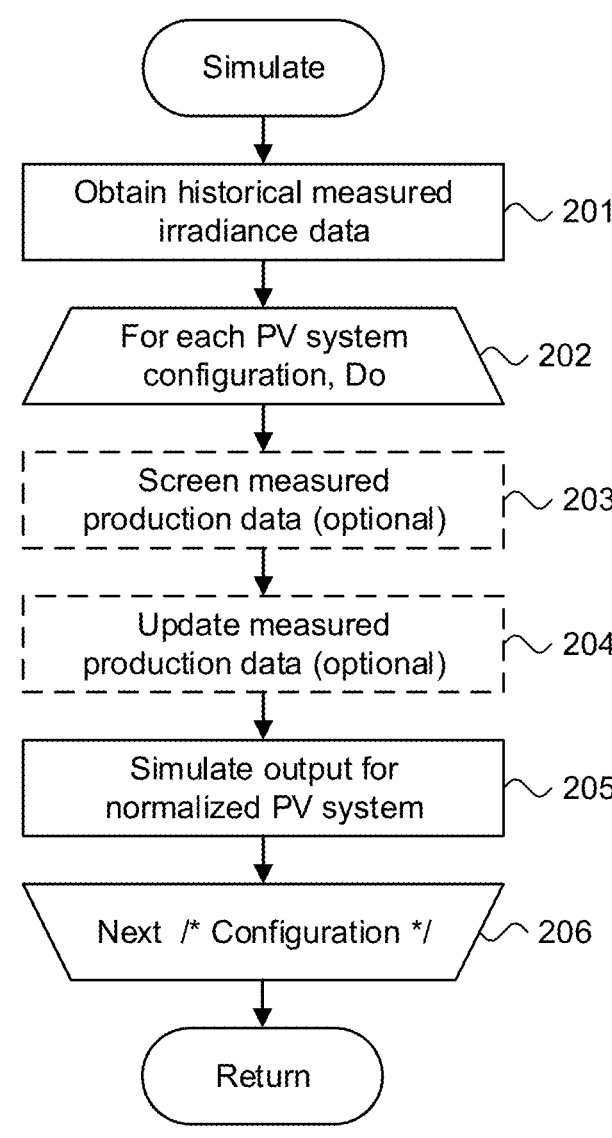
FIG. 12 is a flow diagram showing a routine 200 for simulating power output of a photovoltaic power generation system 25 for use in the method 180 of FIG. 11.

Photovoltaic power prediction models are typically used in forecasting power generation, but prediction models can also be used to simulate power output for hypothetical photovoltaic system configurations. The simulation results can then be evaluated against actual historical measured photovoltaic production data and statistically analyzed to identify the inferred (and most probable) photovoltaic sys-tem configuration specification. FIG. 12 is a flow diagram showing a routine 200 for simulating power output of a photovoltaic power generation system 25 for use in the method 180 of FIG. 11. Power output is simulated for a wide range of hypothetical photovoltaic system configurations, which are defined to exercise the different types of photo-voltaic system configurations possible. Each of the hypo-thetical configurations may vary based on power rating and electrical characteristics, including the effect of the effi-ciency of the solar modules, wiring, inverter, and related factors, and by their operational features, such as size and number of photovoltaic arrays, the use of fixed or tracking arrays, whether the arrays are tilted at different angles of elevation or are oriented along differing azimuthal angles, and the degree to which each system is covered by shade on a row-to-row basis or due to cloud cover or other physical obstructions. Still other configuration details are possible.

Initially, historical measured irradiance data for the cur-rent time period is obtained (step 201), such as described supra beginning with reference to FIG. 3. Preferably, the irradiance data includes is obtained from a solar resource data set that contains both historical and forecasted data, which allows further comparative analysis. Each of the hypothetical photovoltaic system configurations are evalu-ated (steps 202-206), as follows. Optionally, the measured irradiance data is screened (step 203) to eliminate data where observations are invalid either due to data recording issues or photovoltaic system performance issues power output. The production data, that is, measured power output, is correspondingly updated (step 204). Finally, power output is simulated based on the current system configuration and the measured irradiance data for the current time period (step 205), such as described supra beginning with reference to Equation (12). In one embodiment, a normalized 1-kW-AC photovoltaic system is simulated, which facilitates pro-portionately scaling the simulated power output based on the ratio (or function) of measured-to-simulated energy. A dif-ferent approach may be required for photovoltaic simulation models that do not scale linearly (or near-linearly) with system rating. For instance, a non-linear (or non-near-linear) simulation model may need to be run multiple times until the system rating for the particular system configuration results in the same annual energy production as the measured data over the same time period. Still other approaches to scaling non-linear (or non-near-linear) simulation model results to actual measured energy output are possible. Each system configuration is similarly evaluated (step 206), after which power production simulation for the current time period is complete.

Example of Inferred Photovoltaic Plant Configuration Specifications

The derivation of a simulated photovoltaic system con-figuration can be illustrated with a simple example. FIG. 13 is a table showing, by way of example, simulated half-hour photovoltaic energy production for a 1-kW-AC photovoltaic system. Each column represents a different hypothetical photovoltaic system configuration. For instance, the first column represents a horizontal photovoltaic plant with a fixed array of solar panels set at a 180 degree azimuth with zero tilt. Each row represents the power produced at each half-hour period for a 1-kW-AC photovoltaic system, begin-ning on Jan. 1, 2012 (night time half-hour periods, when solar power production is zero, are omitted for clarity). The simulated energy production data covers the time period from Jan. 1, 2012 through Dec. 31, 2012, although only the first few hours of Jan. 1, 2012 are presented in FIG. 13. The latitude and longitude of the photovoltaic system were obtained and the Solar Anywhere service, cited supra, was used to obtain both historical and forecasted solar data and to simulate photovoltaic power output generation.

The simulated energy production can be compared to actual historical data. Here, in 2012, the photovoltaic plant produced 12,901,000 kWh (kilowatt hours) in total mea-sured energy, while the hypothetical photovoltaic system configuration represented in the first column had a simulated output of 1,960 kWh over the same time period (for a 1-kW-AC photovoltaic system). Assuming that a linearly-scalable (or near-linearly scalable) photovoltaic simulation model was used, the simulated output of 1,960 kWh implies that this particular system configuration would need a rating of 6,582 kW-AC to produce the same amount of energy, that is, 12,901,000 kWh, as the actual system. Thus, each half hour value can be multiplied by 6,582 to match simulated to actual power output.

Figure 14:
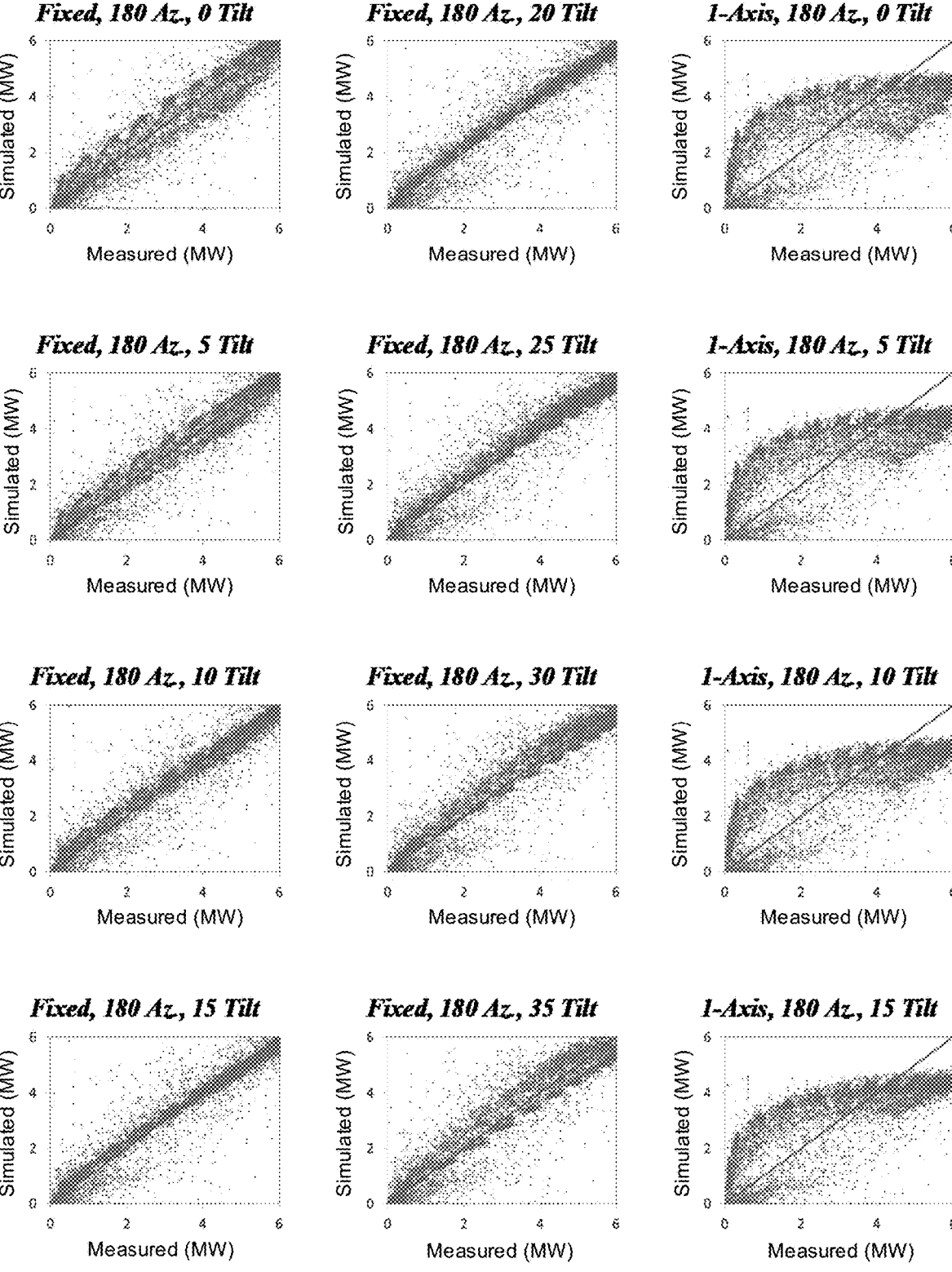
FIG. 14 are graphs depicting, by way of example, simulated versus measured power output for hypothetical photovoltaic system configuration specifications evaluated using the method 180 of FIG. 11.

The results can be visually presented. FIG. 14 are graphs depicting, by way of example, simulated versus measured power output 12 for hypothetical photovoltaic system con-figuration specifications evaluated using the method 180 of FIG. 11. Each of the graphs corresponds to photovoltaic power as produced under a different hypothetical photovol-taic system configuration, as shown in the columns of the table of FIG. 13. The x-axis of each graph represents measured power output in megawatts (MW). The y-axis of each graph represents simulated power output in megawatts (MW). Within each graph, the points present the half-hour simulated versus measured photovoltaic power data. Visu-ally, the simulated versus measured power output data for the fixed system configuration with a 180 degree azimuth angle and 15 degree tilt shows the closest correlation.

Similarly, FIG. 15 is a graph depicting, by way of example, the rMAE between the measured and simulated power output for all system configurations as shown in FIG. 14. The x-axis represents the percentage of rMAE for half-hour intervals. The y-axis represents the different hypo-thetical photovoltaic system configurations. Again, the fixed system configuration with a 180 degree azimuth angle and 15 degree tilt reflects the lowest rMAE and accordingly provides an optimal system configuration.

Optimizing Photovoltaic System Configuration Specifications

Truly perfect weather data does not exist, as there will always be inaccuracies in weather data, whether the result of calibration or other errors or incorrect model translation. In addition, photovoltaic plant performance is ultimately unpredictable due to unforeseeable events and customer maintenance needs. For example, a power inverter outage is an unpredictable photovoltaic performance event, while photovoltaic panel washing after a long period of soiling is an example of an unpredictable customer maintenance event.

Tuning

In a further embodiment, the power calibration model can be tuned to improve forecasts of power output of the photovoltaic plant based on the inferred (and optimal) photovoltaic plant configuration specification, such as described in commonly-assigned U.S. Patent application, entitled "Computer-Implemented Method for Tuning Photovoltaic Power Generation Plant Forecasting," cited supra. Tuning helps to account for subtleties not incorporated into the selected photovoltaic simulation model, including any non-linear (or non-near-linear) issues in the power model. FIG. 16 are graphs depicting, by way of example, simulated versus measured power output for the optimal photovoltaic system configuration specifications as shown in FIG. 14. The graphs corresponds to photovoltaic power as produced under the optimal photovoltaic system configuration, that is, a fixed system configuration with a 180 degree azimuth angle and 15 degree tilt before (left graph) and after (right graph) tuning. The x-axis of each graph represents measured power output in megawatts (MW). The y-axis of each graph represents simulated power output in megawatts (MW).

Referring first to the "before" graph, the simulated power production data over-predicts power output during lower measured power conditions and under-predicts power output during high measured power conditions. Referring next to the "after" graph, tuning removes the uncertainty primarily due to irradiance data error and power conversion inaccuracies. As a result, the rMAE (not shown) is reduced from 11.4 percent to 9.1 percent while also eliminating much of the remaining bias.

Inferring Photovoltaic System Configuration Specifications Using Net Load Data

The historical measured photovoltaic power production data, which is necessary for inferring operational photovoltaic system configuration specifications per the approach described supra beginning with reference to FIG. 11, may not always be available. High-quality, historical, measured photovoltaic production data may be unavailable for several reasons. For example, photovoltaic system production may not be directly monitored. Alternatively, photovoltaic system production may be monitored by one party, such as the photovoltaic system owner, but the production data may be unavailable to other interested parties, such as an electric utility. Moreover, even where a photovoltaic system production is monitored and production data is available, the quality of the production data may be questionable, unreliable, or otherwise unusable. These situations are particularly prevalent with photovoltaic systems located on the premises of residential utility customers.

In a further embodiment, net energy (electric) load data for a building can be used to infer operational photovoltaic system configuration specifications, as an alternative to historical measured photovoltaic system production data. Net load data can also be used, in combination with measured outdoor temperature data over the same period, to performing power utility remote consumer energy auditing, as further discussed infra beginning with reference to FIG. 19.

Smart electric meters provide one source of net load data. Smart meters are becoming increasingly commonplace, as power utilities move towards tiered and time-of-use electricity pricing structures, which require knowledge of when and how much power is consumed based on the time of day and season. Smart meters also allow a power utility to monitor the net power load of a building, but generally not the component power loads of individual appliances or machinery (collectively, "components"). Note that smart meters are also available for measuring or monitoring other types of energy, fuel, or commodity consumption or usage, including natural gas, liquid propane, and water.

Typically, a smart meter is interposed on the electric power line that supplies electricity to a building. The smart meter includes power sensing circuitry to measure power consumption within the building and recordation circuitry to cumulatively or instantaneously record the power consumption as net load data. In addition, the smart meter incorporates a bidirectional communications interface with which to connect to and interoperate with a server or other computational infrastructure operated by or on behalf of the power utility. The communications interface can be through wired or wireless means. The communications interface also offers the ability for the utility to remotely reduce load, disconnect-reconnect service, and interface to other utility service meters, such as gas and water meters. The smart meter could also be accessible by other systems, where permitted by the power utility, such as the resident of the building or third parties interested in obtaining or monitoring power consumption.

Net Load Characterization

Smart meters typically record detailed time series data for individual customers. In most cases, the various component loads are not directly measureable; component load measurement would require the smart meter to be able to identify when specific components began and ceased operation, which is largely impracticable. As a result, only net load is available and individual component loads must be estimated.

Assuming that a building has only one point of electricity service, net electricity load during any given time interval, such as measured by a smart meter, equals the sum of multiple component loads, minus any on-site distributed generation. For the sake of discussion, a photovoltaic system will be assumed to provide all on-site distributed generation, although other sources of on-site distributed generation are possible. Only one photovoltaic system is necessary, because the output from any individual photovoltaic systems situated in the same location would be correlated. Thus, the photovoltaic system performance can be specified by a single operational photovoltaic system configuration.

Component Loads

Individual component loads represent the load associated with groups of devices with similar load characteristics. For example, all lights on the same circuit are associated with a single component load because the light work in tandem with each other.

Component loads can be characterized into three types. A Base Load represents constant power that is drawn at all times. A Binary Load represents a load that is either on or off, and which, when on, draws power at a single relatively stable power level. For example, the power drawn by a refrigerator is a binary load. Finally, a Variable Load represents a load that can take on multiple power levels. For instance, the power drawn by an electric range is variable, as the load depends on the number of stove burners in use and their settings.

In any given building, there is one base load, one or more binary loads, and one or more variable loads. The base load equals the sum of all component loads that are on at all times. The binary loads equal the sum of the all component loads that are binary during the time that the components are on. Each binary load can be expressed as the product of an indicator function, that is, a value that is either 0 or 1, and a binary load level (energy consumption) for that binary load. When multiplied by the binary load level, the indicator function acts as an identify function that returns the binary load level only when the value of the indicator function is 1. When the value of the indicator function is 0, the binary load level is 0, which masks out the binary load. The variable loads equal the sum of all component loads that are variable during the time that the components are on based on their corresponding variable load levels (energy consumption).

A Net Load at time interval t can be expressed as:

$$\text{Net Load}_t = \text{Base Load} + \sum_{m=1}^{M} 1_t^m \times \text{Binary Load}^m + \sum_{n=1}^{N} \text{Variable Load}_t^n - PV_t \tag{71}$$

where Base Load represents the base load, M is the number of binary loads, Binary Load$^m$ represents component binary load m, $$1_t^m$$

is an indicator function at time interval t, N is the number of variable loads, $$\text{Variable Load}_t^n$$

represents component variable load m at time interval t. There is no time subscript on Base Load because the base load is the same at all times. The indicator function $$(1_t^m)$$

is either 0 or 1 for component Binary Load$^m$ at time interval t. The value is 0 when the load is off, and the value is 1 when the load on. There is a time subscript (t) on the indicator function, but there is no time subscript on the Binary Load proper because the binary load is constant when on.

Photovoltaic Production

Photovoltaic production can be solved by rearranging Equation (71) if the net load and all individual load components are known at a given time interval. Photovoltaic production $PV_t$ at time interval t can be represented by the normalized photovoltaic production for a 1-kW photovoltaic system for a particular configuration times the rating of the system, such that:

$$PV_t = (\text{Rating})(\overline{PV}_t) \tag{72}$$

where Rating is the rating of the photovoltaic system in kilowatts (kW), and $\overline{PV}_t$ is the production associated with a normalized 1-kW photovoltaic system for a particular photovoltaic system configuration.

Given an accurate photovoltaic simulation model, the normalized photovoltaic production $\overline{PV}_t$ at time interval t can be expressed as a function of photovoltaic system configuration and solar resource data. The photovoltaic system configuration is not dependent on time, while the solar resource data is dependent on time:

$$\overline{PV}_t = f(\text{Config}, \text{Solar}_t) \tag{73}$$

where Config represents a set of photovoltaic system configuration parameters, for instance, azimuth, tilt, tracking mode, and shading, for a normalized 1-kW photovoltaic system and Solar is the solar resource and other weather data, including normalized horizontal irradiation, average ambient temperature, and wind speed, at time interval t.

Substitute Equation (73) into Equation (72), then into Equation (71):

$$\text{Net Load}_t = \text{Base Load} + \sum_{m=1}^{M} 1_t^m \times \text{Binary Load}^m + \tag{74}$$
$$\sum_{n=1}^{N} \text{Variable Load}_t^n - (\text{Rating}) \times f(\text{Config}, \text{Solar}_t)$$

Estimate Component Loads

In most cases, the various component loads, that is, the binary loads and the variable loads, are not directly measureable and only the net load is available. As a result, the component loads must be estimated.

Simple Case

In the simplest scenario, there is only a base load and the net load will directly correspond to the base load. Adding a binary component load complicates the simplest scenario. For purposes of illustrations, assume one binary load Binary Load* and Equation (74) simplifies to:

$$\text{Net Load}_t = \tag{75}$$
$$\text{Base Load} + 1_t^* \times \text{Binary Load}^* - (\text{Rating}) \times f(\text{Config.}, \text{Solar}_t)$$

Consider the analysis over a 24-hour period using a one-hour time interval. Solving Equation (75) yields an array of 24 net load values:

$$\begin{bmatrix} \text{Net Load}_1 \\ \dots \\ \text{Net Load}_{24} \end{bmatrix} = \tag{76}$$
$$\text{Base Load}\begin{bmatrix} 1 \\ \dots \\ 1 \end{bmatrix} + \text{Binary Load}^*\begin{bmatrix} 1_1^* \\ \dots \\ 1_{24}^* \end{bmatrix} - (\text{Rating})\begin{bmatrix} f(\text{Config.}, \text{Solar}_1) \\ \dots \\ f(\text{Config.}, \text{Solar}_{24}) \end{bmatrix}$$

where Net Load$_t$ is the net load at time interval t. The system of 24 equations expressed by Equation (76) has many unique variables and is difficult to solve.

When the variables on the right-hand side of Equation (76) are parameterized into a set of key parameters, Equation (76) can be used to estimate net load for each time period. The key parameters include the Base Load, any Binary Loads, an Variable Loads (not shown in Equation (76)), photovoltaic system configurations (Config.), and solar resource and other weather data (Solar). The photovoltaic system ratings include power ratings hypothesized for the plant for which a net load is being estimated. Other key parameters are possible.

Simplifying Assumptions

This solution space of Equation (76) can be reduced in several ways. First, the photovoltaic production values are not 24 unrelated hourly values. Rather, the values are related based on photovoltaic system configuration and weather data input. Given accurate weather data, the 24 photovoltaic values reduce to only one unknown variable, which is system orientation. Second, a particularly interesting type of binary load is a temperature-related binary load, which is related to the time of day. The indicator function $(1_r^*)$ for a time-related binary load equals 1 when the hours are between $h_1$ and $h_2$, and 0 for all other hours. As a result, rather than requiring 24 values, only $h_1$ and $h_2$ are required to find the binary load.

Thus, Equation (76) can be simplified to require only two types of data, historical time series data, as expressed by net load and solar resource data, and a set of unknown parameters, which include photovoltaic system rating, photovoltaic system configuration, base load, binary load, binary load indicator function start hour $h_1$, and binary load indicator function end hour $h_2$.

Net loads are typically measured by a power utility on an hourly basis, although other net load measurement intervals are possible. The solar irradiance data, as well as simulation tools, can be provided by third party sources, such as the SolarAnywhere data grid web interface, which, by default, reports irradiance data for a desired location using a single observation time, and the SolarAnywhere photovoltaic system modeling service, available in the SolarAnywhere Toolkit, that uses hourly resource data and user-defined physical system attributes to simulate configuration-specific photovoltaic system output. SolarAnywhere is available online (http://www.SolarAnywhere.com) through Web-based services operated by Clean Power Research, L.L.C., Napa, CA. Other sources of the solar irradiance data are possible, including numeric weather prediction models.

Total Squared Error

Let $$\text{Net Load}_t^{Estimated}$$

represent the estimated net load at time interval t based on the key parameters input to the right-hand side of Equation (76), as described supra. The total squared error associated with the estimation equals:

$$\text{Total Squared Error} = \sum_{t=1}^{24} \left( \text{Net Load}_t - \text{Net Load}_t^{Estimated} \right)^2 \qquad (77)$$

The key parameters should be selected to minimize the Total Squared Error, using a minimization approach, such as described supra with reference to FIG. 11.

Method

Figure 17:
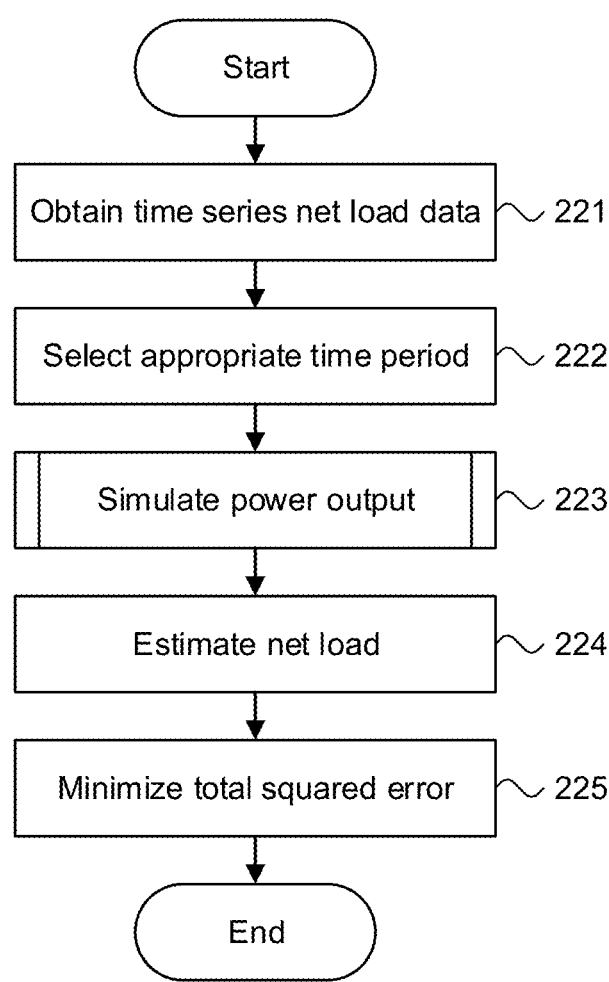
FIG. 17 is a flow diagram showing a computer-implemented method for inferring operational specifications of a photovoltaic power generation system using net load in accordance with a further embodiment.

Photovoltaic plant configuration specifications can be accurately inferred with net load data applied to minimize total squared error. FIG. 17 is a flow diagram showing a computer-implemented method 220 for inferring operational specifications of a photovoltaic power generation system 25 (shown in FIG. 2) using net load data in accordance with a further embodiment. The method 180 can be implemented in software and execution of the software can be performed on a computer system 21, such as described supra with reference to FIG. 2, as a series of process or method modules or steps.

As a preliminary step, time series net load data is obtained (step 221), which could be supplied, for instance, by a smart meter that monitor the net power load of a building. Other source of net load data are possible. An appropriate time period is then selected (step 222). Preferably, a time period with minimum or consistent power consumption is selected. Longer duration, possibly contiguous time periods provide better results, than shorter duration, temporally-distinct time periods. For residential applications, such time periods correspond to when the occupants are on vacation or away from home for an extended period of time. For commercial applications, such time periods correspond to a weekend or holiday when employees are away from work. Still other appropriate time periods are possible.

Next, based on the historical solar resource and other weather data, the output of a normalized 1-kW-AC photovoltaic system is simulated for the current time period for a wide range of hypothetical (or model) photovoltaic system configurations (step 223), as further described supra with reference to FIG. 12. Power generation data is simulated for a range of hypothetical photovoltaic system configurations based on a normalized solar power simulation model. Net load data is estimated based on a base load and, if applicable, any binary loads and any variable loads net load is estimated (step 224) by selecting key parameters, per Equation (76). The key parameters include the base load, any binary loads, any variable loads, photovoltaic system configurations, and solar resource and other weather data. The photovoltaic system ratings include power ratings hypothesized for the plant. Other key parameters are possible. As explained supra, a special case exists when there is only one binary load that is both temperature-related and only occurring between certain hours of the day. As well, a special case exists when there are no variable loads.

Finally, total squared error between the estimated and actual net load for each time period is minimized (step 225). The set of key parameters corresponding to the net load estimate that minimizes the total squared error with the measured net load data, per Equation (77), represents the inferred specifications of the photovoltaic plant configuration.

Photovoltaic system configurations are included as one of the key parameters. A set of hypothetical photovoltaic system configurations are defined that include power ratings and operational features, including, but not limited to, tracking mode (fixed, single-axis tracking, dual-axis tracking), azimuth angle, tilt angle, row-to-row spacing, tracking rotation limit, and shading configuration. The selected configuration represents the inferred photovoltaic system configuration specification for the photovoltaic power generation system 25 under evaluation for the current time period. In turn, the photovoltaic system configuration that is part of the set of key parameters that minimize the total squared error will become the inferred system specification.

Estimating and Disaggregating Consumer Power Consumption

Power utilities need to have a comprehensive understanding of how and when their customers consume energy as disaggregated from overall customer energy load into individual categories of component loads (discussed in detail supra in the section entitled, "Component Loads") for planning, operational, and other purposes. Customer energy consumption patterns touch upon many of a power utility's activities, both long- and short-term. By performing a remote energy audit of their customers, preferably over a sufficiently representative sample size of their customer base, a power utility can improve the balancing of power generation, procurement, and output by their power generation equipment and energy sources under their control against their customers' total consumption as categorized by disaggregated component load.

In addition, power utilities need to understand how their customers produce and consume energy that has been generated on-site through photovoltaic (solar) or other power generation means. Some power utilities have installed separate power meters to track both the electricity that they have supplied and on-site solar (or other) power generation. As a result, these power utilities have the ability to calculate each customer's energy load by combining the two observed (electricity and solar) power meter readings; however, those power utilities that only have a traditional single-power meter installation at each customer location are unable to track their customer's on-site power generation, as the on-site-generated power is typically fed into the customer's electricity circuits before their (single) power meter. Thus, the energy contribution made by on-site power generation is effectively concealed and, without more, the customer's energy load remains unascertainable by the power utility.

The discussion of consumer power consumption analysis is divided into three parts. First, the thermal component of the analysis is discussed based on established principles of heat transfer, such as the notion of an overall heat transfer coefficient that governs the heat loss resulting from the difference between indoor and outdoor temperatures. Second, a new building performance metric, called "Effective R-Value," is empirically determined to summarize a building's ability to resist thermal losses; the Effective R-Value is analogous to the R-value used in building insulation materials. Third, demonstrates how to observe Balance Point Temperature empirically without knowing indoor temperature or internal heat gains.

In this section, except as noted, "fuel" and "energy" may be used interchangeably, where fuel generally refers to a non-electric, physically consumable deliverable and energy generally refers to electricity, with similar meaning applied to compound terms, such as "FuelRate," that is, FuelRate could be based on a consumable fuel, like natural gas, or on electricity.

Thermal Components

Characterizing building performance based on the absolute amount of energy consumed can be limiting. First, total energy consumption is a function of weather variability. Cold winters result in increased heating fuel consumption and hot summers result in increased cooling fuel consumption. Second, total energy consumption is a function of the occupants' temperature preferences. Some occupants like their homes warmer in the winter than other occupants, cooler in the summer, or both. Third, total energy consumption is a function of internal heat gains. Some homes have high internal heat gains due to good solar access, many occupants, a substantial amount of waste heat from electric devices operated in the home, or some combination of the foregoing factors. These limitations make reliance on absolute energy consumption impracticable where a power utility desires to disaggregate into individual component loads.

Thermal component loads are directly related to building performance and are influenced by factors like HVAC type and ductwork, building insulation, window type, and sealing quality around structure penetrations. The analysis discussed in this section empirically and objectively characterizes building performance using utility-metered energy consumption data in combination with externally-supplied meteorological data. The analysis uses the SolarAnywhere® database service, cited supra, for meteorological data for all locations, although other sources of meteorological data are possible.

Figure 18:
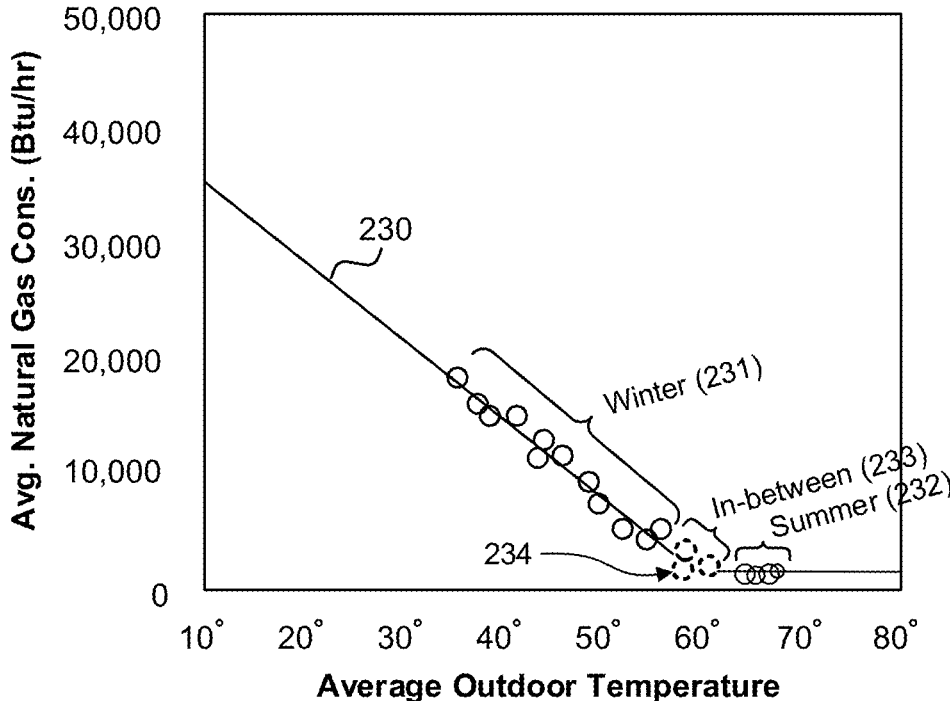
FIG. 18 is a graph depicting, by way of example, calculation of the FuelRate and Balance Point Temperature metrics for a sample home heated by natural gas.

To be of use to power utilities, the results of the audit must be objective and independent of year-to-year weather variability, occupant comfort preferences, and internal heat gains, which is related to solar access, the number of occupants, and the waste heat produced by electrical devices in the home. Specifically, the FuelRate metric has been developed to meets these objective requirements. FIG. 18 is a graph depicting, by way of example, calculation of the FuelRate and Balance Point Temperature metrics for a sample home heated by natural gas. The x-axis represents average outdoor temperature in degrees Fahrenheit. The y-axis represents average natural gas consumption in Btu per hour (Btu/hr). The FuelRate represents the effectiveness of a home in maintaining internal comfort levels and has units of Btu/hr-° F. The Balance Point Temperature is a known metric that represents the outdoor air temperature when the heat gains of the building are equal to the heat losses.

In this example, natural gas is consumed during the winter months 231, but not during the summer months 232; there is minimal natural gas consumption during the months falling in-between 233 the winter 231 and 232. The average amount of natural gas consumed is plotted against the average outdoor temperature to form a line 230, whose slope during the winter months 231 is the FuelRate. The Balance Point Temperature is shown at the "elbow" of line 230, where natural gas consumption is curtailed. The home does not consume any heating fuel above the Balance Point Temperature. Note that the FuelRate can be calculated from total metered energy (natural gas) load, even though the home uses natural gas for other non-space heating purposes, such as stovetop cooking and water heating. A similar curve can be constructed for electric cooling; the customer's annual heating and cooling usage could then be disaggregated, as further discussed infra.

The methodology can be used for homes heated using natural gas, electricity, or any other fuel based on hourly, daily, or monthly measured consumption data. The methodology also applies to the cooling season. By way of further examples, homes located in California, Washington, and New York, incorporating heating by natural gas, electric resistance, and electric heat pump technologies, are discussed infra. The examples demonstrate a linear behavior in all these diverse cases that is broadly applicable by location and fuel.

Instantaneous Heat Transfer

A building's thermal performance can be characterized by its overall heat transfer coefficient and its total exterior surface area ($A^{Total}$). The product of these two values equals the building's thermal conductivity ($UA^{Total}$).

A building's total instantaneous rate of heat loss at time t ($\dot{Q}_t$) through the walls, ceilings, floors, and windows, equals the building's thermal conductivity $UA^{Total}$ times the difference between the indoor and outdoor temperatures. Assuming that the indoor temperature is constant to obviate the need for a time subscript yields:

$$\dot{Q}_t = UA^{Total}\left(T^{Indoor} - T_t^{Outdoor}\right) \tag{78}$$

Equation (78) expresses the relationship that the building loses heat if the indoor temperature exceeds the outdoor temperature, that is, $\dot{Q}_t$ is a positive value, whereas the building gains heat if the outdoor temperature exceeds the indoor temperature, that is, $\dot{Q}_t$ is a negative value.

Daily Analysis

A building has thermal mass. As a result, a building provides thermal storage, so that changes in the indoor temperature have a lower magnitude than changes in the outdoor temperature. For purposes of thermal analysis, daily heat loss, which occurs over the course of a day, is more relevant rather instantaneous heat loss. Daily heat loss equals the integration of Equation (78) over one day:

$$Q_{day} = UA^{Total}(24)\left(T^{Indoor} - \overline{T}_{day}^{Outdoor}\right) \text{ where } \overline{T}_{day}^{Outdoor} \tag{79}$$

is the average daily temperature.

Balance Point Temperature Definition

A building is in thermal equilibrium when the indoor temperature is neither increasing nor decreasing. Let the Balance Point Temperature ($T^{Balance\ Point}$) correspond to the outdoor temperature at which the building is in equilibrium without any auxiliary heating or cooling. The Balance Point Temperature reflects both the indoor temperature selected by occupants based on their comfort preferences, as well as the heat gain from internal sources, such as device usage, for instance, lights, computers, and so forth, body heat given off by the occupants, and solar gain through windows and other building surfaces. The Balance Point Temperature is always less than the indoor temperature since internal gains are always positive.

The mathematical development in this section makes two assumptions for purposes of clarity. First, only one Balance Point Temperature is assumed for the year. Most buildings will have different balance point temperatures for the heating and cooling seasons. The formulas described herein can be adjusted to reflect more than one balance point temperature. Second, internal heat gain are assumed to be constant across the year, which means that the Balance Point Temperature is constant.

Components of Daily Heat Loss

Expanding Equation (79) to incorporate Balance Point Temperature yields:

$$Q_{day} = UA^{Total}(24)\left(T^{Indoor} - T^{Balance\ Point} + T^{Balance\ Point} - \overline{T}_{day}^{Outdoor}\right) \tag{80}$$

Divide daily heat loss into two parts, one part that is independent of outdoor temperature and one part that is dependent on outdoor temperature:

$$Q_{day} = UA^{Total}(24)\left(T^{Indoor} - T^{Balance\ Point}\right) + \\ UA^{Total}(24)\left(T^{Balance\ Point} - \overline{T}_{day}^{Outdoor}\right) \tag{81}$$

The first term of Equation (81) is always positive and is constant, given the assumptions stated above. The first term is based on the difference between the indoor temperature and the Balance Point Temperature. The second term can be positive or negative. The building loses heat on days when the average outdoor temperature is less than the Balance Point Temperature. The building gains heat on days when the average outdoor temperature exceeds the Balance Point Temperature.

Rewriting Equation (81) to have three terms that are always positive yields:

$$Q_{day} = UA^{Total}(24)\left(T^{Indoor} - T^{Balance\ Point}\right) + \\ UA^{Total}(24)\max\left(T^{Balance\ Point} - \overline{T}_{day}^{Outdoor}, 0\right) - \\ UA^{Total}(24)\max\left(\overline{T}_{day}^{Outdoor} - T^{Balance\ Point}, 0\right) \tag{82}$$

The first term of Equation (82) is the heat loss when the building is in temperature equilibrium. The second term is the additional heat loss when average outdoor temperature is less than the Balance Point Temperature. The third term is the heat gain when average outdoor temperature exceeds the Balance Point Temperature.

Heat Loss over a Period

Heat loss over a selected period with N days equals Equation (82) summed over N days. Summing Equation (82) over N days and rearranging the result yields:

$$Q_{Period} - (24)(N)\left(\overline{Q}^{Internal\ Gains}\right) = \tag{83}$$

$$\underbrace{Requires\ Heating\ Fuel}_{(UA^{Total})(24)(HDD)} - \underbrace{Requires\ Cooling\ Fuel}_{(UA^{Total})(24)(CDD)} \text{ where:}$$

$$\overline{Q}^{Internal\ Gains} = \left(UA^{Total}\right)\left(T^{Indoor} - T^{Balance\ Point}\right) \tag{84}$$

$$HDD = \sum_{day=1}^{N}\max\left(T^{Balance\ Point} - \overline{T}_{day}^{Outdoor}, 0\right) \tag{85}$$

$$CDD = \sum_{day=1}^{N}\max\left(\overline{T}_{day}^{Outdoor} - T^{Balance\ Point}, 0\right) \tag{86}$$

The Balance Point Temperature can be calculated by solving Equation (84). The Balance Point Temperature equals indoor temperature minus average hourly internal gains divided by the building's thermal conductivity. The Balance Point Temperature incorporates the effect of both occupant temperature preferences and internal heat gains.

$$T^{Balance\,Point} = T^{Indoor} - \left(\frac{Q^{Internal\,Gains}}{UA^{Total}}\right) \quad (87)$$

Heat Fuel Requirement

Consider the heating fuel term on the right-hand side of Equation (83). An HVAC system consumes fuel to deliver the required amount of heat, which equals the required heat divided by the heating system efficiency.

$$Fuel^{Heating} = \frac{(UA^{Total})(24)(HDD)}{\eta^{Heating}} \quad (88)$$

$$= (FuelRate^{Heating})(24)(HDD)$$

where:

$$FuelRate^{Heating} = \frac{UA^{Total}}{\eta^{Heating}} \quad (89)$$

A similar calculation applies to the cooling fuel term on the right-hand side of Equation (83). Whether for heating or cooling, the efficiency terms include equipment efficiency and efficiency losses due to heating or cooling distribution.

Heating Degree Days (HDD) and Cooling Degree Days (CDD)

HDDs and CDDs are typically calculated for a one-year period; however, they could also be calculated over shorter time periods, such as a day, week, or month. By selecting a time-period, p, that has D days, such that the average daily temperature never exceeds the balance point, Equation (85) simplifies to:

$$HDD_p = D\left(T^{Balance\,Point} - \overline{T}_p^{Outdoor}\right) \quad (90)$$

where $$\overline{T}_p^{Outdoor}$$

is the average outdoor temperature over the selected period.

Substituting Equation (90) into Equation (88) for a period when the substitution is valid yields:

$$Fuel_p^{Heating} = (FuelRate^{Heating})(24)(D)\left(T^{Balance\,Point} - \overline{T}_p^{Outdoor}\right) \quad (91)$$

Divide by 24*D and rearrange to yield the average rate of heating fuel consumption over the selected period:

$$AvgFuel_p^{Heating} = \quad (92)$$

$$-(FuelRate^{Heating})(\overline{T}_p^{Outdoor}) + (FuelRate^{Heating})(T^{Balance\,Point})$$

Similarly, the average rate of cooling fuel consumption equals:

$$AvgFuel_p^{Cooling} = \quad (93)$$

$$(FuelRate^{Cooling})(\overline{T}_p^{Outdoor}) - (FuelRate^{Cooling})(T^{Balance\,Point}) \quad where:$$

$$FuelRate^{Cooling} = \frac{UA^{Total}}{\eta^{Cooling}} \quad (94)$$

$FuelRate^{Heating}$ and $FuelRate^{Cooling}$ are two key parameters that define building performance in the analysis. Equations (89) and (94) indicate that the FuelRates only depend on the attributes of building thermal conductivity $UA^{Total}$ and HVAC system efficiencies with one efficiency for the heating season and one efficiency for the cooling season. These parameters are independent of weather conditions, occupant temperature preferences, and internal gains. Furthermore, $FuelRate^{Heating}$ and $FuelRate^{Cooling}$ incorporate HVAC system performance, in contrast to thermal conductivity $UA^{Total}$, which only characterizes building shell performance. These properties satisfy the selection criteria outlined at the beginning of this section.

Determining FuelRate

Figure 19:
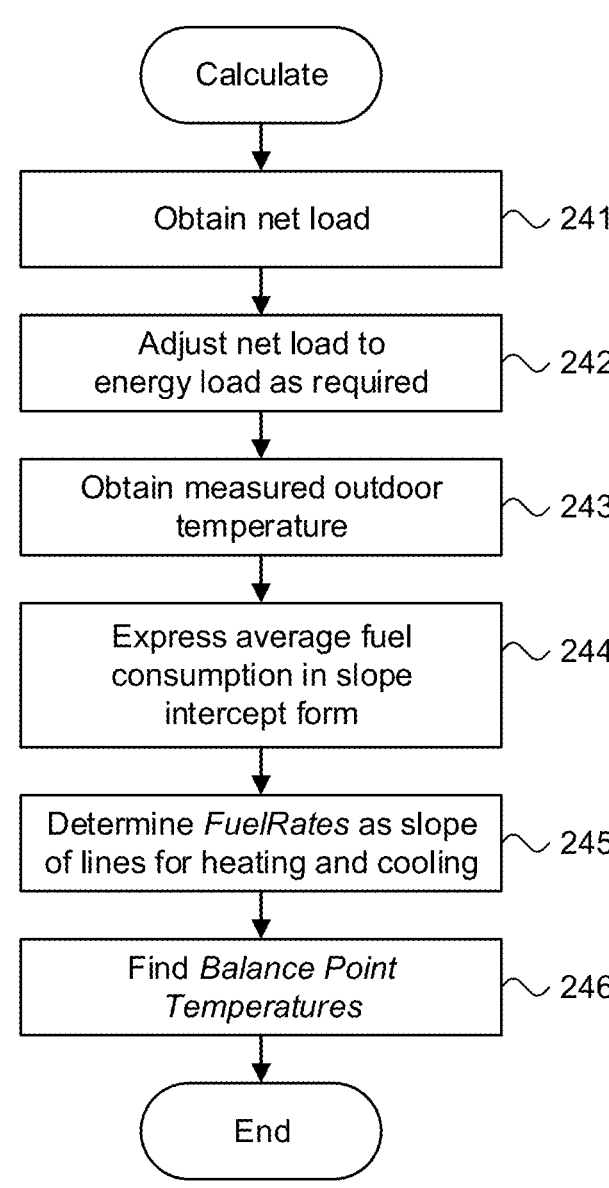
FIG. 19 is a flow diagram showing a method for determining fuel rates and balance point temperature with the aid of a digital computer in accordance with a further embodiment.

The analysis uses energy load data to determine the FuelRate metric. FIG. 19 is a flow diagram 240 showing a method for determining fuel rates and Balance Point Temperatures with the aid of a digital computer in accordance with a further embodiment. The method 240 can be implemented in software and execution of the software can be performed on a computer system, such as further described infra, as a series of process or method modules or steps, in combination with intelligent "smart" metering, heating and cooling components, intelligent "smart" thermostats, and other devices that manage, control, monitor, and operate energy consuming items.

This section demonstrates the methodology followed when natural gas is used for heating. Similar calculations are performed mutatis mutandis for cooling, heating, or both when using other fuel or energy sources, as applicable. FuelRate is calculated using Equation (91). No on-site audit is performed. Equation (91) requires: (1) measured heating fuel consumption over the period, (2) measured outdoor temperature data over the same period, and (3) the Balance Point Temperature. Measured heating fuel consumption and the Balance Point Temperature are typically unknown.

In addition, on-site power generation, which will typically be photovoltaic (solar) power generation, although other forms of on-site power generation may apply, must be considered when reconstructing a customer's energy load. Determining a customer's energy load with respect to on-site power generation devolves into three cases. First, where a power utility customer only uses electricity supplied by the power utility and does not produce any energy through on-site power generation means, the energy load will be based simply upon net (electric) load as measured over a set time period, such as metered by a power utility's on-site power meter for a monthly electricity bill. Second, where a customer also has an on-site solar power generation system (or other type of on-site power generation system) installed that is separately metered by the power utility, the electric load will be based upon the power utility-metered net electric load plus the power utility-metered solar power generated during that same time period. Third, where on-site solar power generation is in place but is not metered by the power utility (or is metered by the power utility but not added into the net load), the electricity generated through solar power will need to be added to the power utility-metered net load to yield the energy load in toto. Otherwise, the energy load will be underreported due to the exclusion of on-site solar power generation. Note that there could also be other metering devices installed at a customer's building, such as a meter for natural gas, liquid propane, or water. Where applicable, the energy consumption based on a metered fuel might also need to be factored into a customer's energy load in a manner similar to the third case of unmetered on-site solar power generation.

On-site solar power generation can be determined by obtaining historical data chronicling on-site power generation over the same time period as net load for electricity consumption (from, for instance, the power utility), provided that the on-site power generation was separately metered though a meter within the customer's electricity circuits before their (single utility-provided) electricity power meter or otherwise measured or tracked. Alternatively, the on-site power generation can be estimated by relying on a retrospective "forecast" of photovoltaic power generation created using, for instance, the probabilistic forecast of photovoltaic fleet power generation, such as described infra beginning with reference to FIG. 1 assuming a fleet size that consists of only one photovoltaic system using Equation (12). Other methodologies for determining on-site solar (or other) power generation are possible.

Energy that has been used specifically for interior environmental conditioning (space heating or cooling), whether electricity or consumable fuel, is not typically measured separately because power utility customers generally have only a single power meter installed on their building for each energy or fuel source. A single power meter can only measure net load for that type of energy and is unable to disaggregate load by individual component use. As a result, when measured using a single power meter, the meter's measurement of net load will combine all downstream consumption for the devices within a building that rely on the energy provided through that power meter, regardless of component load type, including seasonal heating and cooling fuel consumption, as well as end-uses, such as water heating, cooking, and clothes drying. Adjustment to factor in on-site power generation may be required, as discussed infra.

Net load, as periodically measured through a power meter or similar single-point source, over a period of interest p is obtained (step 241). The net load data can be obtained from utility-metered energy consumption data as generally maintained by a power utility for billing purposes, or from other sources of data, such as a customer's utility bill records. The net load could also be measured on-site, provided that power metering infrastructure is available and accessible, such as through the use of a smart meter.

If no on-site power generation is in use, the net load can be used as the energy load for the building. However, net load will need to be adjusted (step 242) in situations where on-site power generation, such as a photovoltaic system, is installed or another fuel is consumed, such as natural gas, for space heating. Where no separate power meter has been installed in the building for measuring on-site power generation, the "raw" net load obtained from the power utility or other source will effectively disguise any power produced by an on-site power generation source that has occurred downstream from the single power meter for only measuring utility-supplied electricity. By providing electricity to the building after the point at which the power utility measures consumption, on-site power generation decreases the net load observed by the power utility for the building and effectively hides the overall energy load. Actual energy load can only be correctly assessed by combining the power meter-measured net load with any on-site generation source-contributed energy to yield the energy load (step 242). On-site solar power generation can be obtained from either historical records, provided that on-site power generation was measured and recorded, or the on-site power generation can be estimated (retrospectively "forecast") using the probabilistic forecast of photovoltaic fleet power generation, such as described infra beginning with reference to FIG. 1, by assuming a fleet size that consists of only one system using Equation (12). Other methodologies for determining on-site power generation are possible The measured outdoor temperature data for the customer's location over the same period $$T_p^{Outdoor}$$

is also obtained (step 243), which can be obtained from the SolarAnywhere® database service, cited supra, or other sources of meteorological data. The meteorological data could also be measured on-site, provided a temperature monitoring infrastructure is available.

The issue of the unavailability of space heating and space cooling fuel usages can be addressed by adding the average rate of other fuel consumption in the heating period to Equation (92) to get average fuel for all loads over the selected period to which the heating formula applies:

$$AvgFuel_p = -\overbrace{(FuelRate^{Heating})}^{Constant}\overbrace{(T_p^{Outdoor})}^{Varies} + \\ \underbrace{AvgOtherFuel + (FuelRate^{Heating})(T^{Balance\,Point})}_{Constant} \quad (95)$$

Likewise, a similar approach is applied to a cooling period:

$$AvgFuel_p = \overbrace{(FuelRate^{Cooling})}^{Constant}\overbrace{(T_p^{Outdoor})}^{Varies} + \\ \underbrace{AvgOtherFuel - (FuelRate^{Cooling})(T^{Balance\,Point})}_{Constant} \quad (96)$$

Equations (95) and (96) can be expressed as a pair of lines in a slope-intercept form and can be expressed in a graph or other numerical representation (step 244) to respectively represent the average fuel consumptions for heating and cooling. Average outdoor temperature during the period is the independent variable (along the x-axis) and average metered fuel (for all loads) during the period is the dependent variable (along the y-axis). The FuelRate$^{Heating}$ and FuelRate$^{Cooling}$ are then determined by finding the slopes of the lines respectively corresponding to Equations (95) and (96) (step 245). The slopes of the lines can be calculated using linear regression, or some other methodology. Finally, the two Balance Point Temperatures are found (step 246) by determining the outdoor temperature above which energy consumption deviates from the lines representing heating and cooling.

As illustrated in FIG. 18, plotting the (x, y) results for each month over several years generates points along the two lines. The points follow a season-dependent linear trend, as predicted by Equations (95) and (96). Natural gas consumption depends on temperature only in the heating season. The home in this example does not use natural gas for space cooling. The resulting slope of line 230 represents the FuelRate for heating, as predicted by Equation (95).

Consistency Under Diverse Conditions

FuelRate is an objective measure of building performance. FuelRate can be calculated using two readily-available, empirical data sources: (1) outdoor temperature; and (2) natural gas usage. The same methodology can be applied to electricity consumption for cooling, electricity consumption for electric space heating, fuel oil for heating, or any other combination of fuels for heating or cooling, provided that the fuel consumption data and local outdoor temperature data are available.

Figure 20:
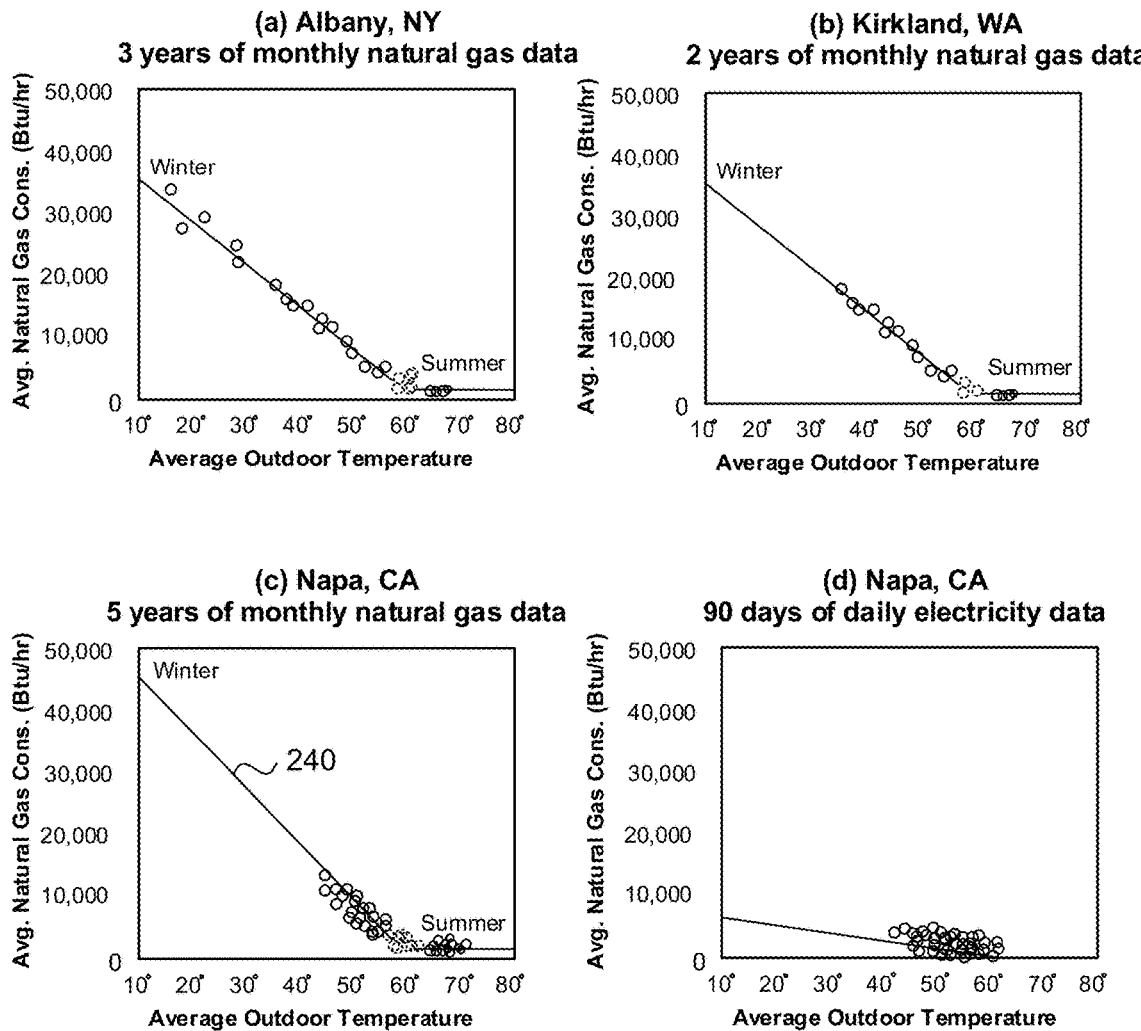
FIG. 20 includes graphs depicting, by way of examples, average fuel consumption versus average outdoor temperature for four configurations.

The analysis has been applied to geographically separated locations to demonstrate consistency of results under diverse conditions. FIG. 20 includes graphs depicting, by way of examples, average fuel consumption versus average outdoor temperature for four configurations. In each of the graphs, the x-axis represents average outdoor temperature in degrees Fahrenheit and the y-axis represents average natural gas consumption in Btu per hour (Btu/hr). Referring first to graph (a) in FIG. 20, the graph depicts three years of monthly natural gas data for a home in Albany, N.Y. This home had a natural gas boiler for heating. Referring next to graph (b) in FIG. 20, the graph depicts two years of monthly natural gas data for a home in Kirkland, Wash. This home had a natural gas furnace. Referring next to graph (c) in FIG. 20, the graph depicts five years of monthly natural gas data for home in Napa, CA. This home had a natural gas furnace. Finally, referring to graph (d) in FIG. 20, the graph depicts 90 days of daily electricity consumption for the same home in Napa, CA after conversion to an electric heat pump and improvements to the building shell. Importantly, the slopes of the lines in each graph are well-behaved across geographical regions and heating fuels, which suggests that FuelRate can be obtained at any utility where total fuel consumption is metered. Thus, the analysis methodology is broadly applicable by region and fuel since all power utilities meter fuel consumption for billing purposes.

Effective R-Value

As discussed supra, the analysis produces two key empirical metrics, FuelRate$^{Heating}$ and FuelRate$^{Cooling}$, to characterize building performance. This part applies results from the analysis and uses the FuelRate metric to derive a building metric that is an intuitive, standard metric that can be used for all buildings, called the Effective R-Value (R$^{Effective}$).

Derivation

Fourier's Law characterizes thermal conduction through a material. Fourier's Law states that the flow of heat per unit area is proportional to the temperature gradient across the material. Building analysis commonly expresses this property in terms of thermal resistance, or "R-value."

Fourier's Law can be written for a surface that has an area of A$^{Total}$ as:

$$Q = \frac{A^{Total}\Delta T}{R} \tag{97}$$

An equivalent Effective R-Value for a building that represents the overall resistance to heat flow can be expressed as an overall heat transfer coefficient that can be used to calculate total heat transfer through all surfaces, for instance, windows, walls, and so forth, that make up the total building surface area A$^{Total}$:

$$Q = (U)(A^{Total})\Delta T \tag{98}$$

where:

$$R^{Effective} = \frac{1}{U} \tag{99}$$

Thus, Effective R-Value can serve as an alternative metric for characterizing overall building performance, particularly as most people are already familiar with the concept of an R-value. Effective R-Value is also positively correlated with efficiency, where a higher R-value correlates to a better thermally efficient building.

Solving Equation (89) for (1/U) and substituting for Effective R-Value R$^{Effective}$ yields:

$$R^{Effective} = \frac{A^{Total}}{FuelRate^{Heating} * \eta^{Heating}} \tag{100}$$

Equation (100) indicates that Effective R-Value is calculable from three directly measurable inputs: (1) building surface area (A$^{Total}$), (2) FuelRate$^{Heating}$, and (3) HVAC heating efficiency ($\eta^{Heating}$).

Note that Equation (100) can be stated in a more generalized form for when there are two sources of heating. For example, with a natural gas furnace, heat is delivered directly by burning natural gas and also by the waste heat from the fans used to move heat around the home. Thus, the heating efficiencies of the two different systems that deliver heat to the building must be separately applied, that is, determine the natural gas FuelRate and apply the HVAC efficiency of the natural gas system, then determine the electricity FuelRate and apply the efficiency of the waste heat from electricity, which would be 100%.

Estimating a Building's Surface Area

Calculating an Effective R-Value for a house requires the thermal conductivity UA$^{Total}$, the building's surface area, and heating or cooling system efficiency, $\eta^{Heating}$ and $\eta^{Cooling}$, respectively. A building's surface area can be estimated based on floor area and heights and number of floors, which are values that are typically available through tax assessor records. This estimation assumes that the building has a square base.

Let A represent the floor area of a building, F represent the number of floors, and H represent the height per floor. The area per floor equals the total floor area divided by the number of floors.

Surface Area of Ceiling and Floor

The surface area of the ceiling equals the area per floor. The surface area of the floor also equals the area per floor. Thus, the combined surface area of the ceiling and floor equals $$2 \times \frac{A}{F}.$$

Surface Area of Walls

The length of one side of a floor equals the square root of the area per floor, or $$\sqrt{\frac{A}{F}}.$$

The surface area of the four walls equals four times height times the number of floors times the length of a side, that is, $$4HF\sqrt{\frac{A}{F}}).$$

Total Surface Area of Ceiling, Floor, and Walls

The total surface area $A^{Total}$ equals the sum of the surface areas of the ceiling, floor and walls:

$$A^{Total} = 2\left(\frac{A}{F}\right) + 4HF\sqrt{\frac{A}{F}} = 2\left(\frac{A}{F}\right) + 4H\sqrt{AF} \quad (101)$$

Ratio of Surface Area to Floor Area

To find the ratio of the surface area to the floor area, divide Equation (101) by A:

$$\text{Ratio of Surface Area to Floor Area} = \frac{2}{F} + 4H\sqrt{\frac{F}{A}} \quad (102)$$

Translation of Results

This section derives Effective R-Values for representative homes based on results from JOHN RANDOLPH & GILBERT M. MASTERS, ENERGY FOR SUSTAINABILITY: TECHNOLOGY, PLANNING, POLICY (Island Press 2008) and demonstrates that the Effective R-Value is typically R-5 for older houses, R-8 for new code-built houses, and R-17 for super insulated houses (R-values in units of hr-° F.-ft²/Btu). Randolph and Masters created an index called the Thermal Index (Id. at 244), derived by multiplying a building's thermal conductivity UA$^{Total}$ by 24 hours and dividing by the building's floor area:

$$\text{Thermal Index} = \frac{UA^{Total} * 24}{\text{Floor Area}} \quad (103)$$

The relationship between Effective R-Value and Thermal Index can be determined by combining Equations (99) and (103). Substituting $$UA^{Total} = \frac{A^{Total}}{R^{Effective}}$$

into Equation (103) and solving for Effective R-Value equals:

$$R^{Effective} = \left(\frac{24}{\text{Thermal Index}}\right)\left(\frac{A^{Total}}{\text{Floor Area}}\right) \quad (104)$$

Randolph and Masters present predicted numbers for their Thermal Index (Id. at 245). Assuming that these values are for single-story, 1,500 ft² houses, the conversion to Effective R-Value is presented Table 3.

TABLE 3

| | Thermal Index | Effective R-Value |
|---|---|---|
| Older houses | 15 | 5 |
| New code-built houses | 8 | 8 |
| Super insulated houses | 4 | 17 |

Example Calculation of Effective R-Value

Figure 21:
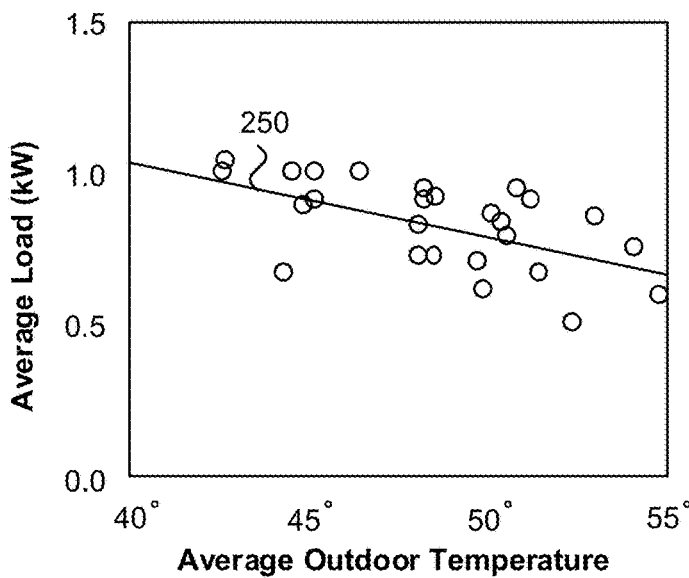
FIG. 21 is a graph depicting, by way of example, average electricity consumption versus average outdoor temperature for the sample home in Napa, CA based on monthly data.

Consider an example Effective R-Value calculation. In graph (c) in FIG. 20, the graph depicts natural gas consumption data for the home in Napa, CA. Natural gas furnaces require electricity to operate the air distribution fans. As a result, some electricity consumption during the heating season is temperature-related. FIG. 21 is a graph depicting, by way of example, average electricity consumption versus average outdoor temperature for the sample home in Napa, CA. based on monthly data. The x-axis represents average outdoor temperature in degrees Fahrenheit. The y-axis represents average electricity load in kW.

As discussed supra, the slope of the lines 240 and 250 represents the FuelRate metric. Graph (c) in FIG. 20 implies that the home would consume 46,300 Btu per hour of natural gas when the outdoor temperature was 10° F. and 4,500 Btu per hour when the outdoor temperature was 55° F., where line 240 has a slope of 929 Btu/hr-° F. Thus, the natural gas FuelRate is 929 Btu/hr-° F. FIG. 21 implies that the electricity FuelRate is 24 Watts/° F., which converts to 82 Btu/hr-° F. (in Imperial units).

Assume that the natural gas furnace in the sample house had a 70% efficiency, including duct losses, and that the waste heat from the electric fans had a 100% efficiency, that is, all of the heat generated by operation of the fans heated the home. Table 4 illustrates that the natural gas furnace delivered 650 Btu/hr-° F. and, when combined with the waste heat from electricity, the total heat delivered was 732 Btu/hr-° F.

The usable floor space (obtainable from public tax records) can be used to calculate A$^{Total}$ using the methodology for estimating surface area from building square footage and floor area, described supra. Thus, this two-story, 2,871 ft² house has an estimated surface area of 5,296 ft². The house has an Effective R-Value of R-7.2.

TABLE 4

|  | Fuel Rate | HVAC Efficiency | Delivered Heat |
|---|---|---|---|
| Natural Gas | 929 Btu/hr-° F. | 70% | 650 Btu/hr-° F. |
| Electricity | 82 Btu/hr-° F. | 100% | 82 Btu/hr-° F. |
|  |  |  | 732 Btu/hr-° F. |

|  | Floor Area | Surface to Floor Ratio | Surface Area |
|---|---|---|---|
| Building Area | 2,871 sq. ft. | 1.84 | 5,296 sq. ft. |
| Effective R-Value |  |  | 7.2 |

Effective R-Value as a Building Standard

The Effective R-Value is a promising metric for characterizing building performance. Policy makers could use this value as the basis of a building standard by requiring that buildings meet a specified numeric R-Value. There are several advantages of using Effective R-Value as a standard, as follows.

Effective R-Value Normalizes Building Performance

First, Effective R-Value normalizes building performance for weather conditions, building configuration, and consumer preferences. Effective R-Value is independent of weather conditions since the underlying FuelRate calculation removes the effect of weather conditions. This aspect of Effective R-Value allows buildings in different regions to be directly compared.

For example, the Effective R-Value can be compared to the Passive House standard (stated in Btu/hr-ft²), as discussed in more detail infra, by dividing by floor area and converting to Watts per square meter. The general form of the equation is that the house meets the Passive House Standard if the following condition is satisfied:

$$\text{Passive Standard} \geq \left[\frac{\left(\frac{\text{Surface Area}}{R-\text{Value}}\right)(T^{Balance} - T^{Design})}{\text{Floor Area}}\right] \quad (105)$$

Rearranging Equation (105) to solve for the R-Value yields:

$$R\text{-Value} \geq \left(\frac{1}{\text{Passive Standard}}\right)\left(\frac{\text{Surface Area}}{\text{Floor Area}}\right)(T^{Balance} - T^{Design}) \quad (106)$$

The Passive House standard is 10 W/m². Using the correct conversion factor, which is $$\left(\frac{3.412 Btu/h}{W}\right)\left(\frac{1m}{3.281\ ft}\right)^2 = 0.317\frac{Btu/h - m^2}{W - ft^2},$$

the Passive House standard is equivalent to 3.17

$$\frac{Btu/h}{ft^2}.$$

The ratio of Surface Area to Floor Area equals $$\frac{2}{F} + 4H\sqrt{\frac{F}{A}}.$$

Making the correct substitutions, an R-Value (in units of $$\frac{ft^2 - °F}{Btu/h}$$

) satisfies the Passive House standard if:

$$R\text{-Value} \geq (0.3153)\left(\frac{2}{F} + 4H\sqrt{\frac{F}{A}}\right)(T^{Balance} - T^{Design}) \quad (107)$$

The Passive House Standard for a two story, 2,871 ft² house with floor heights of eight feet, a Balance Point Temperature of 58° F., and Design Temperature of 33° F. is satisfied if the R-Value of the house exceeds 14.5, that is, $$(0.3153)\left(\frac{2}{2} + 4*8\sqrt{\frac{2}{2,871}}\right)(58° - 33°) = 14.5\frac{ft^2 - °F}{Btu/h}.$$

In addition, Effective R-Value normalizes results based on surface area, not floor area, which removes the effect of building configuration. Thus, the Effective R-Value for a single-story home can be directly compared to the Effective R-Value for a multi-floor apartment building.

Finally, Effective R-Value removes the effect of consumer preferences, particularly average indoor temperature. Consumer behavior affects total fuel consumption. The effect however, occurs through the Balance Point Temperature and not the FuelRate. Note that the Effective R-Value affects Balance Point Temperature, but not vice-a-versa.

Effective R-Value is Based on Measured Data

Effective R-Value is based on measured data, as demonstrated herein. This aspect of Effective R-Value means that compliance of a building can be verified based on measured energy consumption.

Effective R-Value Supports Detailed Energy Audits

Effective R-Value is an empirically-derived number that supports detailed energy audits. The sum of the losses reported by a detailed energy audit, normalized by surface area, must equal the inverse of Effective R-Value. If the results do not match, something is incorrect in either the detailed energy audit, total surface area, or assumed HVAC efficiency. This leads to the approach where the specific surface area R-Values can be confidently estimated without requiring an on-site visit.

Effective R-Value Accurately Predicts Fuel Consumption when Combined with Other Parameters Effective R-Value accurately predicts fuel consumption when combined with surface area, HVAC Efficiency, and the Balance Point Temperature. Fuel consumption can therefore be calculated with four building specific numbers, one of which depends on consumer behavior, and weather data. This aspect of Effective R-Value allows future fuel consumption in light of investments that improve a home's Effective R-Value to be accurately predicted and also allows long-term fuel consumption to be predicted by combining results with previous weather data sets.

Effective R-Value may be Meaningful to Average Consumers

As a standardized metric, Effective R-Value may be meaningful to average consumers. Building energy efficiency experts often use terms that have little meaning to typical consumers. However, stating results as Effective R-Values will provide consumers with a metric of comparison. For example, if a consumer has a home with an Effective R-Value of R-6, that value can be compared to an R-13 value associated with 4" of fiberglass insulation in a wall with 2×4 studs.

Comparison to Existing Standards

Effective R-Value is a useful metric for several reasons. First, the metric normalizes building performance for weather conditions and building configuration, including floor area and number of floors. Second, the metric is independent of consumer temperature comfort level. Third, the metric is based on measured, rather than modeled, data. Fourth, the metric supports detailed energy audits. Fifth, the metric can be used to predict annual fuel consumption when combined with energy investment scenarios, including on-site photovoltaic power generation. Finally, the metric may be an intuitive metric for average consumers.

Effective R-Value can be used to support or improve existing building standards. Consider a few of the standards.

Zero Net Energy (ZNE)

A building meets the ZNE standard if renewable energy sources, such as photovoltaic power generation, produce enough energy to supply annual consumption. To determine whether a house meets the ZNE standard, simply sums net energy consumption, including electricity and natural gas, over the course of a year and the house is ZNE if the total net energy equals zero or less.

The ZNE standard provides no information about the quality of the building shell, the efficiency of the HVAC system, or the energy required to power the HVAC system in the winter and summer. Homeowners can simply oversize photovoltaic generation to account for inefficient building shells or HVAC systems. Furthermore, ZNE homes are not without emissions, such as occurs with natural gas consumption.

The Effective R-Value could be used to characterize existing buildings prior to the installation of photovoltaic power generation to help building owners evaluate the trade-off between building shell and HVAC investments versus incremental photovoltaic power generation capacity. Both investment options could result in a ZNE home, but the analysis using Effective R-Value could lead to the most cost-effective path towards meeting the ZNE standard.

Home Energy Rating System (HERS)

HERS is a common building performance rating system; a HERS index of 100 corresponds to the energy use of the "American Standard Building," while a HERS index of 0 indicates that the building uses no net purchased energy. The HERS rating system informs homeowners on how their homes compare to other homes, yet the system does not explicitly guide consumers how to improve their home's energy performance. Further, results are primarily based on modeled results, rather than empirically measured values. By incorporating the Effective R-Value into the analysis, building owners could make better informed decisions about how to improve the HERS ratings of their buildings.

California Title 24 Energy Code

The California Title 24 energy code takes a prescriptive approach to building standards. A prescriptive approach may be useful when guiding consumers about which investments to make; however, this approach does not provide a good measure of the overall thermal performance of an existing building. Policy makers could use the Effective R-Value as an alternative building standard that allows for such variations. Furthermore, a building standard based on Effective R-Value would lend itself to measurement and verification using actual usage data.

Passive House

The Passive House standard was developed in Germany in the 1990s and has become one of the most aggressive thermal home performance standards in the world. The Passive House standard requires that a house meet four requirements covering space heating (and cooling, if applicable) energy demand(s), renewable primary energy demand, airtightness, and thermal comfort. The Passive House standard is appealing in that the standard provides a Yes or No answer as to whether a home is compliant. However, the standard does not provide a fundamental answer on building shell effectiveness. Moreover, the Passive House standard is location-dependent and measured as an annual energy (demand) consumption or a peak demand value.

The analysis discussed herein uses building surface area, rather than floor area, because the underlying equations governing heat transfer are based on the area through which heat passes, considerations that are not observed under the Passive House standard, which defines maximum usage per unit of floor area.

Complete Virtual Energy Audit

Here, building performance is remotely analyzed using customer energy load, collected and aggregated in either hourly or monthly intervals, and externally-supplied meteorological data. These data are used to disaggregate building thermal load into individual categories of component loads, such as heating, cooling, and constant "always-on" baseloads, which can provide valuable insights into consumer behaviors. For instance, building thermal loads are temperature-driven and tend to define a utility's system peak, which is a crucial metric for balancing power generation and consumption.

The analysis discussed herein, also referred to as the Virtual Energy Audit, encompasses both thermal and non-thermal loads, that is, loads other than heating and cooling. This section provides a methodology for disaggregating electrical loads into four component loads, heating, cooling, baseload, and other. The methodology can take advantage of advanced metering infrastructure (AMI, or simply, "smart metering"), as available, including the detection of baseloads and days when a building is unoccupied.

The Virtual Energy Audit produces the following information:

Building-specific, objective parameters useful in modeling the building's energy consumption.

"Effective R-Value," an intuitive comparative metric of overall building thermal performance.

Disaggregation of electrical loads into heating loads, cooling loads, baseloads, and other loads.

This information can be used by the planners and operators of power utilities to help assess on-going and forecasted power consumption and in adjusting or modifying the generation or procurement of electric power, as well as for other purposes of concern to a power utility or other related parties.

Bundling Technologies with Solar: The Solar+ Home

Solar photovoltaic system installations have grown exponentially over the last decade with these systems being bundled with other technologies. For example, solar power generation is being increasingly bundled with power storage (Solar+Storage). Solar power generation is also being bundled with electric vehicles (Solar+EV) and with efficiency (Solar+Efficiency). A combination of all three technologies could be termed "Solar+Storage+EV+Efficiency." However, the combination does not guarantee a beneficial load profile from the perspective of the power utility because the way that these technologies impact a power grid depends upon the dispatch method. As used herein, homes that employ and operate these technology bundles for the mutual benefit of the customer and the power utility will be called "Solar+ homes."

The Solar+ Home Approach

Figure 22:
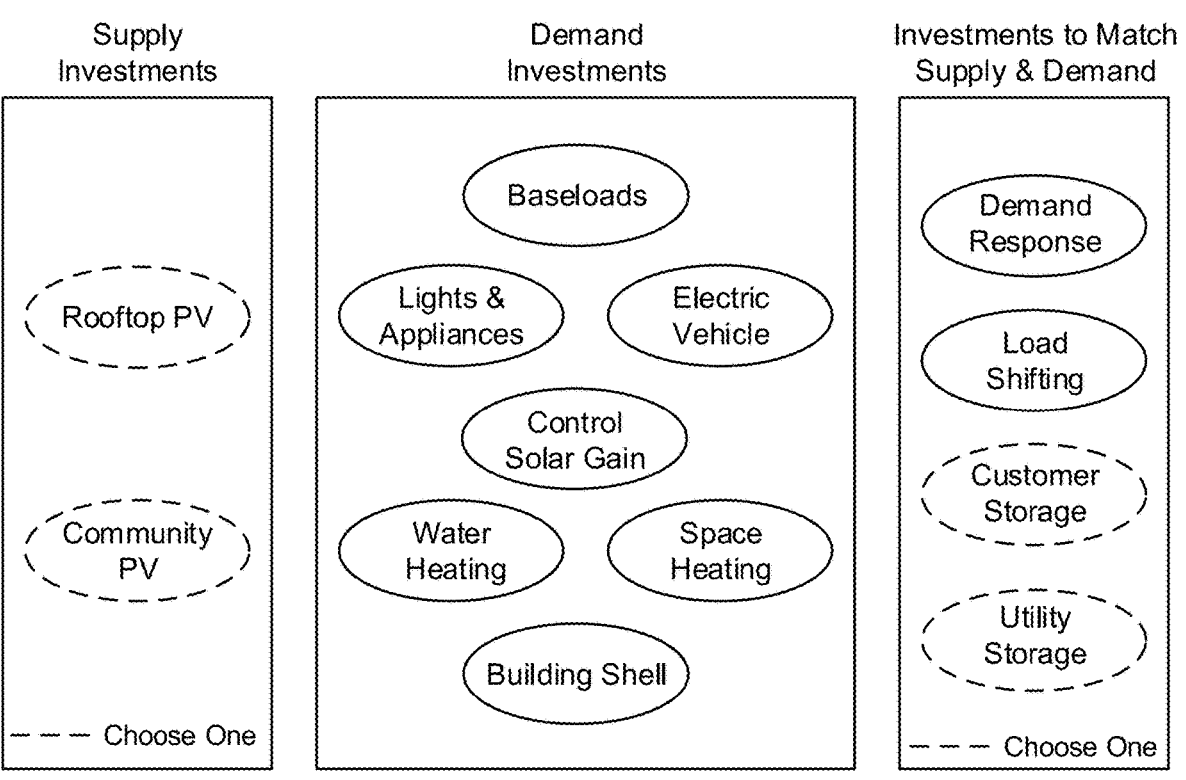
FIG. 22 is a block diagram showing, by way of examples, Solar+ home technology blends.

A Solar+ home is created by combining multiple technology components. FIG. 22 is a block diagram showing, by way of examples, Solar+ home technology blends. In this example, there are three broad categories of investments. In the first category (shown on the left), a Solar+ home has a primary supply of electrical energy that is solar photovoltaic power generation, either rooftop or community photovoltaic, that is, photovoltaic power generation situated on the Solar+ home or from a pooled shared solar photovoltaic system. In the second category (shown in the middle), a Solar+ home incorporates demand-side investments to reduce and electrify consumption. In the third category (shown on the right), a Solar+ home matches the investments in supply (solar photovoltaic power generation) with the investments in demand, which can be accomplished by using demand response/load control, load shifting, customer-sited or utility-sited (energy) storage, or a combination of the foregoing options.

Prototype Solar+ Home Monitoring

For empirical purposes, a Solar+ home approach was applied to an existing residential retrofit home in Napa, CA.

This sample home has 2,871 ft$^2$ of floor area. Prior to any investments, a manual, on-site energy audit determined that the home had a HERS rating of 125, which meant that the home consumed more energy than the "American Standard Building."

Measured Disaggregated Energy Consumption

Monitoring of detailed end-use energy consumption in the sample home has been performed since June 2014. FIG. 23 is a bar chart showing, by way of example, three-and-a-half years of consumption and production data by circuit for the sample home. Table 5 presents the measured consumption and production data values. In FIG. 23, the x-axis represents the consumption and production data grouped into applicable periods of time and the y-axis represents energy in kWh. Each reported year starts on July 1. The final year only contains six months of data with results scaled by multiplying by two. The data acquisition system monitored ten circuits, (1) refrigerator, (2) heating (using electric heating in the 2014-2015 and 2015-2016 heating seasons, then switching to a heat pump in the 2016-2017 heating season) and cooling, (3) cooking (three separate circuits for cooktop, oven, and microwave), (4) laundry (washer and dryer combined), (5) dishwasher, (6) heat pump water heater, (7) EV, and (8) solar photovoltaic. In addition, detailed temperature, $CO_2$, and humidity measurements were recorded at five locations throughout the home (upstairs, downstairs, attic, garage, and outdoors) since April 2015.

Note that there is a wide variation in electricity used for heating across each of the years; the first and third years had approximately the same amount of consumption, while consumption in the second year was more than double that of the first year. Also, there was a notable increase in the amount of energy used for lights and miscellaneous items in 2016-17. The variation in electricity used for heating is particularly surprising because electric resistance was the heat source for the first two years, while a high efficiency mini-split heat pump was the heat source in the third year, which suggests that the change in consumption was weather-related.

TABLE 5

| | Jul. 1, 2014-Jun. 30, 2015 | | Jul. 1, 2015-Jun. 30, 2016 | | Jul. 1, 2016-Dec. 31, 2016 | | Jul. 1, 2017-Dec. 31, 2017 | |
|---|---|---|---|---|---|---|---|---|
| | Cons. | Prod. | Cons. | Prod. | Cons. | Prod. | Cons. | Prod. |
| Refrigerator | 512 | | 467 | | 470 | | 523 | |
| Lights & Misc. | 1,460 | | 1,499 | | 2,080 | | 1,964 | |
| Space Heater | 1,780 | | 3,838 | | 1,228 | | 909 | |
| Cooling | 0 | | 50 | | 27 | | 49 | |
| Cooking | 527 | | 385 | | 457 | | 494 | |
| Laundry* | 146 | | 111 | | 141 | | 136 | |
| Dishwashing | 224 | | 184 | | 209 | | 236 | |
| Water Heating | 727 | | 579 | | 594 | | 535 | |
| EV | 2,340 | | 1,799 | | 3,935 | | 2,119 | |
| Solar | | 8,108 | | 7,814 | | 7,725 | | 7,786 |

*Natural gas consumed for laundry is excluded. It equals about 24 therms per year.

Virtual Energy Audit Procedure

Figure 24:
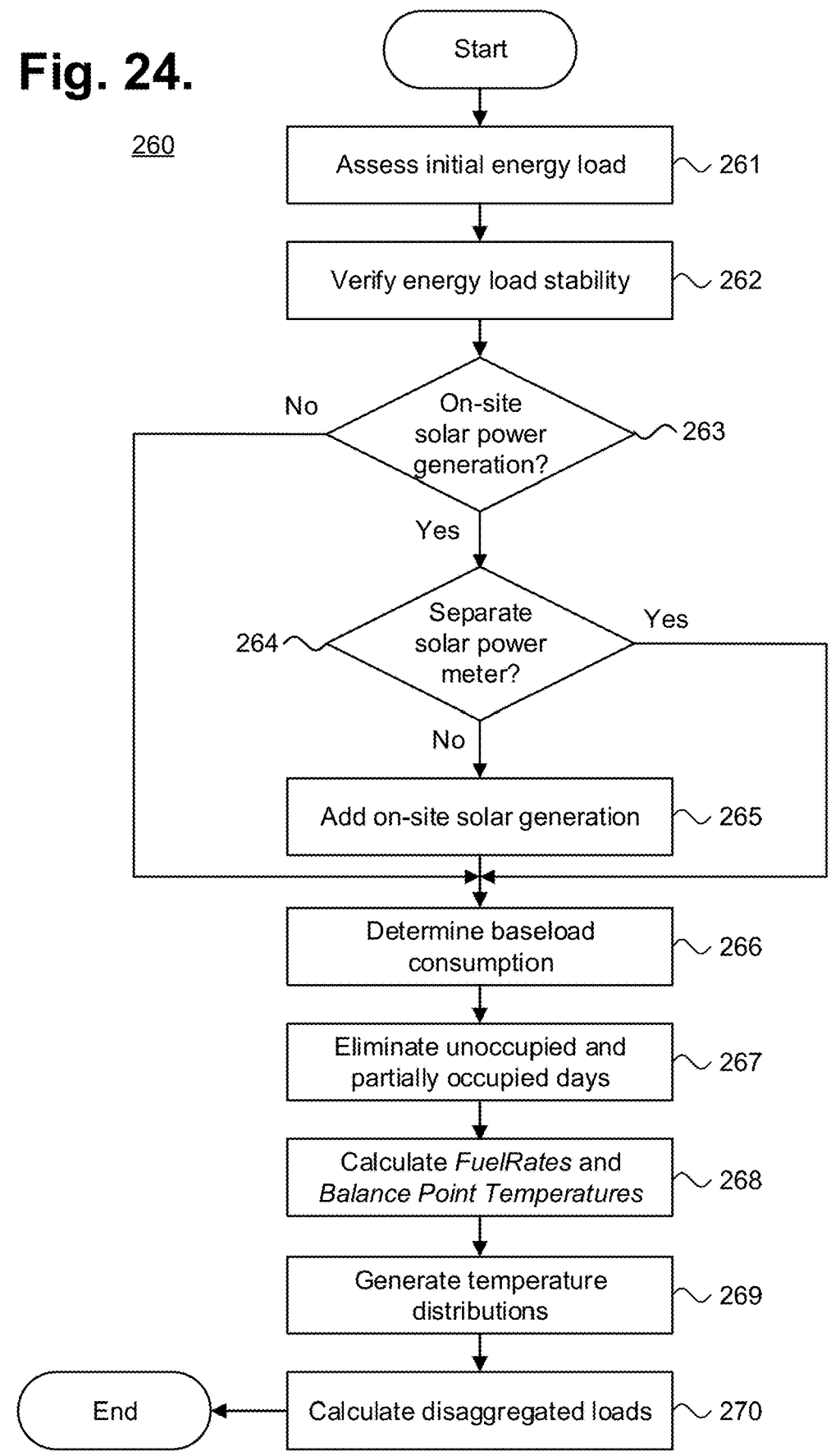
FIG. 24 is a flow diagram showing a method for performing power utility remote consumer energy auditing with the aid of a digital computer in accordance with a further embodiment.

The Virtual Energy Audit can be performed over a shorter or longer period or periodically to determine changes in building performance. FIG. 24 is a flow diagram showing a method 260 for performing power utility remote consumer energy auditing with the aid of a digital computer in accordance with a further embodiment. The method 260 can be implemented in software and execution of the software can be performed on a computer system, such as further described infra, as a series of process or method modules or steps, in combination with intelligent "smart" metering, heating and cooling components, intelligent "smart" thermostats, and other devices that manage, control, monitor, and operate energy consuming items. In addition, by way of examples, FIG. 25 includes graphs showing the results for each step of the method 260 of FIG. 24 for the sample house.

As an initial step, an energy load for the building can be assessed (step 261). Data for assessing the energy load can be obtained from utility-metered energy consumption data, such as generally maintained by a power utility for billing purposes, or from other sources of data, such as a customer's utility bill records. The energy load data could also be measured on-site, provided that power metering infrastructure is available, such as through a smart meter. Note that at this stage, the energy load is preliminary and subject to adjustment in situations where on-site power generation is use, as discussed infra.

Second, the stability of the energy load is verified (step 262). Energy load stability can be assessed by evaluating cumulative energy load versus time, then scanning the results for discontinuities or irregularities. For instance, the assessment can be made using a simple two-dimensional graph. Referring to graph A in FIG. 25, the x-axis represents dates occurring during the period of interest, Sep. 16, 2016 to Sep. 15, 2017 and the y-axis represents cumulative fuel consumption in kWh. The energy load over the period of interest reflects the notable increase in the amount of energy used for lights and miscellaneous items previously observed in 2016-17.

Referring back to FIG. 24, this step identifies significant changes in the energy load that could invalidate analytical results; adjustments can be made to the energy load as necessary to address any significant changes identified. For example, a customer could have added a new room to the home, installed a photovoltaic power generation system, purchased an electric vehicle, or switched from natural gas to heat pump space heating. Investments that occur in the middle of an analytical time frame may require adjustments, such as restricting the analysis to a time frame before or after the investment.

Third, the energy load, as verified and adjusted to address any significant changes, may need to be further adjusted to factor in any on-site power generation, which will typically be photovoltaic (solar) power generation. Where no on-site power generation is installed, the customer's energy load is simply based upon net energy (electric) load as measured over a set time period, such as metered by a power utility's on-site power meter for a monthly electricity bill and no adjustment to the energy load is required for present analytical purposes.

Similarly, if on-site solar (or other) power generation is in use (step 263), and a separate power meter for the on-site solar power generation system is installed (step 264), the energy load will not need to be adjusted for present analytical purposes, provided that the customer's power utility is monitoring both the building's electric power meter and the solar power meter and that the data for the energy load is provided by the utility as the sum of utility-supplied electricity and on-site power generation. If the power utility provides individual values for the separately metered utility-supplied electricity and on-site power generation, the energy load required for present analytical purposes can be readily determined by just adding these two values.

An adjustment to the energy load may be needed if there is no separate solar power meter in use (step 264). The adjustment is made by adding the on-site power that was generated over the same period to the energy load (step 265) to yield the energy load required for present analytical purposes. Typically, on-site power will be generated through solar, although other forms of on-site power generation may apply. On-site solar power generation can be obtained from either historical records, provided that on-site power generation was measured and recorded, or the on-site power generation can be estimated by retrospectively "forecasting" power generation, for instance, by using a probabilistic forecast of photovoltaic fleet power generation, such as described infra beginning with reference to FIG. 1, by assuming a fleet size that consists of only one system in Equation (12). Other methodologies for determining on-site power generation are possible. Note that this same adjustment would need to be made to the energy load for any other types or additional sources of on-site power generation, including fuel cells, natural gas generators, diesel generators, and so forth.

Fourth, the baseload is determined (step 266). The baseload can be estimated using the total customer electric load formed into a time series, such as described in commonly-assigned U.S. Pat. No. 10,747,914, issued Aug. 18, 2020, the disclosure of which is incorporated by reference. The time series is then expressed as a frequency distribution as a function of average periodic demand for power, where the average periodic demand for power that most frequently occurs during the period of observation is identified as the baseload for the building. Referring to graph B in FIG. 25, the x-axis represents total metered load in kW and the y-axis represents percentage of load distribution with the average periodic demand occurring at 0.16 kW.

Referring back to FIG. 24, this step identifies the mode, that is, the most common reading, of electrical usage as the "always on" reading, which is different than using the minimum reading, which would subject the result to error under certain conditions, such as when a power outage occurs during the time frame. As discussed herein, annual baseload consumption was determined by multiplying the baseload rate (kWh per hour) by 8760, the number of hours in a year, although other ways to annualize baseload consumption are possible.

Fifth, days when either the house was unoccupied or only partially occupied are eliminated from the analysis time frame (step 267). The analysis discards these days because they can introduce error into the thermal analysis. Referring next to graph C in FIG. 25, the x-axis represents dates occurring during the period of interest, Sep. 16, 2016 to Sep. 15, 2017 and the y-axis represents total metered load in kW. There were six periods identified that contain days when either the house was unoccupied or only partially occupied.

Referring back to FIG. 24, this step eliminates factors that reduce internal gains. For example, occupants may turn down the thermostat when they leave the house for an extended period, plus there is less waste heat due to reduced electric device usage and less occupant body heat. Unoccupied days can be identified by comparing daily load to daily baseload, that is, the instantaneous baseload times 24 hours. A building can be classified as being unoccupied if the daily load is less than 120 percent of daily baseload, although other percentage comparisons are possible. In addition, the day before and the day after an unoccupied day can both be classified as partially occupied days and excluded to reflect the departure and return of the occupants as having occurred sometime during the course of those days.

Sixth, the FuelRates for heating and cooling and the Balance Point Temperatures are calculated (step 268), as described supra with reference to FIG. 19. Total non-HVAC loads are also calculated by comparing average load over periods that contain multiple consecutive days (with possible gaps due to unoccupied or partially occupied conditions) to average temperature during the periods with externally-supplied meteorological data to analyze each customer's building performance. Referring next to graph D in FIG. 25, the x-axis represents average outdoor temperatures in degrees Fahrenheit and the y-axis represents average metered load in kW. The heating line has a slope (FuelRate) of 0.053 kW/° F. and a Balance Point Temperature of 60° F. The cooling line has a slope (FuelRate) of 0.028 kW/° F. and a Balance Point Temperature of 67° F. The dashed baseload line is 0.16 kW and the solid horizontal other load line is 0.39 kW. These values are independent of temperature.

Referring back to FIG. 24, the two Balance Point Temperatures are found by determining the outdoor temperature above which energy consumption deviates from the lines representing heating and cooling, as discussed supra with reference to FIG. 18, in which the average amount of natural gas consumed for heating (or average amount of electricity for cooling) are plot against the average outdoor temperature to form lines.

Seventh, an average daily outdoor temperature frequency distribution is generated (step 269) over a year. Other time frames could be used. Referring to graph E in FIG. 25, the x-axis represents average outdoor temperatures in degrees Fahrenheit and the y-axis represents temperature distribution in degrees Fahrenheit. The graph presents the average daily outdoor temperature frequency distribution for the sample home over the period of interest.

Referring back to FIG. 24, annual consumption for heating and cooling was calculated by combining these frequencies of average daily outdoor temperature with the FuelRates for heating and cooling and the Balance Point Temperatures.

Finally, the individual component loads are calculated by disaggregating the results from the previous steps (step 270). Equations (95) and (96), discussed supra, can be expressed as lines in a slope-intercept form whose slopes respectively represent the average fuel consumptions for heating and cooling. In turn, based upon these values in combination with the load data and average daily outdoor temperatures, plus the Balance Point Temperatures as determined in this methodology, Equations (95) and (96) can be solved for the average fuel consumption for other loads AvgOtherFuel value. By subtracting out the baseload also determined in this methodology, the average fuel consumption for other loads, that is, not for heating load, cooling load, or baseload, can be found. Referring to graph F in FIG. 25, the y-axis represents annual fuel consumption in kWh per year (kWh/ yr), which presents a simplified set of results that the power utility could share with the customer to help promote understanding of the relative amounts of electricity consumption.

On-site solar power generation can be found using Equation (72) (discussed in detail supra in the section entitled, "Photovoltaic Production") if the total customer electric load and all individual load components at a given time interval are known. Equation (72) can therefore be used to corroborate a retrospective "forecast" of on-site solar power generation in situations where historically measured solar power generation data is not available.

Validation Using Measured Electricity Consumption and Temperature Data

While the Virtual Energy Audit is based on total energy consumption, detailed end-use consumption data on the Solar+ home was collected and evaluated to empirically validate the results of the Virtual Energy Audit. FIG. 26 includes graphs showing, by way of examples, a comparison of results for the sample home obtained through the Virtual Energy Audit and measured energy consumption data. The x-axes group the results for the Virtual Energy Audit and measured energy consumption data. The y-axes represent annual fuel consumption in kWh per year (kWh/yr). Graph A in FIG. 26 presents outdoor temperature data that was measured on-site and demonstrates that the Cooling and Heating categories compare comparably. Baseloads were not measured separately. Graph B in FIG. 26 presents the preceding analysis using outdoor temperature data obtained from the SolarAnywhere® database service, cited supra, to demonstrate that the audit could be performed without on-site temperature measurement. The results are nearly the same as when the analysis used on-site outdoor temperature data.

Key Performance Parameters

The preceding analysis was repeated using three-and-a-half years of data for the Solar+ home. Table 6 presents the key parameters. There are typically six parameters for each period or year. The 2008-2013 period includes results for both electricity and natural gas because the house had a natural gas furnace and natural gas water heating during that time. The subsequent periods do not include natural gas because the space heating and water heating were all electric. The house had no air conditioning in the 2014-2015 and 2015-2016 seasons.

TABLE 6

| | | | Thermal Performance | | | |
| | | | Heating | | Cooling | |
| | Non-HVAC Load | | Fuel Consumption | Balance Point Tem- | Fuel Consumption | Balance Point Tem- |
| Year | Total | Baseload | Rate | perature | Rate | perature |
|---|---|---|---|---|---|---|
| '08-'13 | 2,750 Btu/h & 0.75 kW | 0.35 kW | 929 Btu/h-° F. & 0.024 kW/° F. | 58° F. | | |
| '14-'15 | 0.36 kW | 0.12 kW | 0.129 kW/° F. | 58° F. | | |
| '15-'16 | 0.38 kW | 0.12 kW | 0.137 kW/° F. | 58° F. | | |
| '16-'17 | 0.39 kW | 0.16 kW | 0.053 kW/° F. | 60° F. | 0.028 kW/° F. | 67° F. |
| '17 H2 | 0.39 kW | 0.18 kW | 0.039 kW/° F. | 58° F. | 0.019 kW/° F. | 65° F. |

63

Validation Using Equipment Ratings

The results were also validated by comparing the implied thermal conductivity derived using the heating and cooling fuel rates and equipment ratings. The Solar+ home used resistance heating in the 2014-2015 and 2015-2016 seasons. The home used a ductless mini-split heat pump for heating and cooling in the 2016-2017 and 2017 H2 seasons. The ductless mini-split heat pump was a Ductless Aire Model DA1215-H1-0, manufactured by DuctlessAire, Columbia, S.C., with an input voltage of 115 volts and heating and cooling capacity of 12,000 Btu/hour. According to the manufacturer's website, the unit has a SEER rating of 15 and an HSPF of 8.2.

SEER is the ratio of BTU cooling output over a typical cooling season to Watt-hour (https://en.wikipedia.org/wiki/Watt-hour) of electricity used. HSPF is the ratio of British thermal unit heat output over a typical heating season to watt-hours of electricity used (https://en.wikipedia.org/wiki/British_thermal_unit). Both of these metrics have units of BTU/Watt-hr. Note that the actual heating and cooling seasons can differ from the typical seasons used to develop the rating standards.

The Solar+ home's thermal conductivity $UA^{Total}$ equals FuelRate (kW per ° F.) times the HVAC system efficiency, including ducting losses. This home has no ducting losses because the heat injection or removal takes place directly through the wall without passing through ducts, so the HVAC system efficiency is the same as the equipment efficiency and is either the SEER or the HSPF rating, depending on season. Table 7 presents the estimated thermal conductivity using the manufacturer's 15 SEER rating and 8.2 HSPF rating.

TABLE 7

|  | Fuel Rate | HSPF or SEER | Thermal Conductivity |
|---|---|---|---|
| Heating | 53 W/° F. | 8.2 Btu/Wh | 435 Btu/h-° F. |
| Cooling | 28 W/° F. | 15.0 Btu/Wh | 420 Btu/h-° F. |

The heating or cooling fuel consumption (in W/° F.) times HSPF (for heating) and SEER (for cooling) rating should result in the same thermal conductivity. Electricity consumption in the heating season with an HSPF of 8.2 implies a thermal conductivity of 435 Btu/h-° F. Electricity consumption in the cooling season combined with a SEER rating of 15.0 implies a thermal conductivity of 420 Btu/h-° F. The two results are within 4% of each other, which provides a separate confirmation of the validity of using the Virtual Energy Audit to determine a building's thermal conductivity by combining either heating or cooling fuel consumption rate with the corresponding HVAC system efficiency.

Effective R-Value

Table 4, supra, showed that the Solar+ home had an Effective R-Value of 7.2 prior to any investments. Table 8 repeats the analysis for the Solar+ home after improvements to the building shell and the installation of the mini-split heat pump (Sep. 16, 2016 to Sep. 15, 2017). The heating requirement of 0.053 kW/° F. is converted to 181 Btu/hr-° F. to find that the Solar+ home has an Effective R-Value of R-12.2.

64

TABLE 8

|  | Fuel Consumption | Efficiency | Delivered Heat |
|---|---|---|---|
| Electricity | 181 Btu/hr-° F. | 240% | 435 Btu/hr-° F. |
|  |  |  | 435 Btu/hr-° F. |

|  | Floor Area | Surface to Floor Ratio | Surface Area |
|---|---|---|---|
| Building Area | 2,871 sq. ft. | 1.84 | 5,296 sq. ft. |
| Effective R-Value |  |  | 12.2 |

The homeowner made additional investments to the Solar+ home after the 2016-2017 season, including upgrading the windows and installing a well-insulated new front door. FIG. 27 is a chart showing, by way of examples, the Effective R-Values of the sample house before upgrades, after most upgrades, and after all upgrades. Notice that the house achieves approximately the value of a super-insulated home. This chart illustrates how a utility could use the Virtual Energy Audit to track changes in building performance over time and provide measurement and verification of building upgrades.

Determining Post-Improvement Balance Point Temperature

Balance point temperature equals the indoor temperature ($T^{Indoor}$) minus average internal gains ($\overline{Q}^{Internal\ Gains}$) divided by the building's thermal conductivity ($UA^{Total}$)s. That is, $$T^{Balance\ Point} = T^{Indoor} - \left( \frac{\overline{Q}^{Internal\ Gains}}{UA^{Total}} \right) \tag{108}$$

When rearranged, $$\overline{Q}^{Internal\ Gains} = (T^{Indoor} - T^{Balance\ Point})UA^{Total} \tag{109}$$

Equation (108) implies that three variables are required to calculate balance point temperature. One needs to know the internal gains to perform the calculation. However, as mentioned above, estimating the average internal gains, particularly the solar resource portion of the gains (i.e., sun coming through windows and being absorbed by the exterior of the building shell), can be difficult. Likewise, after a building undergoes shell improvements and a new balance point temperature of a building is unknown, Equation (109) does not allow one to determine the average internal heating gains.

Figure 28:
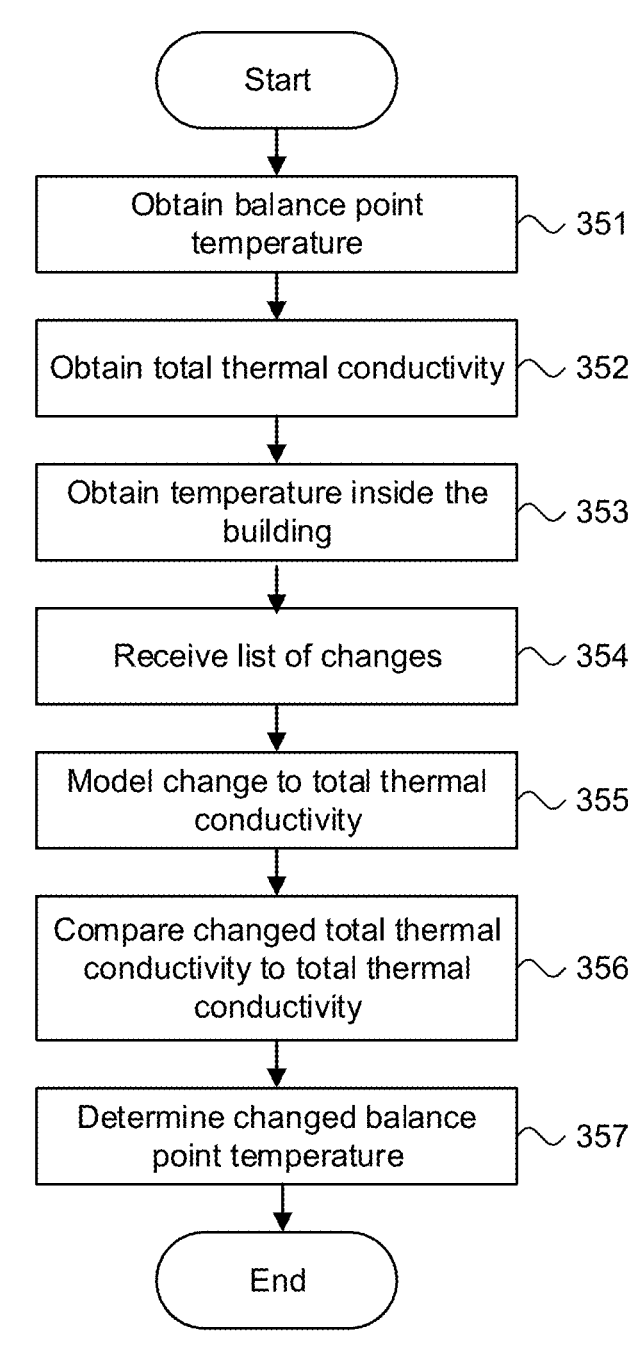
FIG. 28 is a flow diagram showing a method for determining post-modification building balance point temperature with the aid of a digital computer in accordance with one embodiment.

Method For Determining A Post-Modification Building Balance Point Temperature The method 350 described below allows one to determine the balance temperature of a building that has undergone or may undergo changes to the shell even in the absence of data associated with internal heating gains. Being able to determine a balance point temperature of a building that is about to undergo or has recently undergone shell improvements allows power grid operators to take into account fuel consumption by that building when planning for power production and distribution. Knowing the post-improvement balance point temperature also provides owners of the building information on which they can base the decision whether to implement the improvements to the shell in the first place. FIG. 28 is a flow diagram showing a method 350 for determining a post-modification building balance point temperature with the aid of a digital computer in accordance with one embodiment. The method 350 can be implemented on the system 330 described below with reference to FIG. 29. Initially, the balance point temperature of the building before the building undergoes shell improvements (or other changes affecting thermal characteristics) is obtained (step 351). The balance point can be determined based on empirical data as described above with reference to FIG. 18 and FIG. 24. Other ways to determine the balance point temperature are also possible. A building's total thermal conductivity prior to the building undergoing improvements to the shell is also obtained (step 352). The total thermal conductivity can be obtained through a short-duration empirical test, as fully described in commonly-assigned U.S. Pat. No. 10,339,232, issued Jul. 2, 2019, and U.S. Pat. No. 10,467,355, issued Nov. 5, 2019, the disclosures of which are incorporated by reference. Briefly, an empirical test is performed over a short duration in the absence of solar gain in the building, with HVAC for the building not being operated during the test. Conducting the test includes: maintaining the constant indoor temperature throughout the empirical test using an electric controllable interior heat source and expressing the constant indoor temperature as an average indoor temperature; measuring the outdoor temperature throughout the empirical test, over which an average is taken; measuring the indoor electricity consumption during the empirical test, over which an average is taken; tallying the occupancy within the building, over which an average is taken; finding the temperature difference between the average indoor and the average outdoor temperatures; and evaluating the total thermal conductivity as a function of the average occupancy and the average indoor electricity consumption over the temperature difference. Other ways to obtain the total thermal conductivity are possible.

Temperature inside the building is also obtained (step 353). The temperature can be estimated or measured by interfacing to a standalone thermometer inside the building or a smart thermostat inside the building via an Internetwork, such as the Internet or a cellular network. If the changes have not yet been done to the building shell, the temperature can be the temperature that is proposed to be maintained inside the building after the shell improvements are performed or the same temperature that is currently inside the building. Other ways to obtain the indoor temperature are also possible.

Information about one or more changes to the shell of the building, such as improvements to make the building more energy efficient, are obtained (step 354). Such changes can be installing new windows into the building or increasing the shell's insulation, though other changes that affect the thermal characteristics of the building are possible. The information can be received as a list via an Internetwork from a user device of a user associated with the building (such as an owner or a manager of the building), though other ways to obtain the changes are also possible. The changes can be proposed (not yet made) or already implemented. The list of changes can include information necessary to evaluate how the changes will affect the total thermal conductivity (described below), such as R-values of materials to be installed into the building.

A change to the total thermal conductivity that would occur upon the implementation of the changes to the shell of the building is modeled (step 355). Briefly, an approach to calculating a new value for total thermal conductivity $\widehat{UA}^{Total}$ after a series of M changes (such as building shell investments) are made to a building is described in commonly-assigned U.S. Pat. No. 10,719,789, issued Jul. 21, 2020, the disclosure of which is incorporated by reference. The approach is summarized therein in Equation (110), which provides:

$$\widehat{UA}^{Total} = UA^{Total} + \sum_{j=1}^{M}\left(U^j - \hat{U}^j\right)A^j + \rho c(n - \hat{n})V \tag{110}$$

where a caret symbol (ˆ) denotes a new value, infiltration losses are based on the density of air ($\rho$), specific heat of air (c), number of air changes per hour (n), and volume of air per air change (V). In addition, $U^j$ and $\hat{U}^j$ respectively represent the existing and proposed U-values of surface j, and $A^j$ represents the surface area of surface j. The volume of the building V can be approximated by multiplying building square footage by average ceiling height. The equation, with a slight restatement, equals:

$$\widehat{UA}^{Total} = UA^{Total} + \Delta UA^{Total} \tag{111}$$

and $$\Delta UA^{Total} = \sum_{j=1}^{M}\left(U^j - \hat{U}^j\right)A^j + \rho c(n - \hat{n})V \tag{112}$$

If there is only one investment, the m superscripts can be dropped and the change in thermal conductivity $UA^{Total}$ equals the area (A) times the difference of the inverse of the old and new R-values R and $\hat{R}$:

$$\Delta UA^{total} = A\left(U - \hat{U}\right) = A\left(\frac{1}{R} - \frac{1}{\hat{R}}\right) \tag{113}$$

Other ways to obtain the new total thermal conductivity that the building would have after undergoing shell investments are possible.

The new total thermal conductivity of the building is compared to the original thermal conductivity of the building obtained in step 352 (step 356). In one embodiment, the comparison involves calculating a fraction $\gamma$ (where $0 \le \gamma < 1$) by which the total thermal conductivity is reduced after the building undergoes the changes to the shell, such that:

$$\widehat{UA}^{Total} = (1-\gamma)UA^{Total} \tag{114}$$

where $\widehat{UA}^{Total}$ is the total thermal conductivity of the building after undergoing shell changes and $UA^{Total}$ is the total thermal conductivity before undergoing changes to the shell.

Once the comparison is performed in step 356, the balance point temperature is calculated based on the results of the comparison, the indoor temperature, the original balance point temperature, ending the method 350 (step 357). The balance point temperature $\hat{T}^{Balance\ Point}$ of the building that has undergone changes to the building shell can be calculated in accordance with:

$$\hat{T}^{Balance\ Point} = T^{Indoor} - \left(\frac{\bar{Q}^{Internal\ Gains}}{\widehat{UA}^{Total}}\right) \tag{115}$$

US 12,619,801 B2

67                                                                                  68 where $T^{Indoor}$ is the temperature inside the building and $\overline{Q}^{Internal\ Gains}$ are average internal gains of the building.

Substituting Equation (114) into Equation (115)shows that:

$$\hat{T}^{Balance\ Point} = T^{Indoor} - \left[\frac{\overline{Q}^{Internal\ Gains}}{(1-\gamma)UA^{Total}}\right] \qquad (116)$$

Substituting Equation (109) into Equation (116) shows that:

$$\hat{T}^{Balance\ Point} = T^{Indoor} - \left[\frac{(T^{Indoor} - T^{Balance\ Point})UA^{Total}}{(1-\gamma)UA^{Total}}\right] \qquad (117)$$

Simplifying Equation (117) shows that:

$$\hat{T}^{Balance\ Point} = \frac{T^{Balance\ Point} - \gamma T^{Indoor}}{(1-\gamma)} \qquad (118)$$

Thus, the balance point temperature of the building that has undergone changes to the shell can be determined (step 357) in accordance with the Equation (118), using only the fraction by which the old total thermal conductivity differs from the new total thermal conductivity, the original balance point temperature, and the temperature inside the building. Equation (118) is powerful, eliminating the need to calculate the average internal heating gains to obtain the balance point temperature of the building.

The following example illustrations the ease of the method 350. Suppose that a building has a current Balance Point Temperature of 64° F. and an indoor temperature of 68° F. What will the new Balance Point Temperature be if investments improve building shell efficiency by 50%?

$$\hat{T}^{Balance\ Point} = \frac{64 - 0.5 * 68}{(1 - 0.5)} = 60 \qquad (119)$$

The new Balance Point Temperature will be 60° F.

Figure 29:
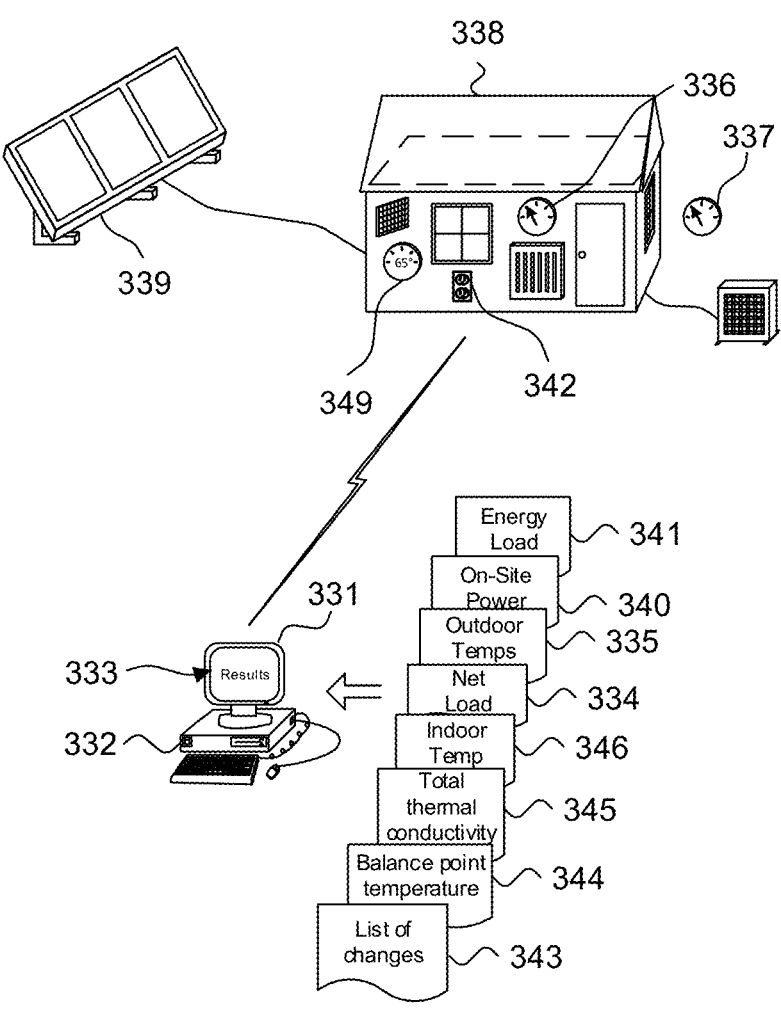
FIG. 29 is a system for determining post-modification building balance point temperature with the aid of a digital computer in accordance with a further embodiment.

Virtual Energy Audit and Post-Modification
Balance Point Temperature Modification System The Virtual Energy Audit methodology and determining of a balance point temperature of a building after undergoing shell improvements can be performed with the assistance of a computer, or through the use of hardware tailored to the purpose. FIG. 29 is a system 330 for determining a post-modification building balance point temperature with the aid of a digital computer 331 in accordance with a further embodiment. A computer system 331, such as a personal, notebook, or tablet computer, as well as a tablet computer, smartphone, or programmable mobile device, can be programmed to execute software programs 332 that operate autonomously or under user control, as provided through user interfacing means, such as a monitor, keyboard, and mouse. The computer system 331 can be on-site or could be remotely operated by a power utility or other endeavor.

The structure 338 is supplied electricity 342 from a power utility (not shown) over an electric power line. Consumption of the electricity 342 is measured or monitored by the power utility through a conventional interval or time-of-use power meter (not shown) or a power metering infrastructure 336, which generally includes a smart meter installed on the structure 338 that is interposed on the electric power line to measure or monitor and record electricity consumption. A conventional power meter measures electricity consumption, generally on a cumulative basis, and the power utility periodically retrieves the cumulative consumption value from the power meter either through manual meter reading or, more routinely, through a wired or wireless interface that is typically unidirectional and only allowing the retrieval of data.

A smart meter differs from a conventional power meter by allowing more granular measurements of consumption, hourly or more frequently, and more frequent reporting to the utility, whether on a daily basis or more often. Smart meters further differ from conventional power meters by offering bidirectional communications capabilities with the power utility, which is able to thereby offer the ability to reduce load, disconnect-reconnect service, and interface to other utility service meters, such as gas and water meters. Moreover, a power utility is able to retrieve consumption data from a smart meter as needed for other purposes, including performing a Virtual Energy Audit analysis, as described herein. Note that smart meters are also available for measuring or monitoring other types of energy, fuel, and commodity consumption or usage, including natural gas, liquid propane, and water.

The computer system 331 needs two or three sources of data, depending upon whether on-site power generation 340 is installed. First, net load 334 is required, which can be obtained from a power utility or from other sources of data, such as a customer's utility bill records. The net load 334 could also be measured on-site, provided that the power metering infrastructure 336 is available and accessible, such as through a smart meter. Where no on-site power generation is in use, the energy load 341 of the structure 338 is simply the net load 334, as verified and adjusted for stability, as described supra with reference to FIGS. 17 and 24.

Second, outdoor temperature 335 for the location of the structure 338, as measured over the same period of time as the net load 334, is required. This data could be externally-supplied, such as through the SolarAnywhere® database service, cited supra, or other sources of meteorological data, or measured on-site, provided that outdoor temperature monitoring equipment 337 is available and accessible.

Third, where applicable, on-site power generation 340, as measured over the same period of time, will be required in those situations where on-site power generation 340 is either metered, typically by the same power utility that supplies electricity, yet not combined with the net load 334, or there is no separate power meter installed for measuring on-site power generation 340. If a separate solar power meter is installed, the energy load 341 is simply the sum of the net load 334 and the on-site power generation 340.

On-site power generation 340 will typically be supplied through solar power generation 339, although other forms of on-site power generation may apply, and must be added to the net load 334 to reconstruct the energy load 341. However, if no solar power meter is installed, the on-site power generation 340 will need to be obtained from either historical records, provided that on-site power generation 340 was measured and recorded (but not actually metered), or estimated by retrospectively "forecasting" power generation, for instance, by using a probabilistic forecast of photovoltaic fleet power generation, such as described supra beginning with reference to FIG. 1, by assuming a fleet size that consists of only one system in Equation (12). The energy load 341 is then calculated as the sum of the net load 334 and the historical or estimated on-site power generation 340.

Based on these two or three sources of data, the computer system 331 executes a software program 332 to analyze building performance using the Virtual Energy Audit methodology, described supra with reference to FIGS. 17, FIGS. 19, and 24, including at least one balance point temperature 344 of the building prior to the building undergoing shell improvements (or other changes). The resulting disaggregated component load results 333 for the structure 338 can then be provided to the home or building owner or to the power utility for use in power generation operations and planning and other purposes. For instance, a power utility could use the analytical findings for assessing on-going and forecasted power consumption by the power utility's customer base, and in enabling the power utility to adjust or modify the generation or procurement of electric power as a function of a power utility's remote consumer energy auditing analytical findings.

The software program 332 executed by the computer system 331 can further use additional data sources to determine balance point temperature of a building that has recently underwent or is about to undergo improvements as described above with reference to FIG. 28. For instance, temperature inside the structure 338 can also be measured using a thermostat 349 and used for determining a balance point temperature of the building after the building undergoes modifications such as building shell improvements. The thermostat 349 can be a smart thermostat that interfaces with the computer system 331 over an Internetwork, such as the Internet or a cellular network, and provides the measured temperature to the computer system 331 via the Internetwork. Other kinds of thermostats and other ways to obtain the indoor temperature are possible.

To assist with one or more empirical tests performed to determine the total thermal conductivity 345 of the structure 338 prior to undergoing the shell improvements (described above), the computer system 331 can be remotely interfaced to a heating source inside the structure 338 and control the heating source during the performance of the test. Other ways for the system 331 to obtain the total thermal conductivity of the structure are possible. The computer system 331 can also use the temperatures obtained by the thermostat 349 or using the outdoor temperature monitoring equipment 337 (or from other sources) to obtain the total thermal conductivity 345.

The computer system 331 can further interface with a user computing device (not shown), such as a personal computer, a mobile phone, a tablet, or another computing device, to receive a list 343 of one or more changes (such as particular improvements to the shell of the building) and that affect total thermal conductivity of the building. The list 343 can include data about how each of the changes impacts the building's thermal characteristics, such as R-values of materials used in making the changes. The computer system 343 can calculate the total thermal conductivity of the building after undergoing improvements using the information in the list 343 as further described above. The software program 332 compares the total thermal conductivity after the shell improvements to the total thermal conductivity before the shell improvements and determines the balance point temperature of the building after implementation of changes in the list 343 using a result of the comparison, the temperature 346 inside the structure 331, and the balance point temperature 344 of the building prior to the implementation of the changes, as described above with reference to FIG. 28.

The computer system 331 includes hardware components found in a general purpose programmable computing device, such as a central processing unit, memory, input/output ports, network interface, and non-volatile storage, and execute the software programs 332, as structured into routines, functions, and modules. In addition, other configurations of computational resources, whether provided as a dedicated system or arranged in client-server or peer-to-peer topologies, and including unitary or distributed processing, communications, storage, and user interfacing, are possible.

APPLICATIONS

Virtual Energy Audit and Post-Modification Building Balance Point Temperature Use Cases The Virtual Energy Audit analysis methodology and the methodology for determining post-modification building balance point temperature support multiple use cases for the benefit of power utilities and their customers. Here are some examples.

Provide building-specific, objective parameters that are useful in modeling the building's energy consumption.

Produce the Effective R-Value, an intuitive comparative metric of overall building thermal performance.

Disaggregate electrical loads into heating loads, cooling loads, baseloads, and other loads.

Forecast heating and cooling energy consumption over a multi-year horizon.

Infer space heating system technology type.

Predict natural gas heating consumption based only on electrical usage data.

Calculate benefits of switching from natural gas to electric heating.

Guide customers in building shell, HVAC, smart thermostat and other energy investment decisions.

Detect when an AC system requires servicing.

Forecast short-term electrical building usage to support utility load forecasting.

Quantify building performance according to known standards.

Support power utility programs that target customers with the greatest potential savings opportunities.

Inform Distributed Energy Resource (DER) adoption models of building thermal technologies.

Serve as a measurement and verification tool for building shell, HVAC, and smart thermostat investments.

While the invention has been particularly shown and described as referenced to the embodiments thereof, those skilled in the art will understand that the foregoing and other changes in form and detail may be made therein without departing from the spirit and scope.

The invention claimed is:

1. A method for a post-modification building balance point temperature prediction with the aid of a digital computer, comprising the steps of:

obtain by a computer, the computer comprising a memory storing program code and a processor coupled to the memory and configured to execute the code, a balance point temperature of a building;

obtaining by the computer total thermal conductivity of the building;

obtaining by the computer a temperature inside the building;

obtaining by the computer one or more proposed changes to the building associated with a change to the total thermal conductivity and R-values of one or more materials associated with the changes;

modeling by the computer the changed total thermal conductivity associated with an implementation of the building changes using the R-values; and determining by the computer a further balance point temperature of the building associated with the implementation of the one or more proposed changes in accordance with:

$$\hat{T}^{Balance\,Point} = \frac{T^{Balance\,Point} - \gamma T^{Indoor}}{(1 - \gamma)}$$

where $\hat{T}^{Balance\,Point}$ is the further balance point temperature, $T^{Balance\,Point}$ is the balance point temperature, $\gamma$ is a fractional improvement in the total thermal conductivity associated with the implementation of the one or more proposed changes, $T^{Indoor}$ is the temperature inside the building, wherein the one or more proposed changes are implemented based on the further balance point temperature, wherein the building is interfaced to a power grid and operation of the power grid is performed based on the further balance point temperature.

2. A method according to claim 1, further comprising one of:

obtaining a temperature proposed to be maintained inside the building following the implementation of the changes and setting the proposed temperature as the temperature inside the building; and obtaining a temperature inside the building prior to the implementation of the changes and setting the prior-to-implementation temperature as the temperature inside the building.

3. A method according to claim 1, further comprising receiving the proposed changes from a user device over an Internetwork.

4. A method according to claim 3, further comprising receiving data associated with the proposed changes necessary to model the changed thermal conductivity.

5. A method according to claim 1, further comprising performing an empirical test to obtain the building's total thermal conductivity.

6. A method according to claim 1, wherein the test is performed using an electric controllable interior heat source.

7. A method according to claim 1, further comprising determining $\gamma$ by comparing the total thermal conductivity to the changed thermal conductivity.

8. A method for a post-modification building balance point temperature determination with the aid of a digital computer, comprising the steps of:

obtain by a computer, the computer comprising a memory storing program code and a processor coupled to the memory and configured to execute the code, a balance point temperature of a building;

obtaining by the computer total thermal conductivity of the building prior to an implementation of one or more changes to the building that are associated with a change to the total thermal conductivity, comprising performing an empirical test using an electrical controllable heating source;

obtaining by the computer a temperature inside the building following the implementation of the one or more changes to the building;

modeling by the computer the changed total thermal conductivity associated with the implementation of the one or more changes; and determining by the computer a further balance point temperature of the building following the implementation of the one or more changes in accordance with:

$$\hat{T}^{Balance\,Point} = \frac{T^{Balance\,Point} - \gamma T^{Indoor}}{(1 - \gamma)}$$

where $\hat{T}^{Balance\,Point}$ is the further balance point temperature, $T^{Balance\,Point}$ is the balance point temperature, $\gamma$ is a fractional improvement in the total thermal conductivity following the implementation of the one or more changes, and $T^{indoor}$ is the temperature inside the building, wherein the building is interfaced to a power grid and operation of the power grid is performed based on the further balance point temperature.

9. A method according to claim 8, further comprising using at least one of a standalone thermometer and a smart thermostat inside the building to obtain the temperature inside the building.

10. A method according to claim 8, further comprising determining $\gamma$ by comparing the total thermal conductivity to the changed thermal conductivity.

11. A method according to claim 8, further receiving a listing of the changes from a user device over an Internetwork.

12. A method according to claim 11, further comprising receiving data associated with the changes necessary to model the changed thermal conductivity.

13. A method according to claim 8, further comprising remotely controlling the electrical controllable heat source.

14. A system for a post-modification building balance point temperature determination with the aid of a digital computer, comprising:

a computer comprising a memory storing program code and a processor coupled to the memory and configured to execute the code, the computer configured to:

obtain a balance point temperature of a building;

obtain total thermal conductivity of the building prior to an implementation of one or more changes to the building that are associated with a change to the total thermal conductivity, comprising performing an empirical test using an electrical controllable heating source;

obtain a temperature inside the building following the implementation of the one or more changes to the building;

model the changed total thermal conductivity associated with the implemented changes; and determine a further balance point temperature of the building following the implementation of the one or more changes in accordance with:

$$\hat{T}^{Balance\,Point} = \frac{T^{Balance\,Point} - \gamma T^{Indoor}}{(1 - \gamma)}$$

where $T^{Balance\,Point}$ is the further balance point temperature, $\hat{T}^{Balance\,Point}$ is the balance point temperature, $\gamma$ is a fractional improvement in the total thermal conductivity following the implementation of the one or more changes, and $T^{Indoor}$ is the temperature inside the building, wherein the building is interfaced to a power grid and operation of the power grid is performed based on the further balance point temperature.

15. A system according to claim 14, the computer further configured to use at least one of a standalone thermometer and a smart thermostat inside the building to obtain the temperature inside the building.

16. A system according to claim 14, the computer further configured to determining γ by comparing the total thermal conductivity to the changed thermal conductivity.

17. A system according to claim 14, the computer further configured to receive a listing of the changes from a user device over an Internetwork.

18. A system according to claim 14, the computer further configured to receive data associated with the changes necessary to model the changed thermal conductivity.

19. A system according to claim 14, the computer further configured to remotely control the electrical controllable heat source.

20. A system according to claim 14, wherein the changes are to a shell of the building.

* * * * *